（12）United States Patent
Bliss et al.

(10) Patent No.: US 11,176,930 B1
(45) Date of Patent: *Nov. 16, 2021

(54) STORING AUDIO COMMANDS FOR TIME-DELAYED EXECUTION

(71) Applicant: Amazon Technologies, Inc., Seattle, WA (US)

(72) Inventors: David Edward Bliss, Albany, CA (US); Michael Douglas McQueen, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 148 days.

This patent is subject to a terminal disclaimer.

(21) Appl. No.: 15/082,520

(22) Filed: Mar. 28, 2016

(51) Int. Cl.
*G10L 15/22* (2006.01)
*G10L 15/26* (2006.01)
*G10L 13/08* (2013.01)
*G06F 3/16* (2006.01)
*G10L 15/02* (2006.01)
*G10L 15/183* (2013.01)
*G10L 15/14* (2006.01)
*G06F 40/40* (2020.01)

(52) U.S. Cl.
CPC ............ *G10L 15/22* (2013.01); *G06F 3/167* (2013.01); *G06F 40/40* (2020.01); *G10L 13/08* (2013.01); *G10L 15/02* (2013.01); *G10L 15/142* (2013.01); *G10L 15/183* (2013.01); *G10L 15/26* (2013.01); *G10L 2015/025* (2013.01); *G10L 2015/223* (2013.01)

(58) Field of Classification Search
USPC ...................................... 704/7–10
See application file for complete search history.

(56) References Cited

U.S. PATENT DOCUMENTS

| | | | |
|---|---|---|---|
| 6,456,977 B1 * | 9/2002 | Wang | A63F 13/06 345/168 |
| 6,487,534 B1 * | 11/2002 | Thelen | G10L 15/30 704/270 |
| 7,035,806 B2 * | 4/2006 | Kojima | G10L 15/26 704/270 |
| 9,502,027 B1 * | 11/2016 | Roy | G10L 15/19 |
| 9,977,573 B2 * | 5/2018 | Ermilov | G01C 21/3635 |
| 2002/0049596 A1 * | 4/2002 | Burchard | G10L 15/22 704/270 |
| 2002/0069063 A1 * | 6/2002 | Buchner | H04L 12/282 704/270 |

(Continued)

*Primary Examiner* — Leonard Saint Cyr
(74) *Attorney, Agent, or Firm* — Pierce Atwood LLP

(57) ABSTRACT

Systems including physical devices, such as button and switches, that receive audio when a user performs a specific interaction are described. The audio may correspond to a particular spoken command to be executed by a system in a time-delayed fashion. At a later time, when another interaction is performed with the physical device, the device may send the stored audio to a server for processing to determine a command associated with the audio. A device may store multiple audio data segments corresponding to multiple different commands, and each piece of audio data corresponding to a command may be associated with a specific physical operation of a device. If audio data is determined as corresponding to a multiple-input command, additional information needed to perform the multiple-input command may be audibly gathered from a user.

20 Claims, 37 Drawing Sheets

(56) References Cited

U.S. PATENT DOCUMENTS

| | | | |
|---|---|---|---|
| 2004/0204851 A1* | 10/2004 | Fukuyasu | G01C 21/3608 701/487 |
| 2007/0143117 A1 | 6/2007 | Conley | |
| 2008/0140423 A1* | 6/2008 | Kuboyama | G10L 15/22 704/275 |
| 2009/0306980 A1* | 12/2009 | Shin | G06F 1/1624 704/235 |
| 2010/0105364 A1* | 4/2010 | Yang | G06F 17/30663 455/414.1 |
| 2010/0204987 A1* | 8/2010 | Miyauchi | G10L 15/25 704/233 |
| 2011/0074693 A1 | 3/2011 | Ranford et al. | |
| 2011/0223893 A1 | 9/2011 | Lau et al. | |
| 2012/0035931 A1* | 2/2012 | LeBeau | G10L 15/265 704/251 |
| 2012/0130712 A1* | 5/2012 | Shin | G06F 3/167 704/231 |
| 2013/0095805 A1* | 4/2013 | LeBeau | G10L 15/265 455/414.1 |
| 2013/0297319 A1* | 11/2013 | Kim | G10L 15/22 704/275 |
| 2014/0058902 A1* | 2/2014 | Taylor | G06Q 30/0635 705/26.81 |
| 2014/0133671 A1* | 5/2014 | Son | H04R 5/0335 381/74 |
| 2014/0168130 A1* | 6/2014 | Hirai | G10L 15/00 345/173 |
| 2014/0365884 A1* | 12/2014 | Kara | G06F 3/0484 715/704 |
| 2015/0040211 A1 | 2/2015 | Lee et al. | |
| 2015/0112691 A1* | 4/2015 | LeBeau | G10L 15/265 704/275 |
| 2015/0235070 A1* | 8/2015 | Wang | G06K 9/00006 382/115 |
| 2015/0310867 A1* | 10/2015 | LeBeau | G10L 15/265 455/563 |
| 2016/0011854 A1* | 1/2016 | Furumoto | G10L 15/22 704/249 |
| 2016/0062567 A1 | 3/2016 | Yang et al. | |
| 2016/0092161 A1* | 3/2016 | Kim | G06F 17/21 704/235 |
| 2016/0123759 A1* | 5/2016 | Miller | G06F 3/011 701/400 |
| 2016/0124588 A1* | 5/2016 | Cotier | G06F 3/167 715/708 |
| 2016/0124707 A1* | 5/2016 | Ermilov | G06F 3/012 345/156 |
| 2016/0350280 A1 | 12/2016 | Lavallee et al. | |
| 2016/0357354 A1* | 12/2016 | Chen | G04G 13/02 |
| 2017/0199719 A1* | 7/2017 | Ashkenazi | G06F 3/165 |
| 2017/0230788 A1 | 8/2017 | Simonides et al. | |
| 2017/0301349 A1 | 10/2017 | Sumiyoshi et al. | |
| 2019/0310765 A1 | 10/2019 | Napolitano et al. | |

* cited by examiner

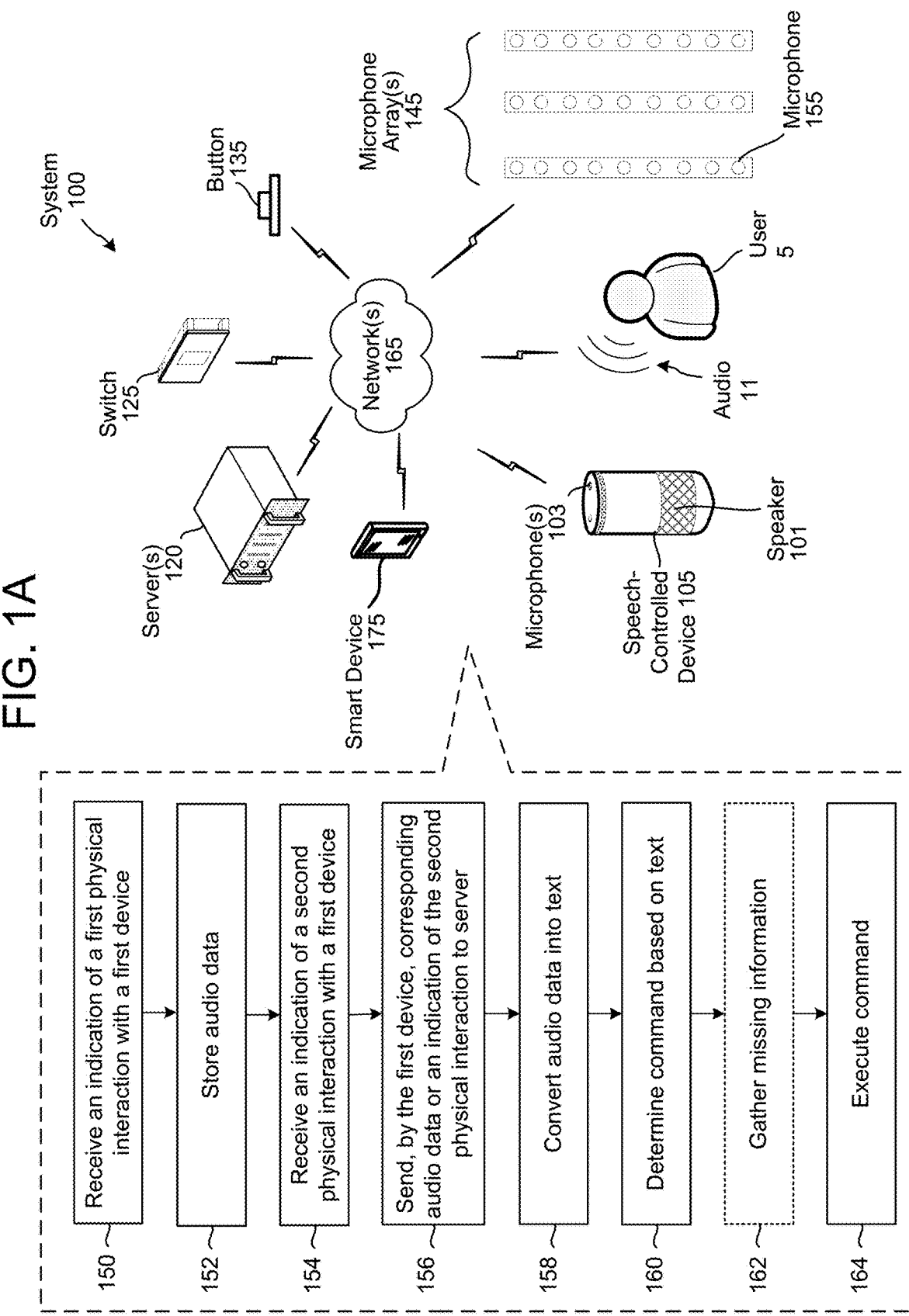

FIG. 1B
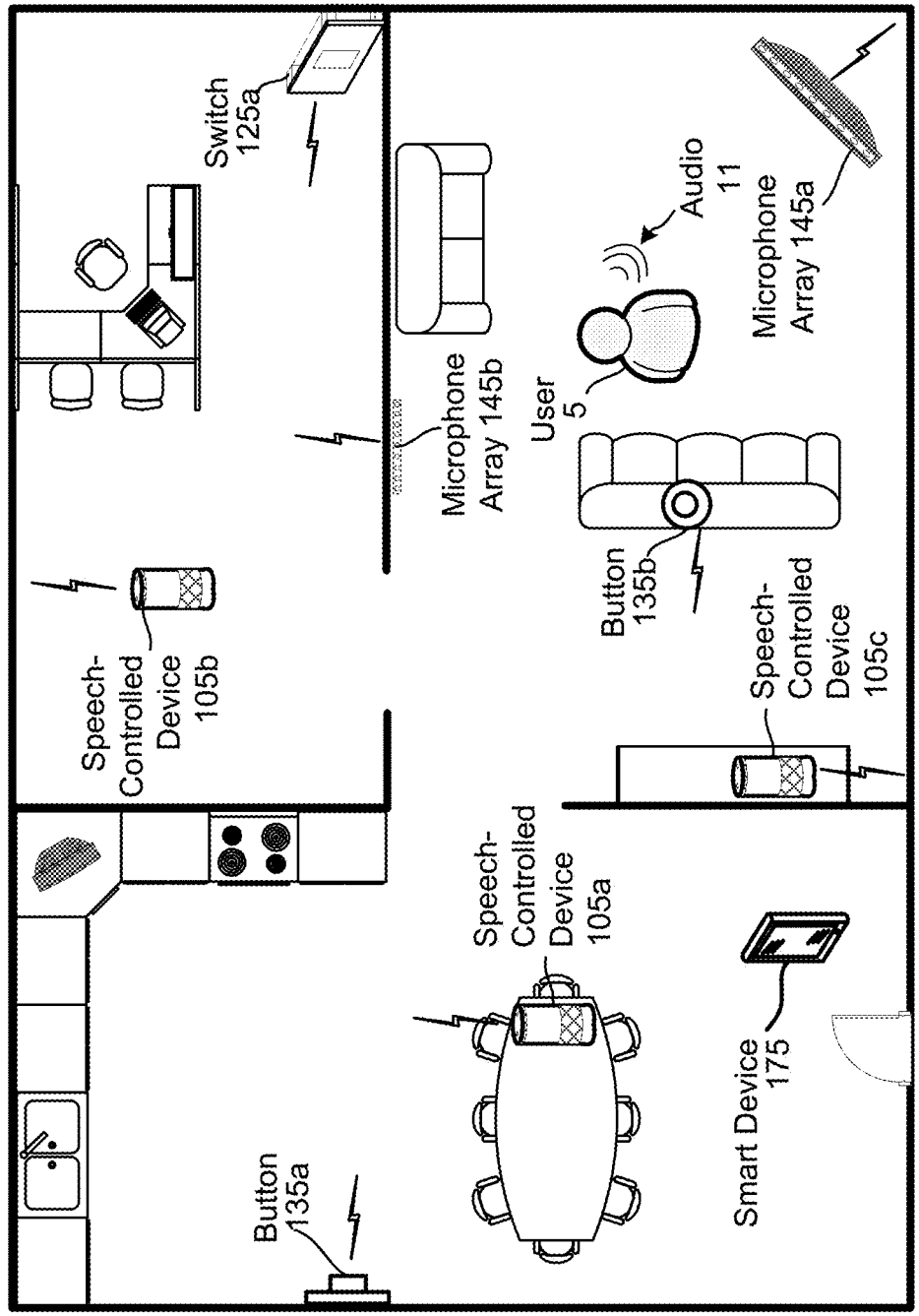
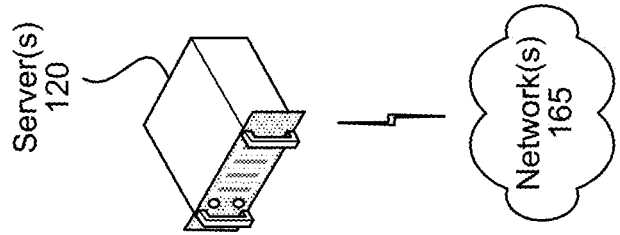

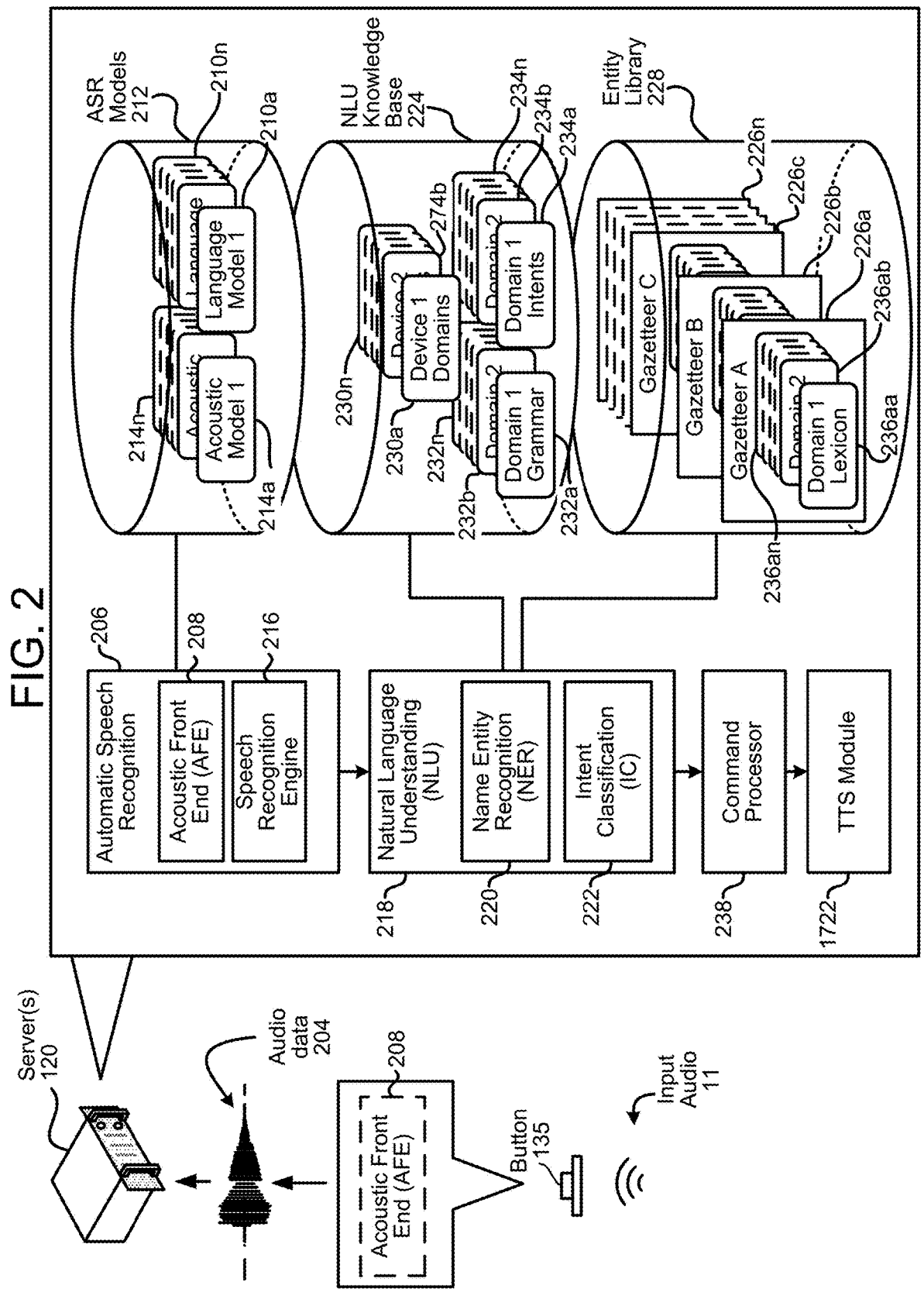

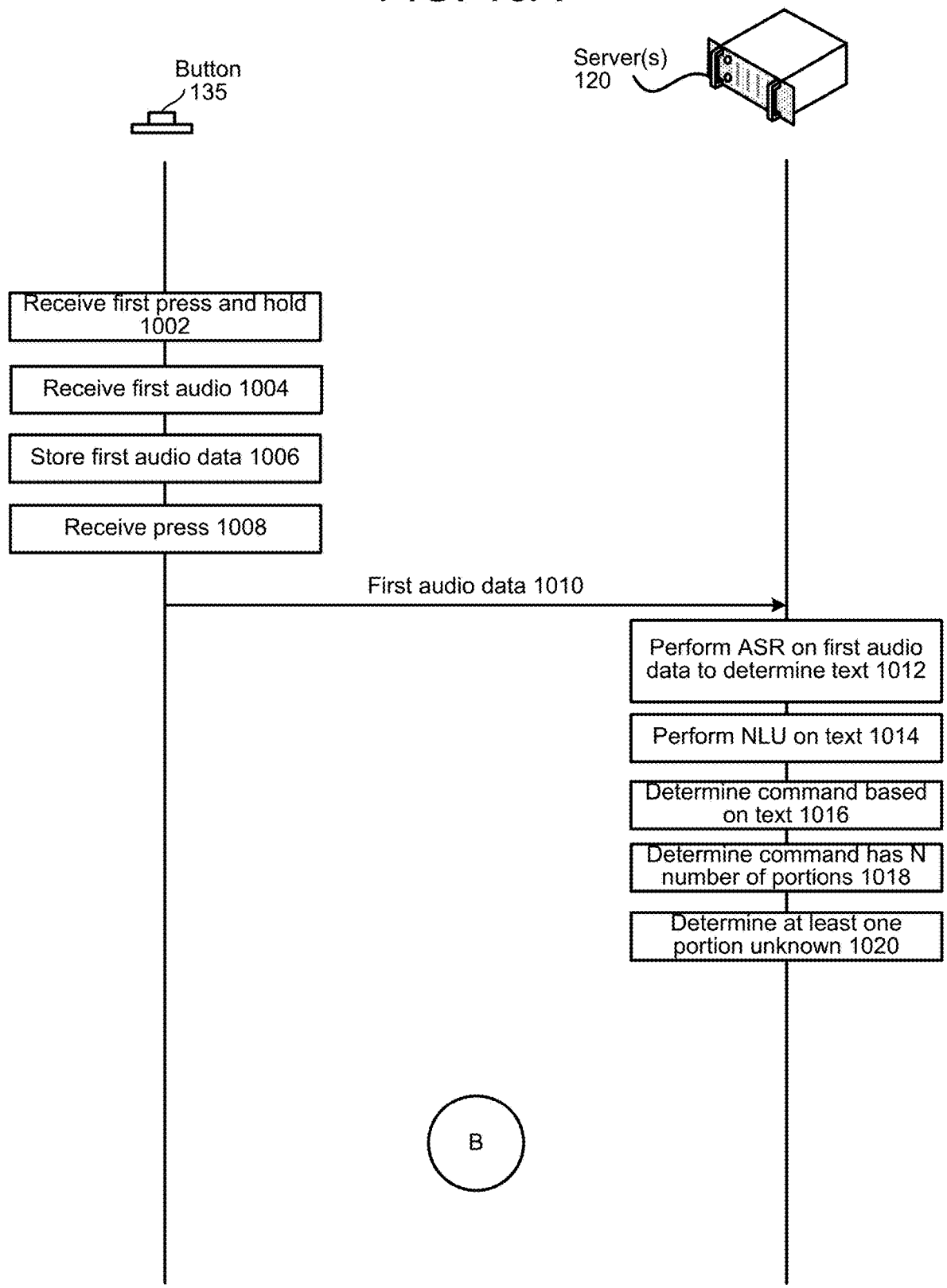

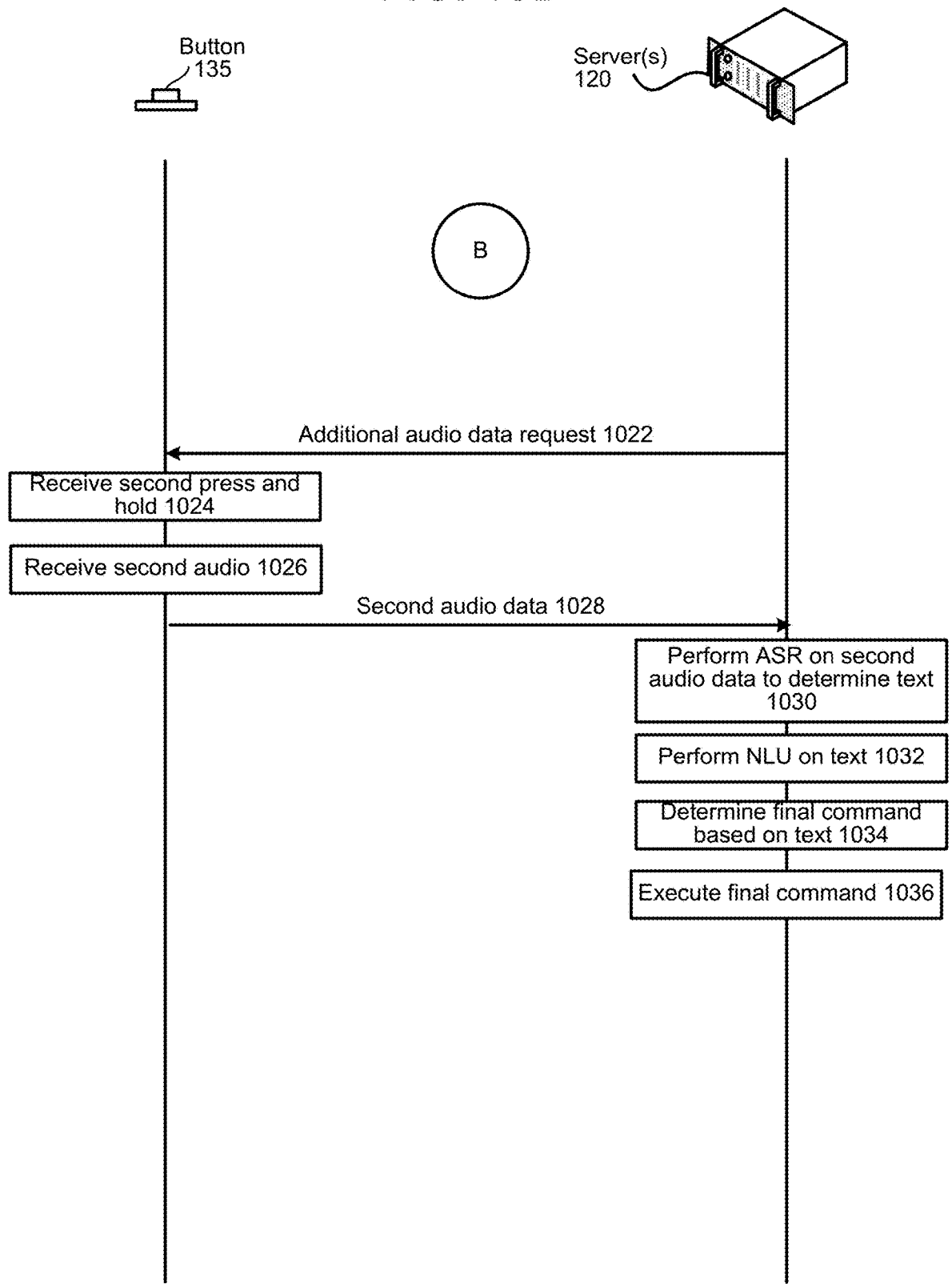

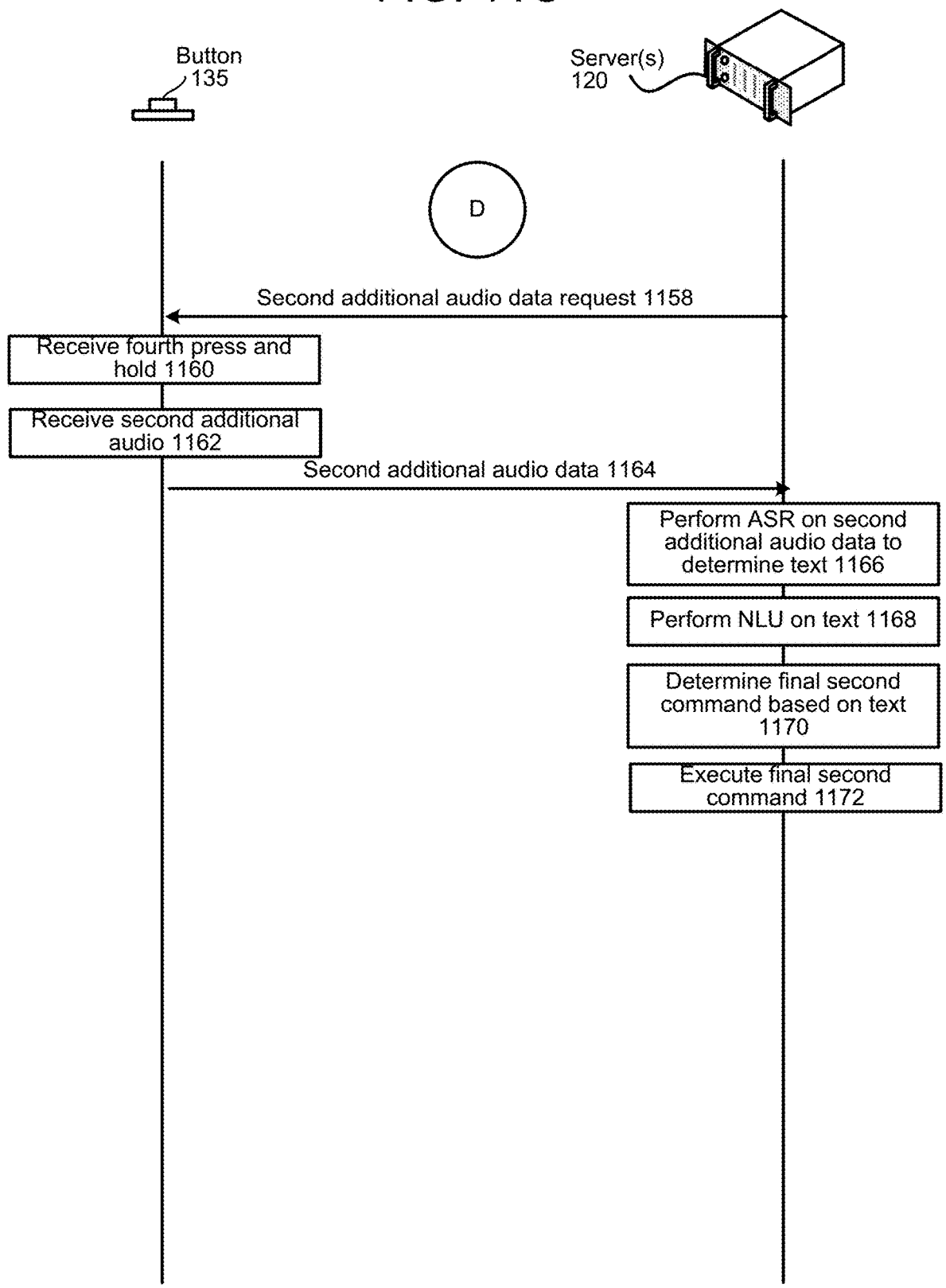

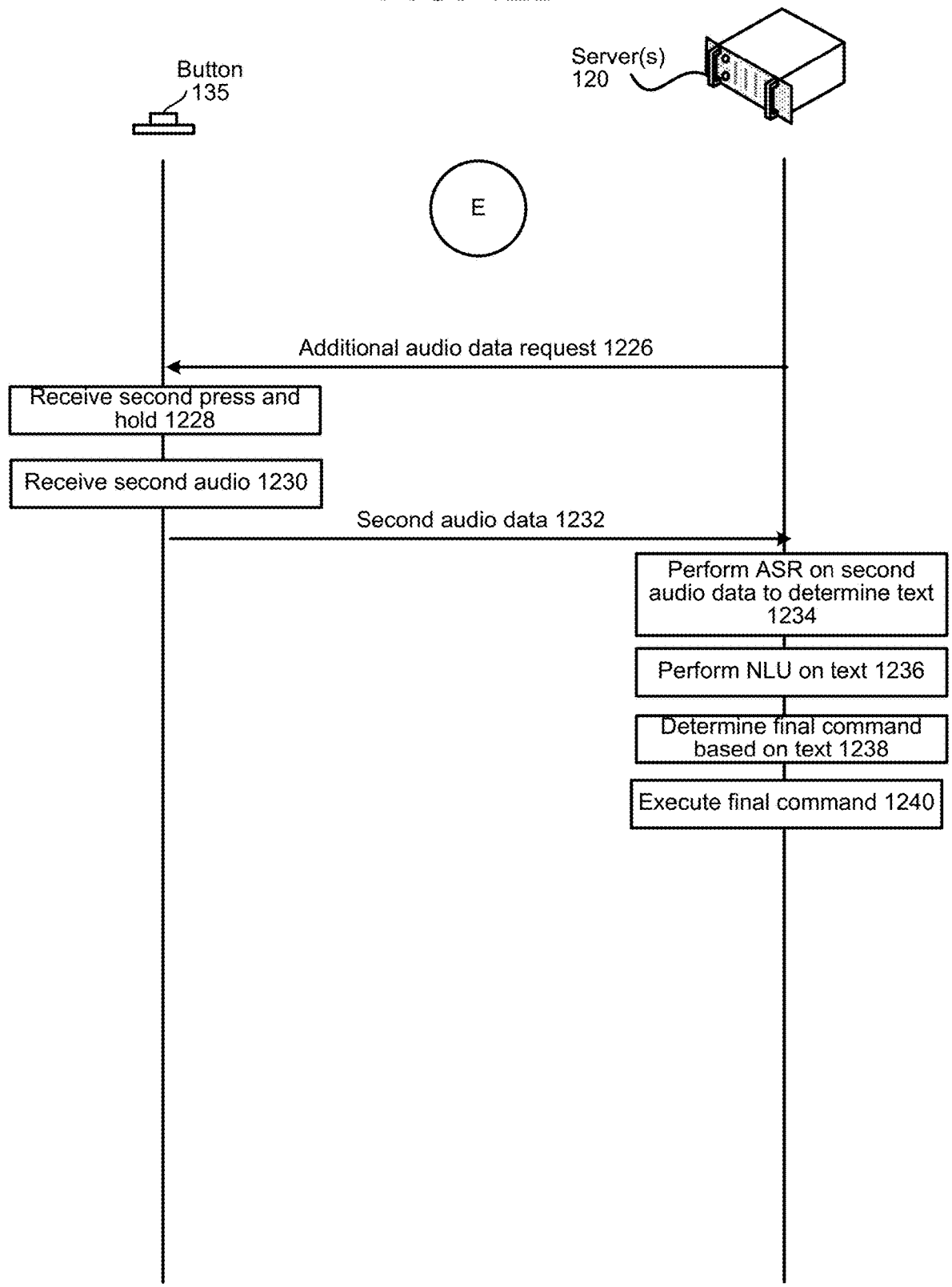

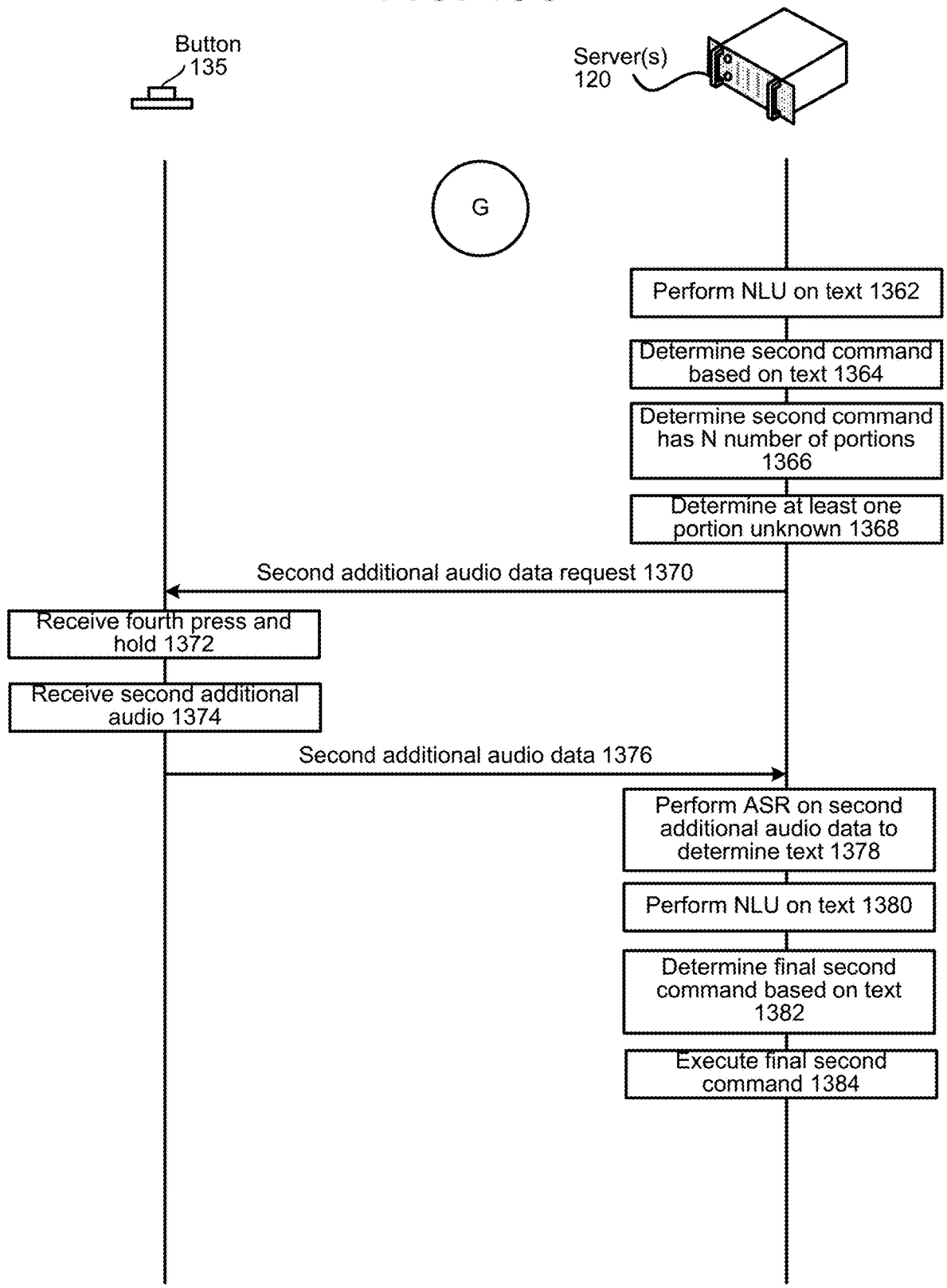

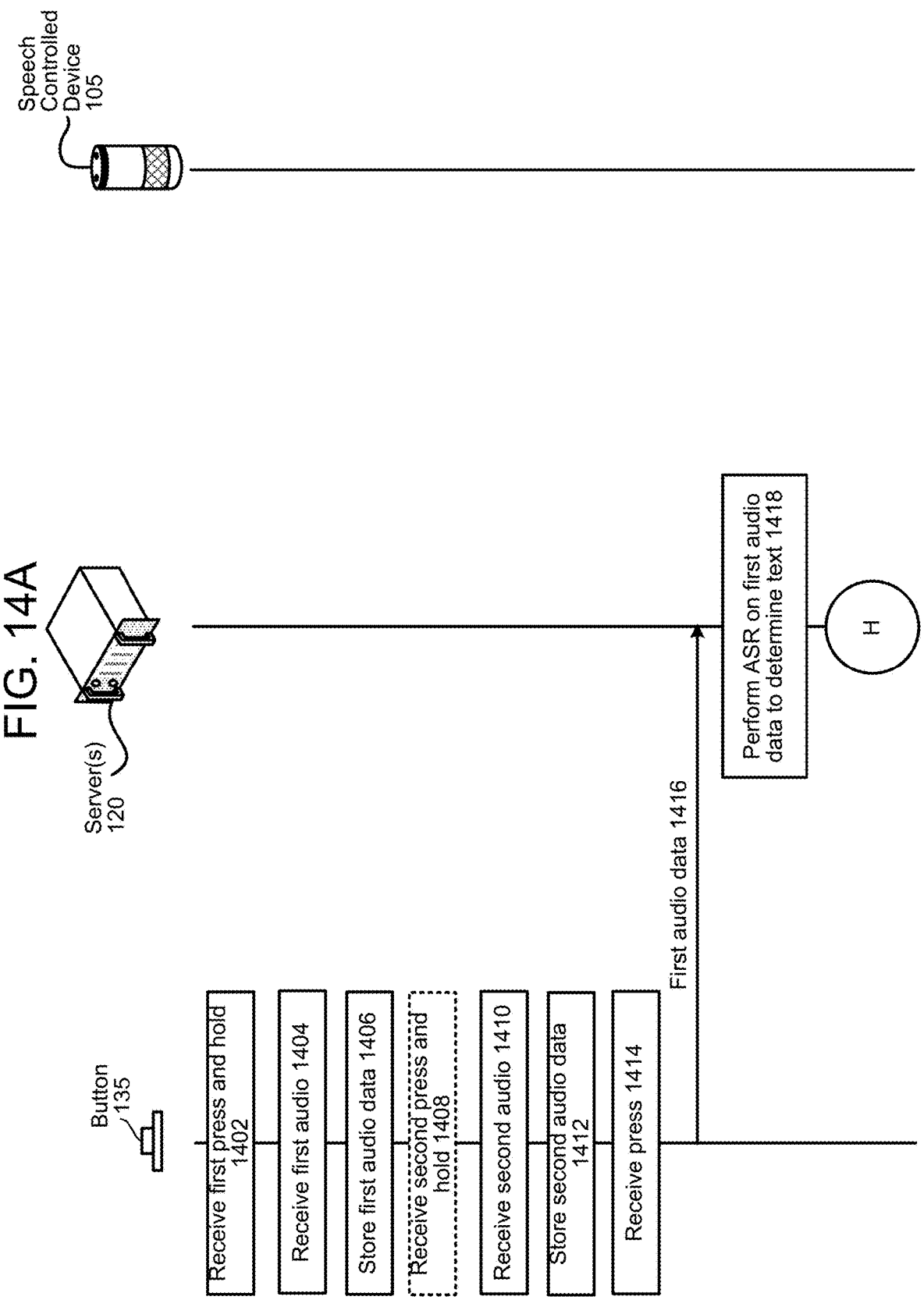

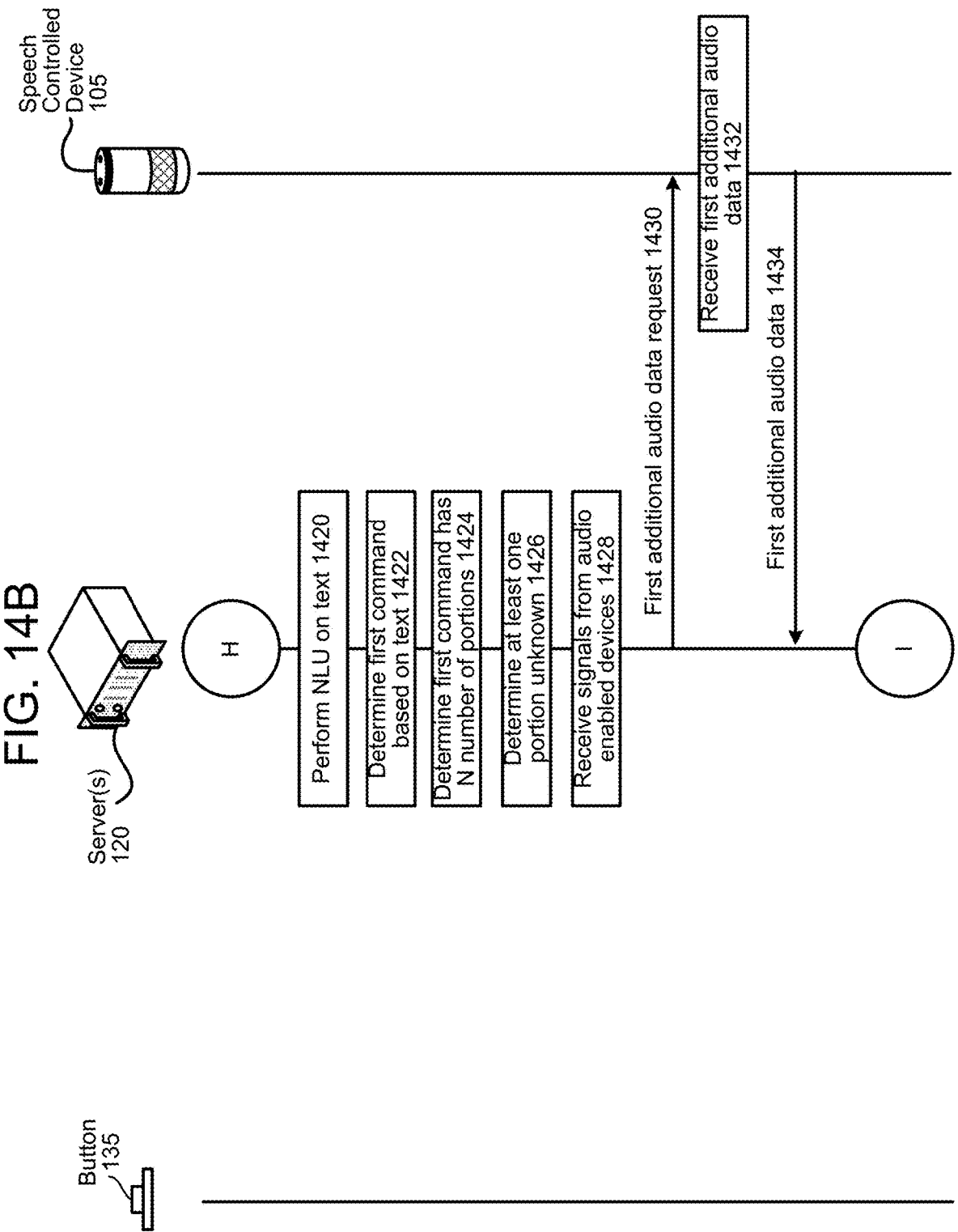

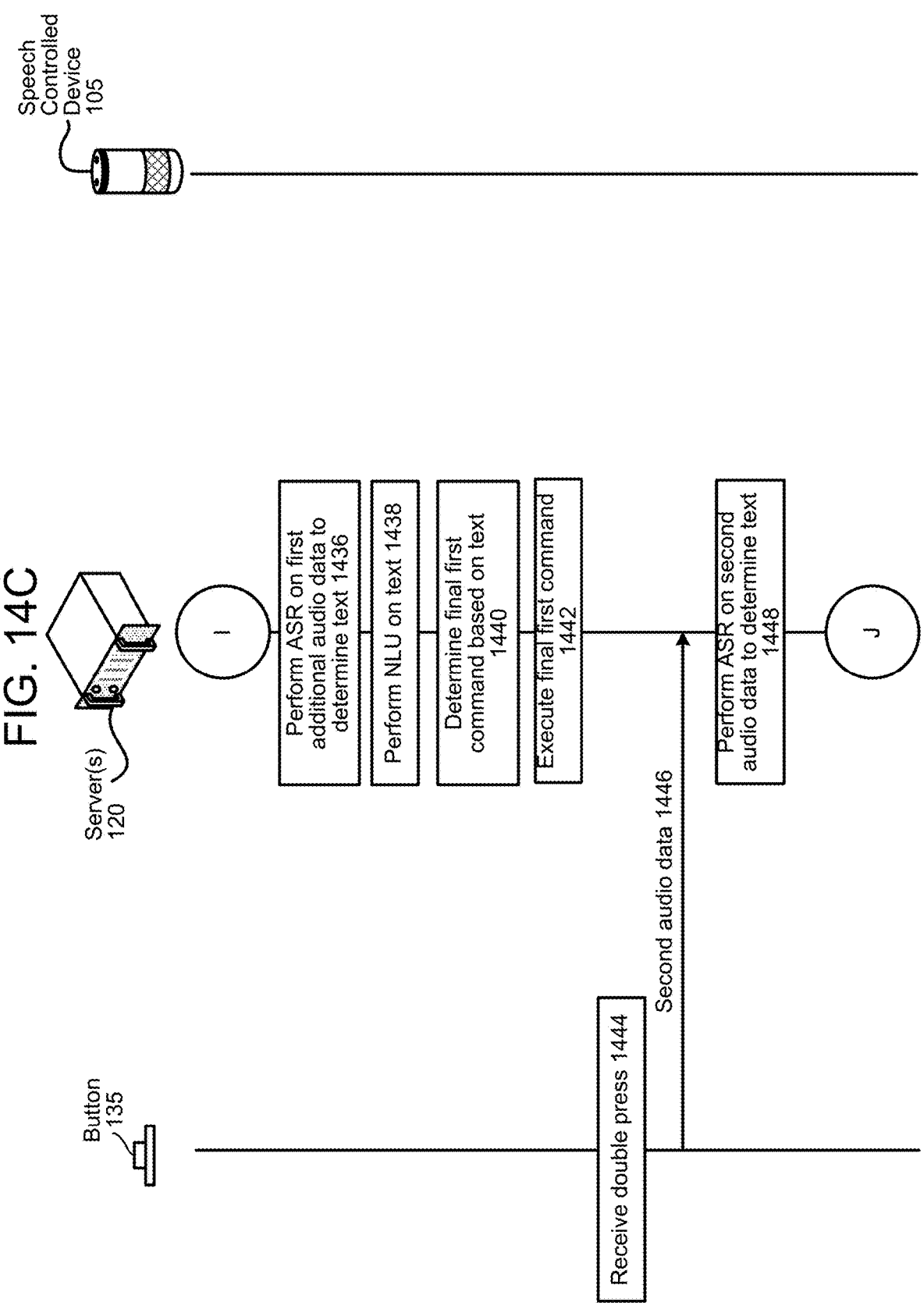

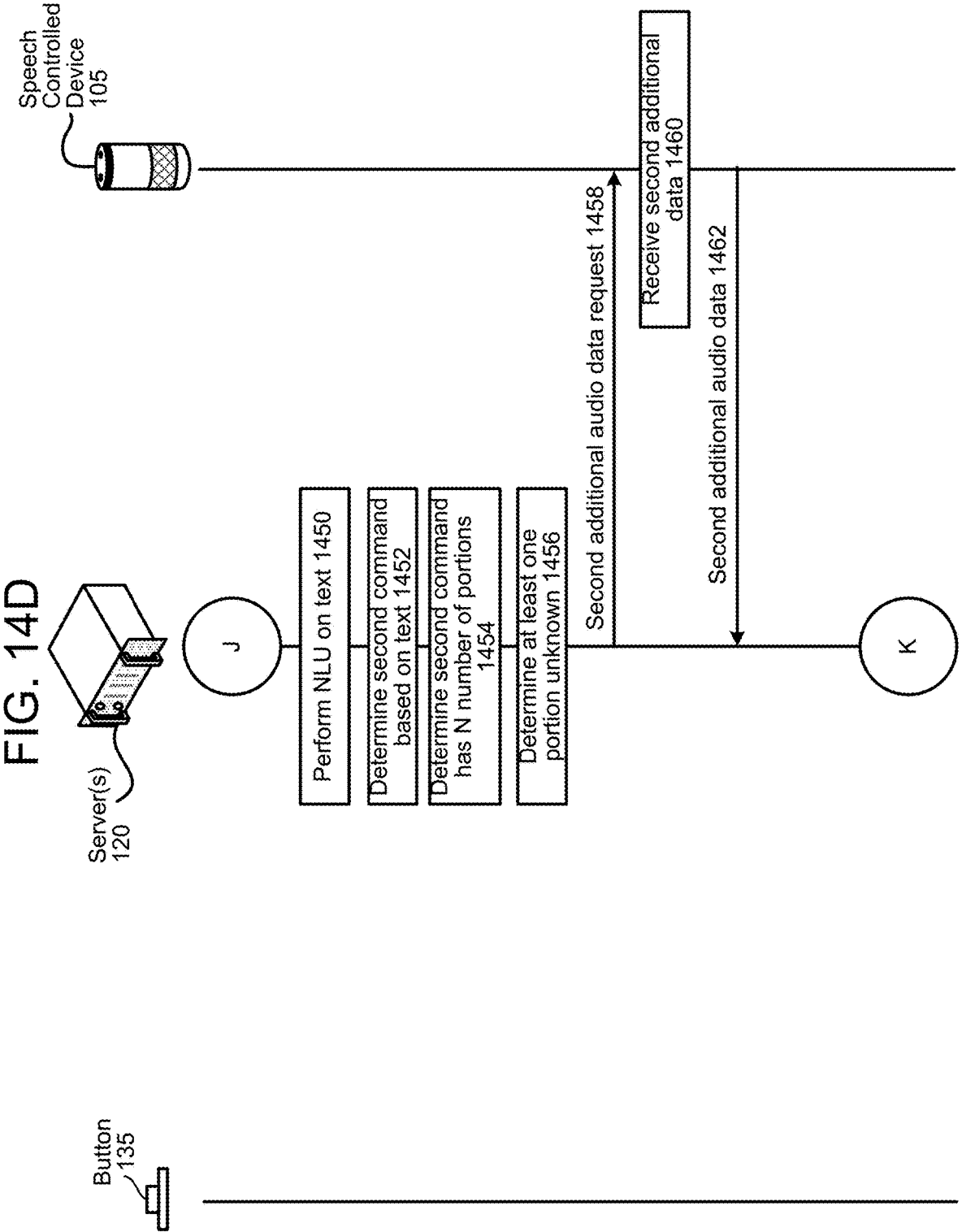

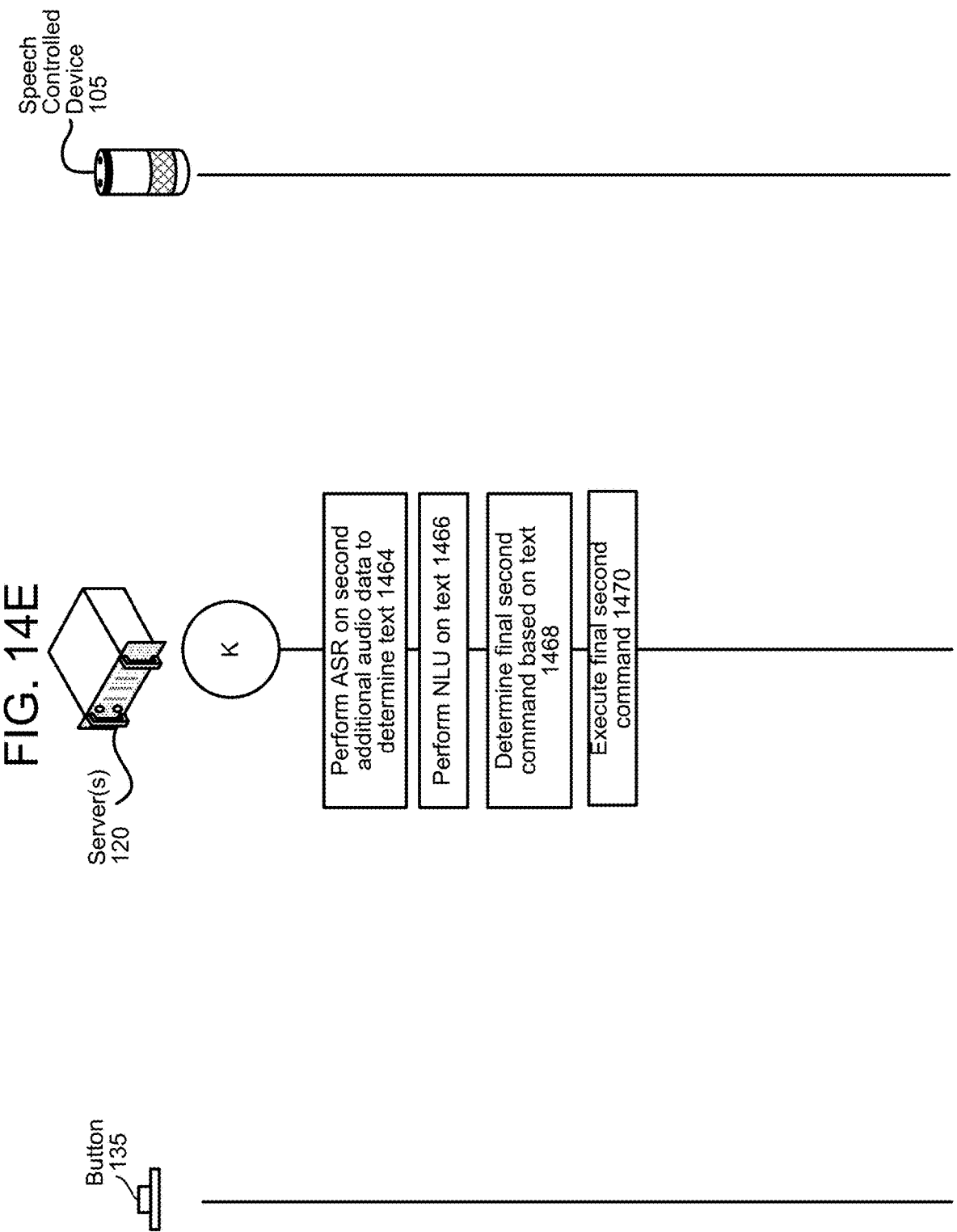

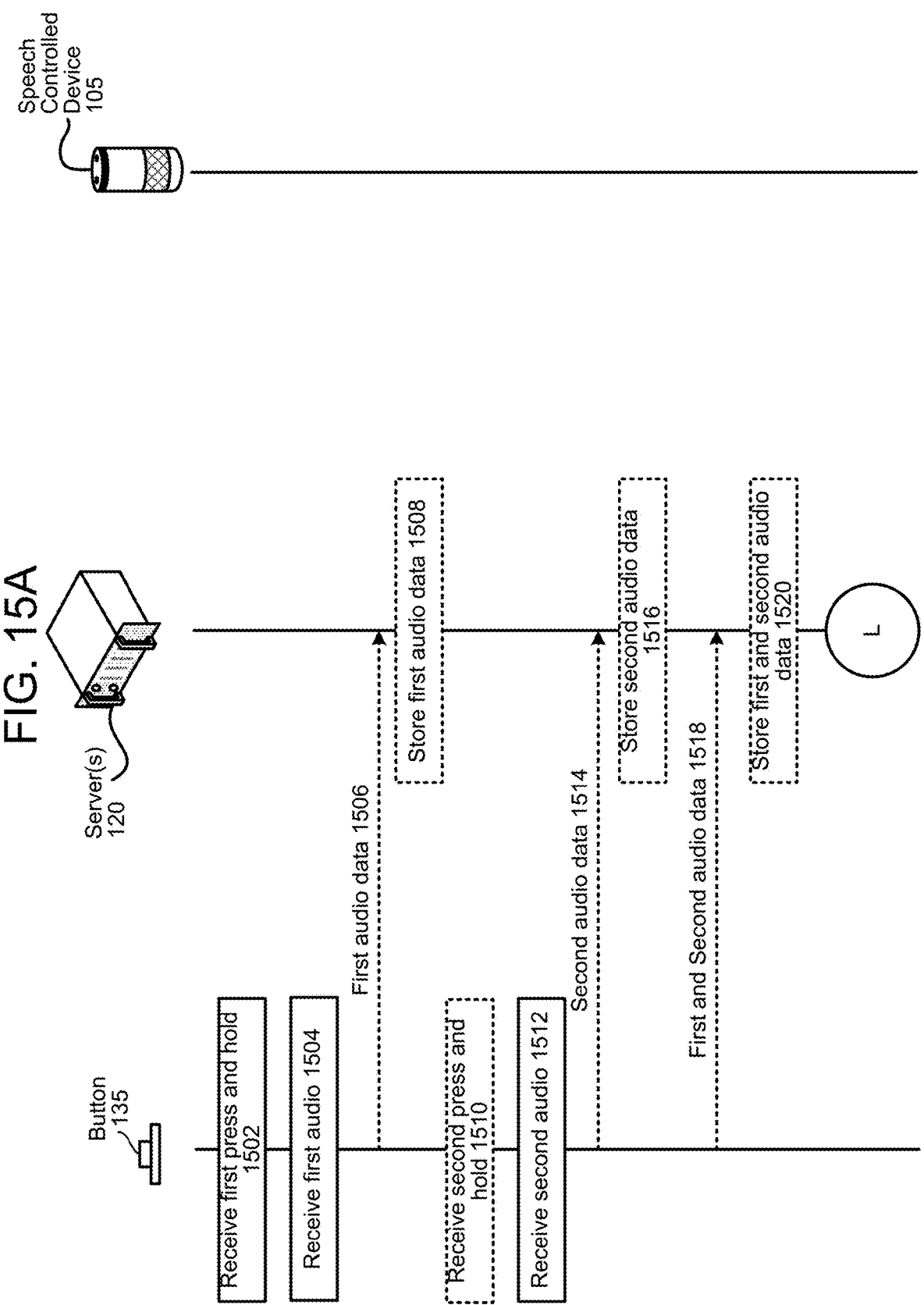

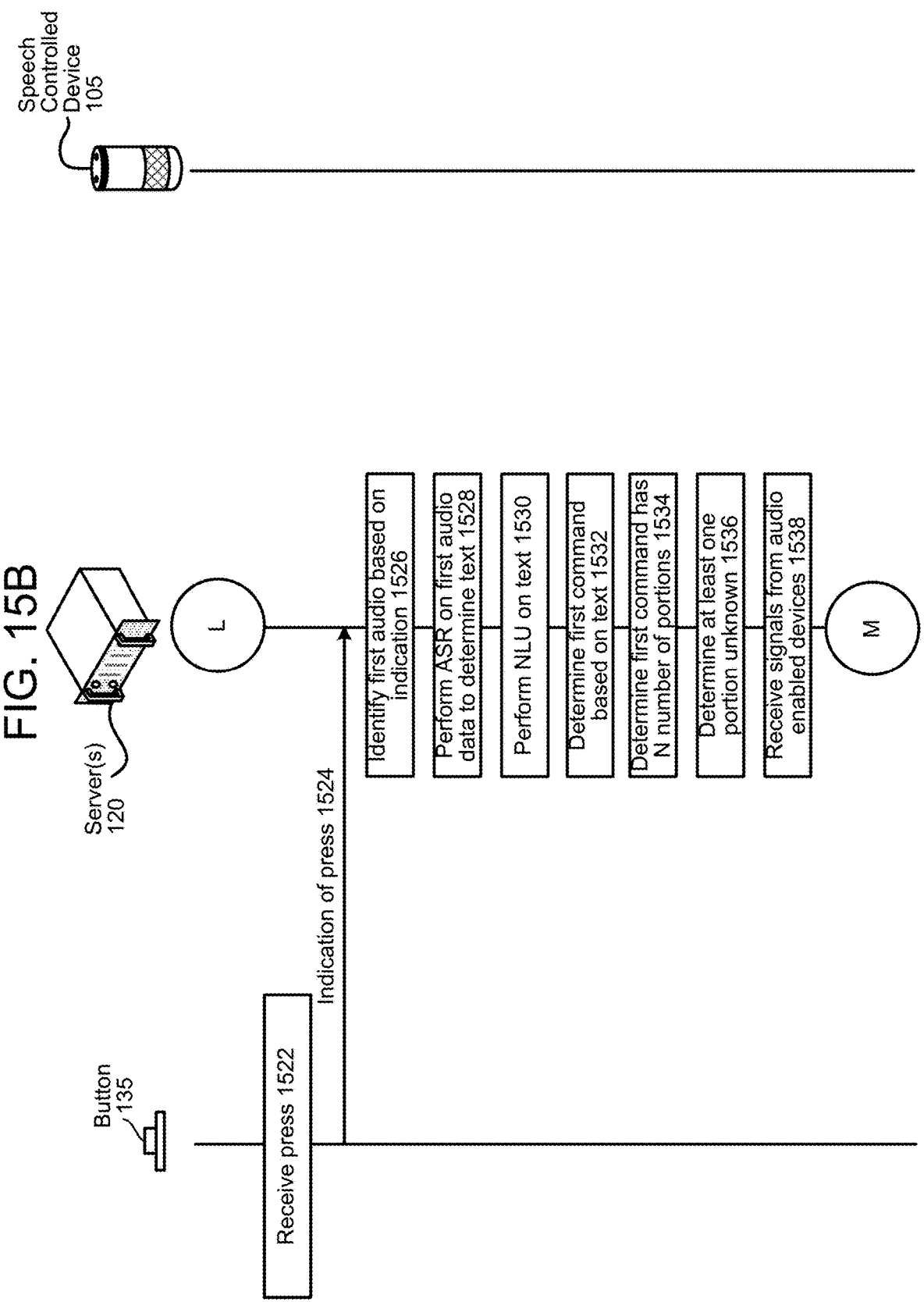

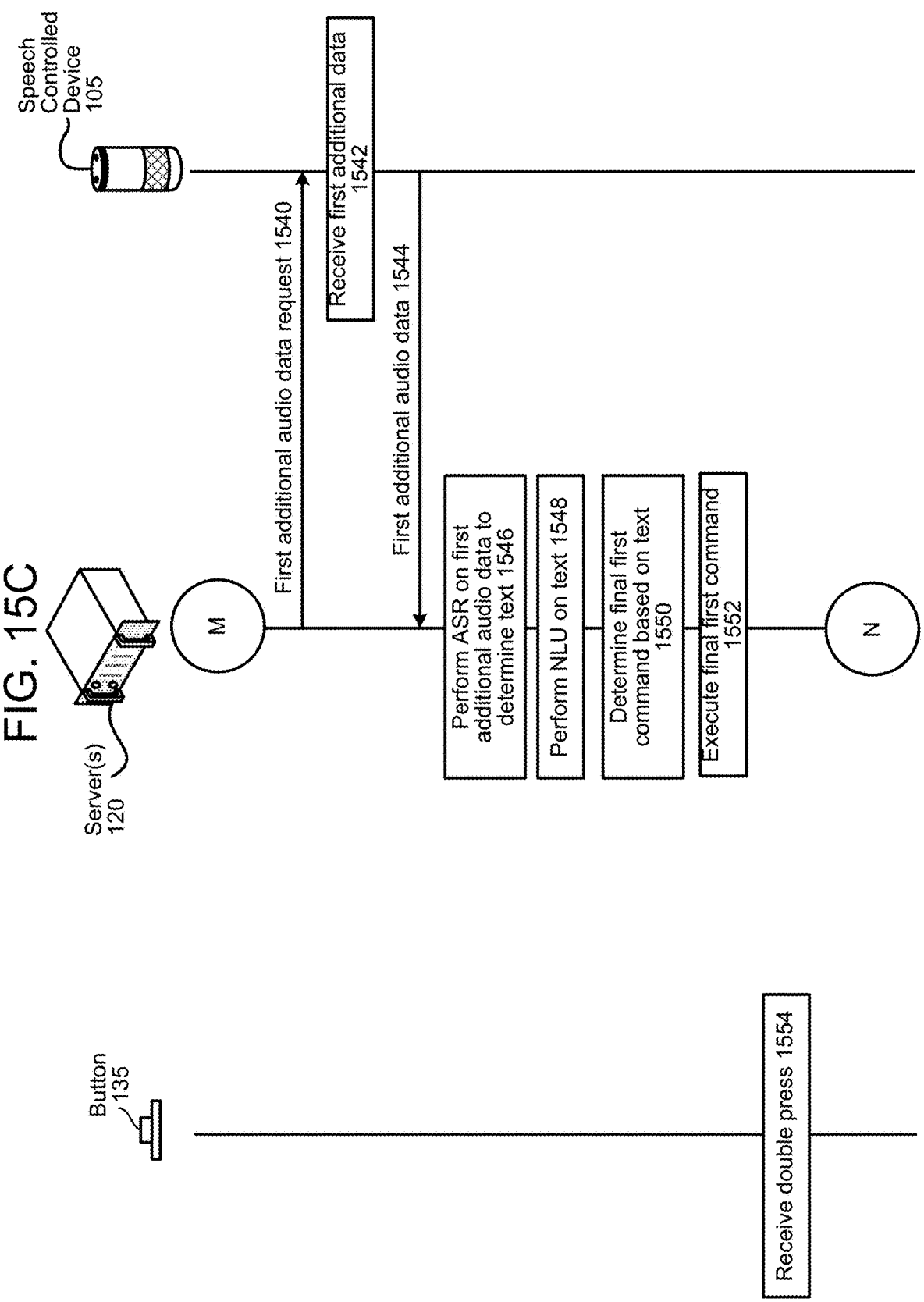

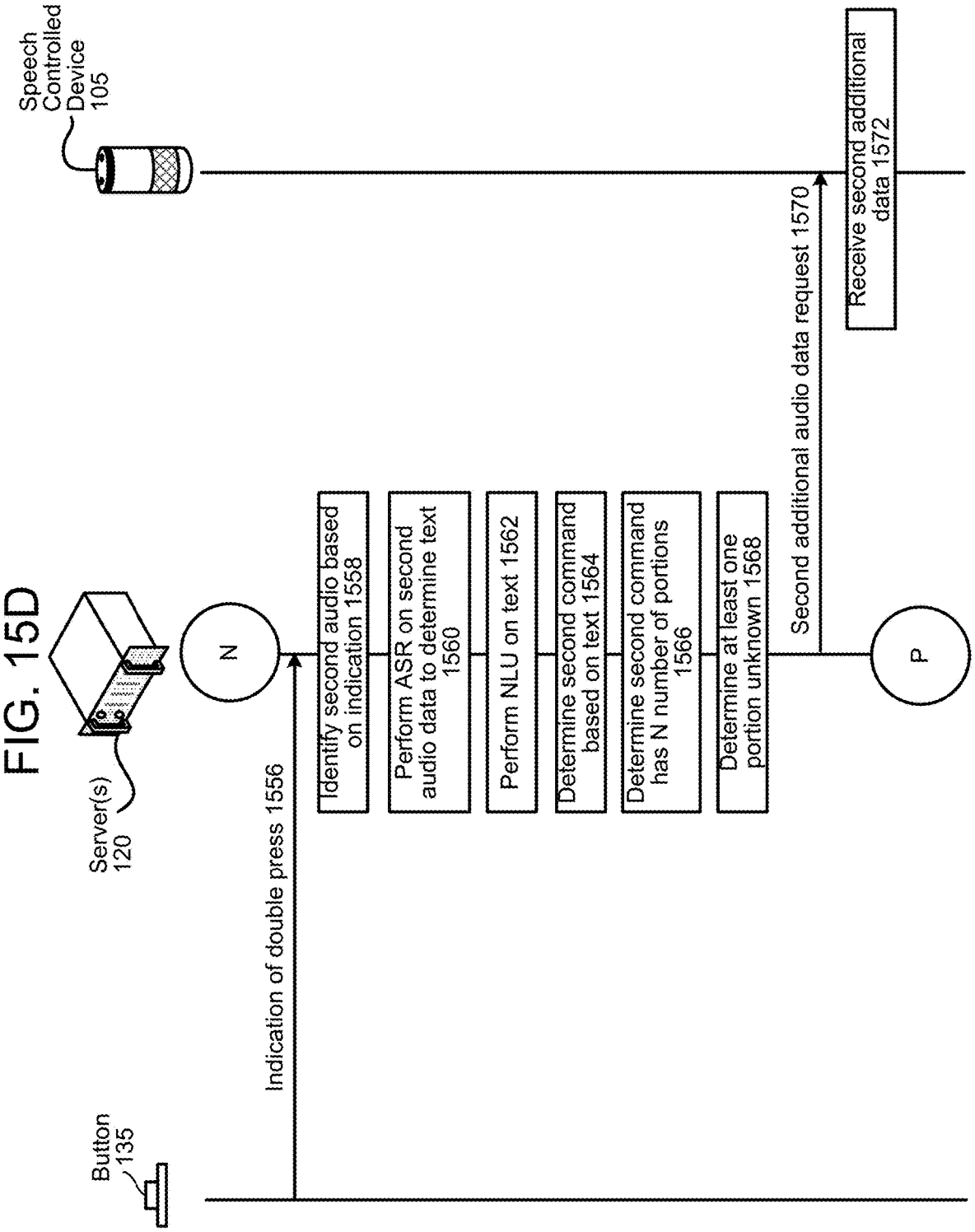

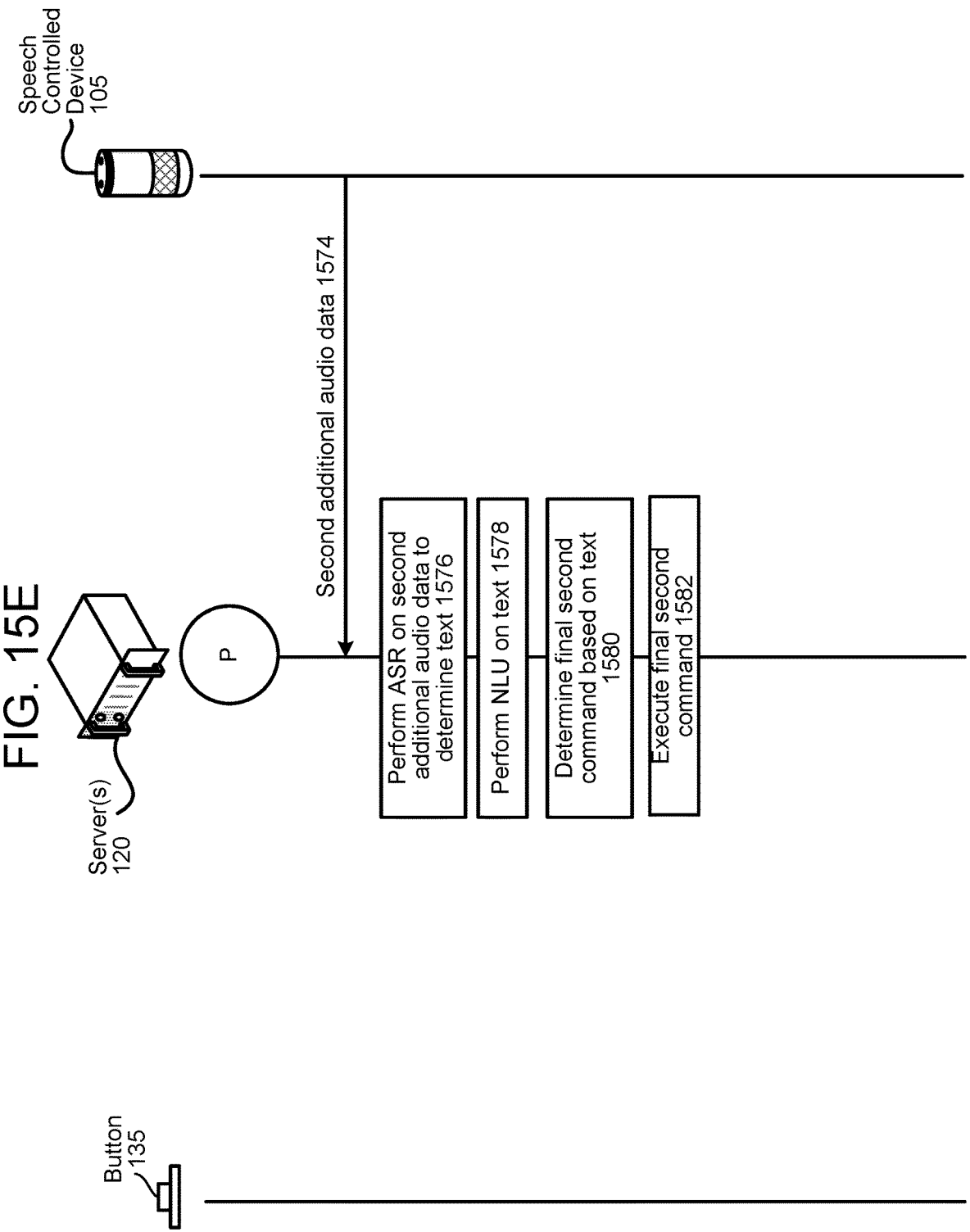

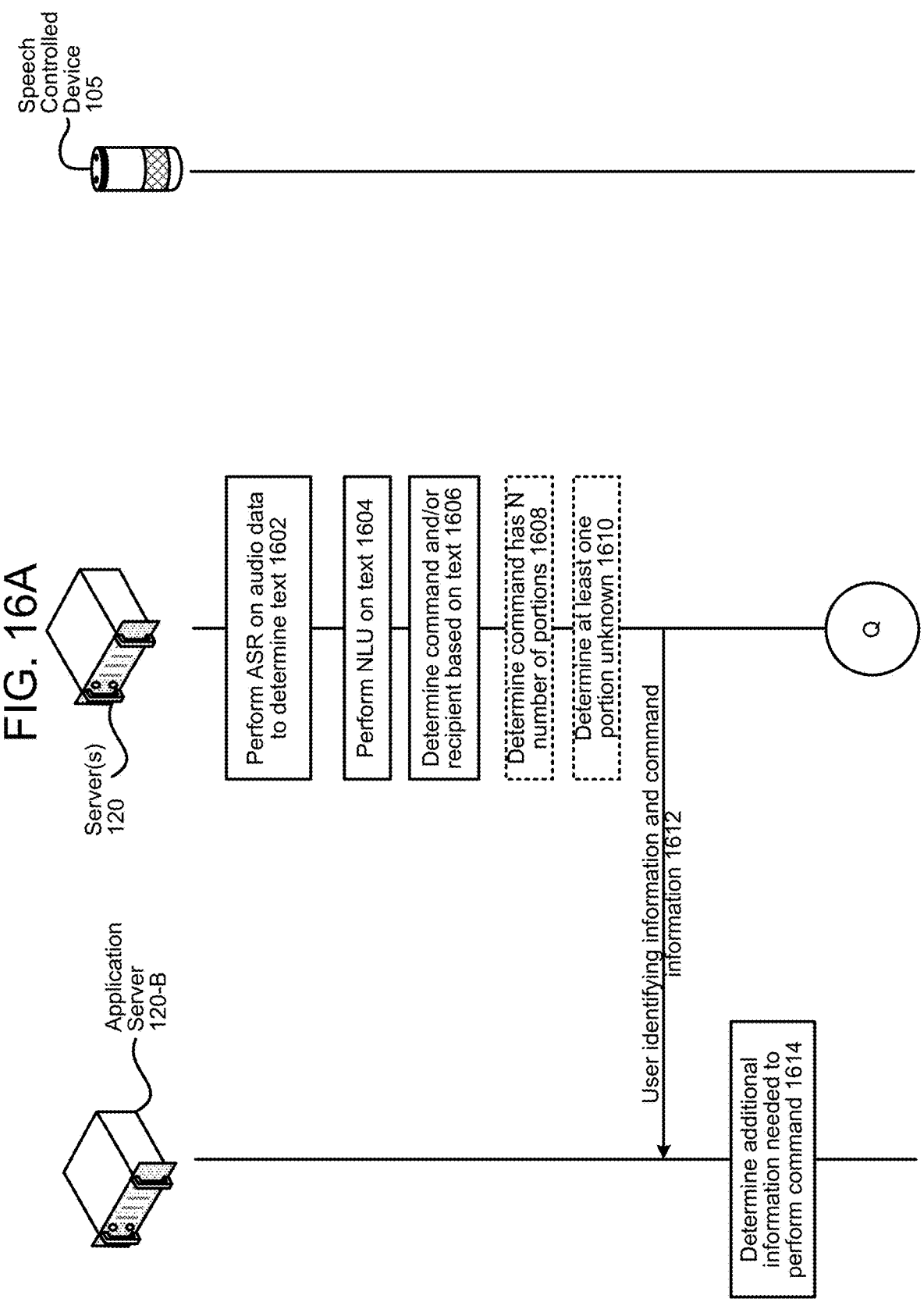

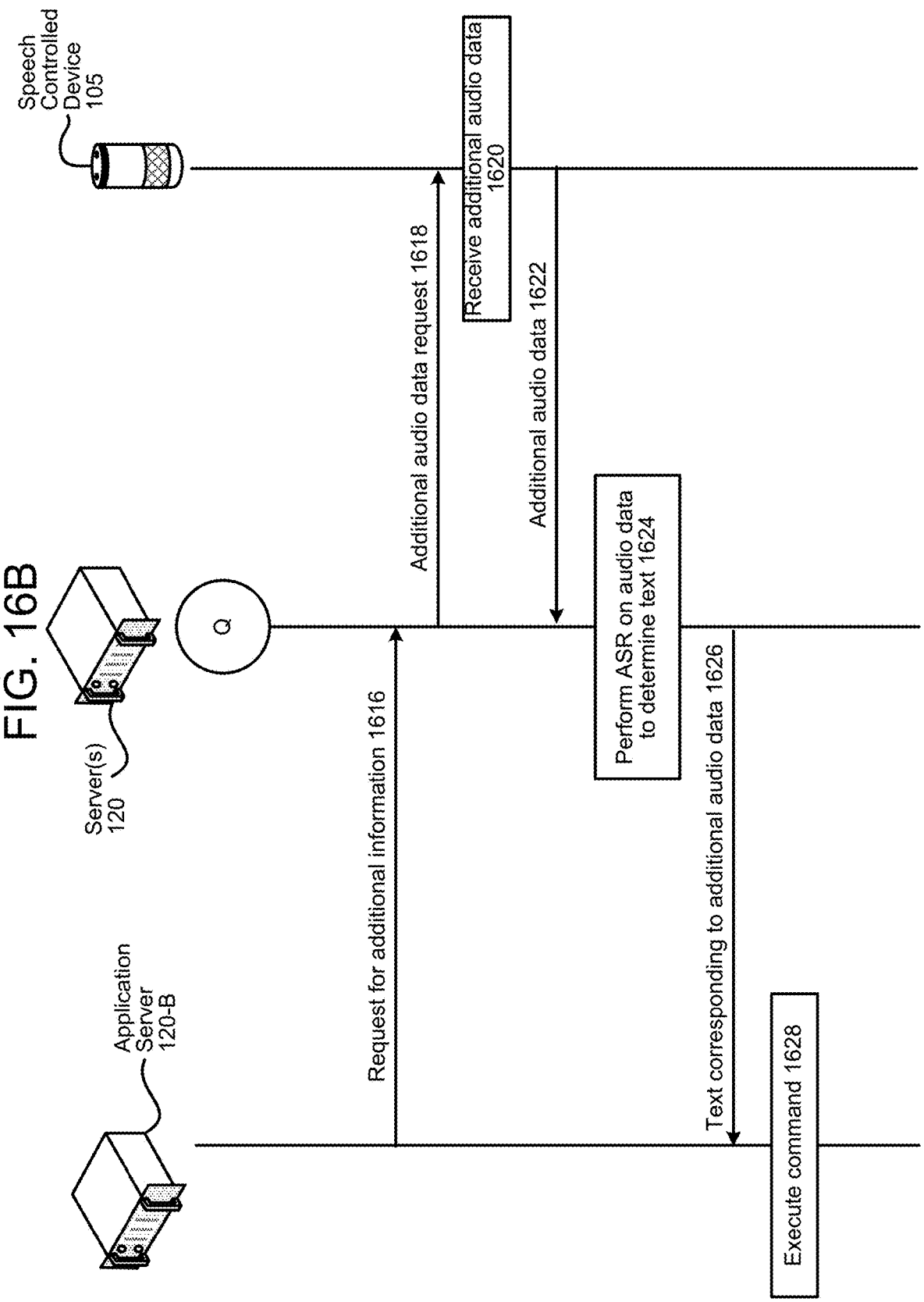

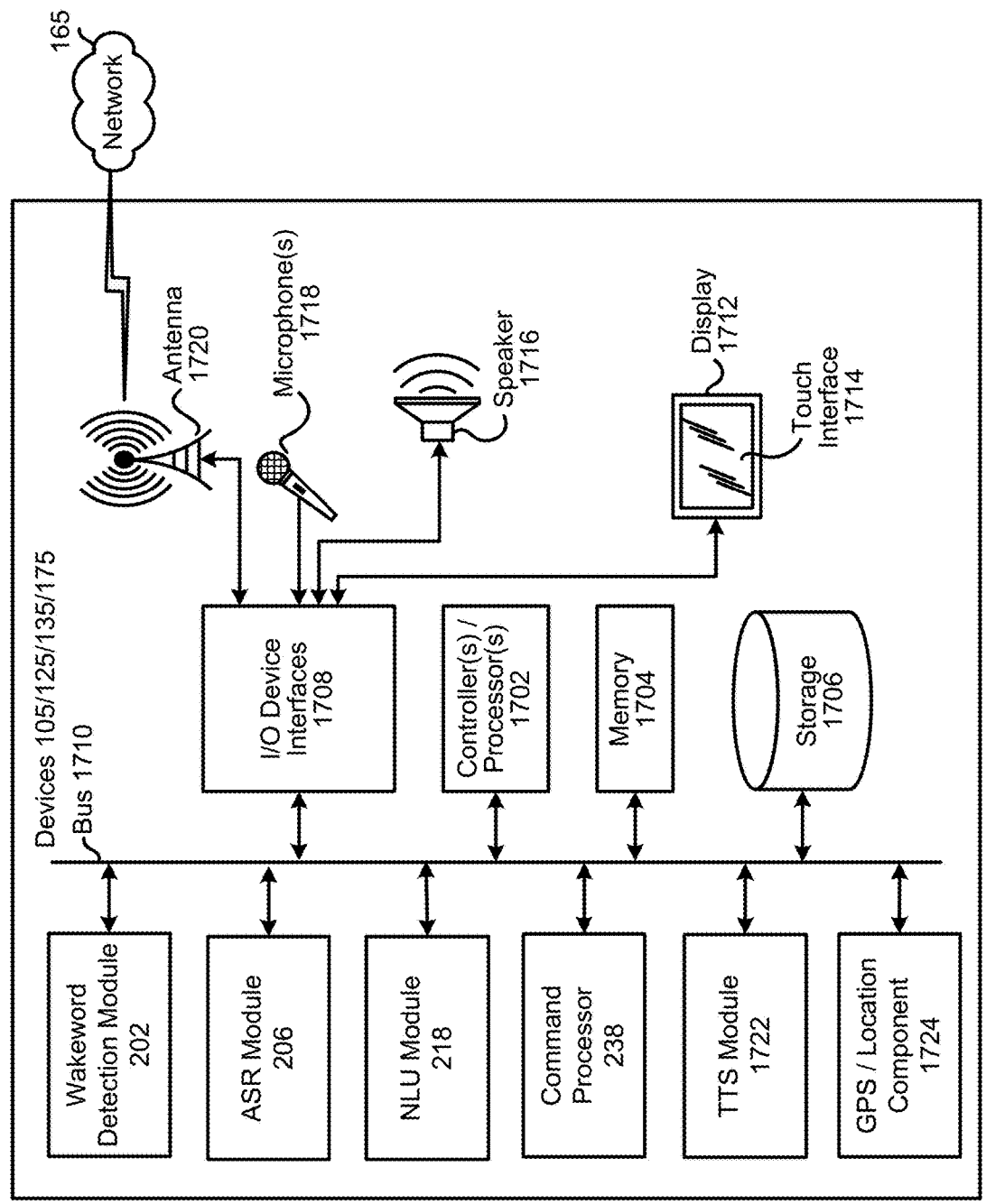

STORING AUDIO COMMANDS FOR TIME-DELAYED EXECUTION

BACKGROUND

Speech recognition systems have progressed to the point where humans can interact with computing devices by relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. Speech processing may also convert a user's speech into text data which may then be provided to various text-based software applications.

BRIEF DESCRIPTION OF DRAWINGS

For a more complete understanding of the present disclosure, reference is now made to the following description taken in conjunction with the accompanying drawings.

FIGS. 1A and 1B illustrate a system for receiving, processing, and executing voice controlled commands according to embodiments of the present disclosure.

FIG. 2 is a conceptual diagram of a speech processing system according to embodiments of the present disclosure.

FIGS. 10A and 10B illustrated storing audio data for later command execution and obtaining additional audio according to embodiments of the present disclosure.

FIGS. 11A through 11C illustrate storing audio data for later command execution and obtaining additional audio according to embodiments of the present disclosure.

FIGS. 12A through 12B illustrate storing audio data for later command execution and obtaining additional audio according to embodiments of the present disclosure.

FIGS. 13A through 13C illustrate storing audio data for later command execution and obtaining additional audio according to embodiments of the present disclosure.

FIGS. 14A through 14E illustrate storing audio data for later command execution and obtaining additional audio according to embodiments of the present disclosure.

FIGS. 15A through 15E illustrate storing audio data for later command execution and obtaining additional audio according to embodiments of the present disclosure.

FIGS. 16A and 16B illustrate storing audio data for later command execution and obtaining additional audio according to embodiments of the present disclosure.

FIG. 17 is a block diagram conceptually illustrating example components of a device according to embodiments of the present disclosure.

DETAILED DESCRIPTION

Figure 3:
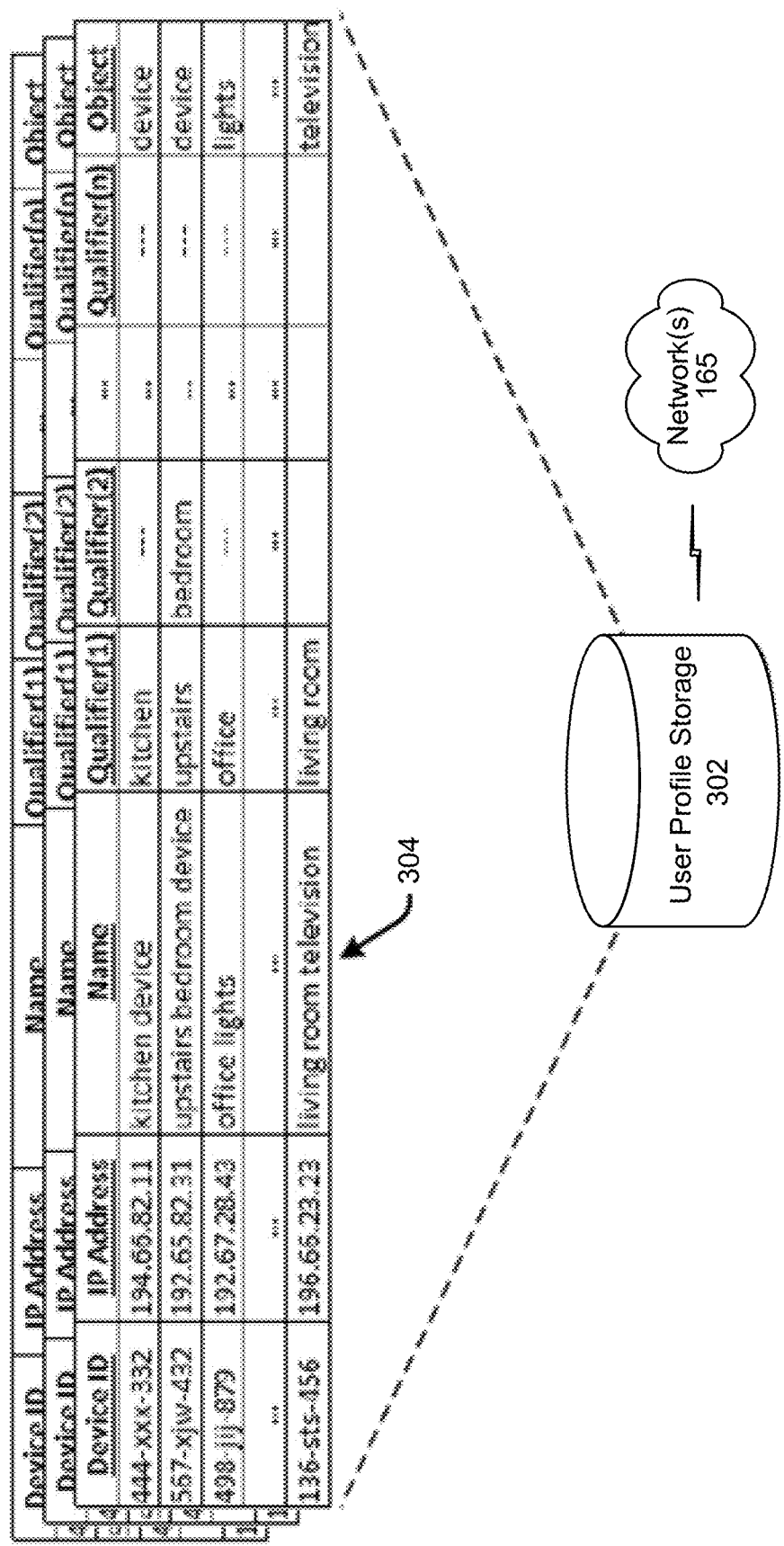
FIG. 3 illustrates data stored and associated with user profiles according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used when performing speech processing. A typical such distributed environment may involve a local device having one or more microphones being configured to capture sounds from a user speaking and convert those sounds into an audio signal. The audio signal/data may then be sent to a downstream remote device for further processing, such as converting the audio signal into an ultimate command. The command may then be executed by a combination of remote and local devices depending on the command itself.

In certain instances, it may be desirable for a user to be able to have the system execute a frequently used spoken command without the user having to speak the command each time the user desires the system to actually execute the command. The present disclosure generally provides systems including physical devices, such as button and switches, that can store audio corresponding to a user's desired spoken command. The user can speak a command to the physical device, which will then store the audio for later sending to the system. For example, a user can long-press a button and speak a command, while the button device records the user's utterance for later playback. When another interaction is performed on the physical device (such as a quick press on a button), the device may send the stored audio to a server for processing to determine and execute a command associated with the audio. Thus, each time the user wishes to execute the specific customized command (e.g., turn on living room lights, order a pizza, play classical music, etc.) all the user needs to do is push the button, and audio corresponding to the command is sent to the server for execution. Each device may store multiple audio data corresponding to multiple commands, and each piece of audio data corresponding to a command may be associated with a specific physical operation of a device. For example, a button may have multiple press-types (quick press, double press, triple press, etc.) or a touch pad may have an up-swipe, down-swipe, etc. where each physical operation is associated with a different stored audio. If audio data is determined as corresponding to a multiple-input command (i.e., a command that requires multiple data items in order to execute), additional information needed to execute the command may be gathered from a user using speech-controlled interactions of the system.

With reference to FIGS. 1A and 1B, a system 100 for receiving, processing, and executing voice controlled commands according to embodiments of the present disclosure is described. As shown in FIG. 1A, a system 100 may be configured to create and execute a command based on received audio data. An example arrangement of system components is shown in FIG. 1B. As shown, a physical object, such as a button 135 or switch 125 is connected over a network 165 to one or more servers 120. The button 135 and switch 125 may be configured to receive and store audio 11 spoken by a user 5. The button 135 and/or the switch 125 may be configured to receive the audio 11 through microphones implemented within the button 135 and/or switch 125, respectively. Alternatively, the button 135 and/or switch 125 may receive the audio 11 from one or more distributed microphone arrays 145, which contain at least one microphone 155 configured to receive spoken audio. For example, the button 135 may be configured to receive and store the audio 11 when the button 135 experiences a first physical interaction, such as a press-and-hold interaction (i.e., the button is pressed and held for a threshold period of time). Further, the button 135 and/or the switch 125 (or a device attached thereto) may be configured to store audio received from a companion application run on another device, such as a smart device 175, such as a smart phone or tablet. In such an example, the speech-controlled device 105 or the smart device 175 may receive the spoken audio 11 and send it as audio data to the button 135 and/or switch 125 for storage.

As further shown, the smart device 175 is connected over the network 165 to one or more servers 120. The smart device 175 may also be configured to receive and store audio 11 spoken by a user 5. The smart device 175 may display a virtual button on a touchpad of the smart device 175. The smart device 175 may be configured to receive spoken audio 11 when the virtual button experiences a press and hold operation performed by a user 5. Alternatively, audio 11 may be received by various components of the system 100 as described herein above with respect to FIGS. 1A and 1B and stored as audio data in a remote storage, such as in the server(s) 120.

In an example, the button 135 may be configured in a way that does not allow the button 135 to capture audio (i.e., the button 135 does not have a microphone). In this example, audio may be received and stored by the smart device 175, which may be running a companion application to the button 135. When the button 135 is physically interacted with, the button 135 may send an indication of the physical interaction to the smart device 175, which causes the smart device 175 to identify audio data, stored thereon, corresponding to the physical interaction and send the audio data to the server 120 for further processing. Further, when the button 135 is physically interacted with, the button 135 may send an indication of the physical interaction to the server 120. The server 120 may identify the smart device 175 identified with the button 135 via a user profile and send a signal identifying the physical interaction to the smart device 175, which causes the smart device 175 to identify audio data, stored thereon, corresponding to the physical interaction and send the audio data to the server 120 for further processing.

In yet another example, if the button 135 is not configured to capture audio, audio may be received by the speech-controlled device 105, and transmitted as audio data from the speech-controlled device 105 to the server 120 where the audio data is stored. The speech-controlled device 105 may (e.g., after receiving an indication from the server 120 that the audio data was stored) audibly output a confirmation/acknowledgement indicating the audio data was stored. That stored audio may be activated by a later push by the button 135.

The received audio may include information corresponding to one or more commands. When the audio is stored as audio data, the audio data may be associated with a specific physical interaction. For example, a push operation of the button 135 (or virtual button of the smart device 175) may correspond to audio data of a first command and a double push operation of the button 135 (or audio button of the smart device 175) may correspond to audio data of a second command. In another example, a first orientation of the switch 125 may correspond to audio data of a first command and a second orientation of the switch 125 may correspond to audio data of a second command. In yet another example, a first direction operation (such as an up swipe) performed on a touchpad of the smart device 175 may correspond to audio data of a first command, a second direction operation (such as a down swipe) performed on a touchpad of the smart device 175 may correspond to audio data of a second command, etc.

For example, a first physical interaction may correspond to a command of turning on lights in a room and a second physical interaction may correspond to a command of turning off lights in the room. In another example, a first physical interaction may correspond to commands of turning on lights and a television of the establishment and a second physical interaction may correspond to commands of turning off lights of an establishment, turning off a television of the establishment, and locking the doors of the establishment. In a further example, a physical interaction may correspond to a command of calling a taxi. Many such options are available, depending on commands that are executable by the system 100. As such, it should be appreciated that the audio data corresponding to one or more commands of the present disclosure may include information identifying the action to be performed, and optionally substantive information such as a location/identity of an object to be executed upon (or other information needed to execute the command).

If audio data is stored on the button 135, switch 125, or smart device 175, audio data corresponding to a performed physical interaction is sent to the server 120 upon the physical interaction by the user. Alternatively, if audio data is stored at the server 120, an indication corresponding to a performed physical interaction is sent to the server 120, and the server 120 identifies corresponding audio data stored in the server 120. Thus the audio data may be stored locally to a particular device (e.g., button 135, switch 125, etc.) or may be stored remotely by a server 120.

As discussed above, each portion of audio data may correspond to one or more commands. In this situation, once audio data is known by the server 120 (either directly received from a device or identified based on a received indication), the server 120 processes the audio data to determine a corresponding command, and executes the command using various speech processing techniques (ASR, NLU, etc.) described below.

According to the present disclosure, a command may alternatively correspond to a multiple-input command (i.e., a command that requires two or more pieces of information be known in order for the server 120 to execute the command). The audio data corresponding to a command associated with a performed physical interaction may be identified by the server 120 as corresponding to a multiple-input command. Such identification may involve the server 120 using the audio data to access a lookup table containing commands with what input data is needed to execute such command. Moreover, the server 120 may also determine that some pieces of the information required for execution of the command may be missing from the audio data. When this occurs, the server 120 may attempt to obtain the missing data (for example, a missing date may default to a current day) and/or the server 120 may communicate with a speech-controlled device 105 through the network 165 to obtain the missing data. For example, the speech-controlled device 105 may output audio to the user 5 via a speaker 101 of the speech-controlled device 105, and the speech-controlled device 105 may receive spoken audio 11 from the user 5 via a microphone(s) 103 of the speech-controlled device 105 where the new spoken audio 11 corresponds to the missing information. Alternatively, the speech-controlled device 105 may receive audio data from an associated, but detached, microphone array 145, which receives spoken audio 11 from the user 5 via a microphone(s) 155 of the microphone array 145. This allows the speech-controlled device 105 to perform an exchange with the user 5 to obtain remaining audio data needed to execute the command. Once the remaining audio data is obtained, the speech-controlled device 105 sends the audio data to the server 120, the server 120 processes the audio data, and the server 120 executes the command.

More than one piece of information may be missing from the originally stored audio data corresponding to a multiple-input command. It should be appreciated that a single speech-controlled device 105 may obtain all of the missing information. Alternatively, more than one speech-controlled device 105 may be used to obtain all of the missing information. For example, a first speech-controlled device 105 may obtain a first portion of the missing information, a second speech-controlled device 105 may obtain a second portion of the missing information, etc., until all of the missing information is obtained. Regardless of the number of speech-controlled devices 105 involved, audio data corresponding to all of the missing information may be sent to the server 120, or multiple pieces of audio data (each corresponding to a portion of the missing information) may be sent to the server 120.

In one example, a physical interaction may correspond to a command for sending a text message, email, or other communication. The originally received and stored audio data may include information regarding a directive to send the communication, but may be missing information such as the recipient of the communication, and the substance of the communication. For example, the user may record audio including "send a text" into button 135. In another example, the originally received and stored audio data may include information regarding a directive to call a taxi, but may be missing information such as the taxi company to call, a pickup time, a pickup location, and a drop-off location. In yet another example, originally received and stored audio data may include information regarding a directive to order a pizza, but may be missing information such as which company to order from, the type of pizza, and a pickup or delivery time. If the system determines information is missing to execute a command, it may execute steps to obtain the missing information.

In one embodiment, the system 100 may use different device proximities to determine how to obtain missing information related to a multiple-input command. If the system includes more than one speech-controlled device 105 that is connected to the server 120 over the network 165, and that is configured to obtain missing information as discussed above, the server 120 may select a specific speech-controlled device 105 to obtain the missing information. For example, when the server 120 determines pieces of information needed to execute the command are missing, the server 120 may cause the physically interacted with device (e.g., the button 135, the switch 125, the smart device 175, etc.) to emit a beacon to determine the proximity of speech-controlled devices 105 with respect to the physically interacted with device. In another example, when the server 120 determines pieces of information needed to execute the command are missing, the server 120 may cause speech-controlled devices 105 (connected to the server 120 over the network 165) to emit beacons/signals that are recognizable by the physically interacted with device to determine proximity of the speech-controlled devices 105 to the physically interacted with device. Once proximity is known, the server 120 may cause a speech-controlled device 105 within a proximity threshold of (e.g., with a same room as) the physically interacted with device to perform an exchange with the user 5 to obtain the missing information. Alternatively, once proximity is known, the server 120 may cause the speech-controlled device 105 closest to the physically interacted with device to perform an exchange with the user 5 to obtain the missing information. For example, referring to FIG. 1B, if the system 100 determines that received audio is associated with the button 135b, the system may initiate an exchange with the user to obtain missing information using the speech-controlled device 105c. Alternatively, if the system determines that received audio is associated with the switch 125a, the system may initiate an exchange with the user to obtain missing information using the speech-controlled device 105b.

Generally, the system 100 is configured to receive an indication of a first physical interaction (illustrated as 150) and store audio data corresponding to a spoken utterance of the user 5 (illustrated as 152). Alternatively, instead of storing audio data corresponding to the spoken utterance (which results in the audio data needed to be processed each time), the spoken utterance may be received, pre-processed, and a command corresponding to the spoken utterance may be stored. This prevents the need to process stored audio data each time the button 135 is interacted with. The system is also configured to receive a second physical interaction (or an indication thereof) from the user 5 (illustrated as 154) and thereafter send stored audio data associated with the second physical interaction (or an indication thereof) to the server 120 (illustrated as 156), which converts the audio data into text (illustrated as 158) and determines a command based on the text (illustrated as 160). If the command is a multiple-input command and information is missing, the missing information is gathered (illustrated as 162). Either after step 160 (if the command is not a multiple-input command and information is not missing) or after step 162, the command is executed (illustrated as 164).

Prior to receiving audio data from the button 135, switch 125, etc., a connection may be established between the button 135, switch 125, etc. with the server 120. For example, the server 120 may validate the button 135, switch 125, etc. (or software running thereon) based on a packet header file of the button 135, switch 125, etc. Moreover, prior to sending audio data to the server 120, the button 135, switch 125, etc. may be configured to receive one or more endpoint commands from the server 120. An endpoint command indicates to the button 135, switch 125, etc. that the server 120 is done interacting with the button 135, switch 125, etc. for with respect to a particular spoken utterance.

Thus, when the user initiates recording of an audio command, such as through a first physical interaction (e.g., long press) with the button 135, the button 135 may enter a recording mode. As the user is speaking the button 135 may send data corresponding to the user's speech to the server 120 for processing. The server 120 may then determine when the user is done speaking and may send a command to the button 135 to then exit the recording mode. The button 135 may then exit the recording mode and store the audio data corresponding to the command.

The system 100 of FIGS. 1A and 1B may operate using various components as illustrated in and described with respect to FIG. 2. FIG. 2 is a conceptual diagram of how a spoken utterance is traditionally processed, allowing a system to capture and output spoken commands via a device. While FIG. 2 illustrates and is described with reference to the button 135, it should be appreciated that such illustration and description is done purely for convenience and brevity. As such, one skilled in the art should appreciate that the teachings of the button 135 described herein with respect to FIG. 2 and subsequent figures may be performed by the switch 125, smart device 175, etc.

The various components illustrated may be located on a same or different physical devices. Communication between various components illustrated in FIG. 2 may occur directly or across the network(s) 165. An audio capture component, such as a microphone of the button 135, captures audio 11 corresponding to a spoken utterance. The button 135 then processes the audio into audio data. Following detection of a physical interaction, the button 135 sends audio data 204, corresponding to the utterance, to the server 120, which includes an ASR module 206. The audio data 204 may be output from an acoustic front end (AFE) 208 located on the button 135 prior to transmission. Alternatively, the audio data 204 may be in a different form for processing by a remote AFE 208, such as the AFE 208 located within the ASR module 206.

Upon receipt by the server(s) 120, an ASR module 206 may convert the audio data 204 into text. The ASR module 206 transcribes audio data into text data representing the words of the speech contained in the audio data. The text data may then be used by other components for various purposes, such as executing system commands, inputting data, etc. A spoken utterance in the audio data 204 is input to a processor configured to perform ASR which then interprets the utterance based on the similarity between the utterance and pre-established language models 210 stored in an ASR model storage 212. For example, the ASR process 206 may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 214 stored in an ASR Models Storage 212), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 206 outputs the most likely text recognized in the audio data. The ASR process may also output multiple hypotheses in the form of a lattice or an N-best list with each hypothesis corresponding to a confidence score or other score (such as probability scores, etc.).

The server(s) 120 performing the ASR processing may include an acoustic front end (AFE) 208 and a speech recognition engine 216. The acoustic front end (AFE) 208 transforms the audio data 204 into data for processing by the speech recognition engine 216. The speech recognition engine 216 compares the speech recognition data with acoustic models 214, language models 210, and other data models and information for recognizing the speech conveyed in the audio data. The AFE 208 may reduce noise in the audio data 204 and divide the digitized audio data 204 into frames representing time intervals for which the AFE 208 determines a number of values, called features, representing the qualities of the audio data 204, along with a set of those values, called a feature vector, representing the features/qualities of the audio data 204 within the frame. Many different features may be determined, as known in the art, and each feature represents some quality of the audio that may be useful for ASR processing. A number of approaches may be used by the AFE 208 to process the audio data 204, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 216 may process the output from the AFE 208 with reference to information stored in the speech/model storage 212. Alternatively, post front-end processed data (such as feature vectors) may be received by the device executing ASR processing from another source besides the internal AFE 208. For example, the button 135 may process the audio data 204 into feature vectors (for example using an on-device AFE 208) and transmit that information to the server 120 across the network 165 for ASR processing. Feature vectors may arrive at the server 102 encoded, in which case they may be decoded prior to processing by the processor executing the speech recognition engine 216.

The speech recognition engine 216 attempts to match received feature vectors to language phonemes and words as known in the stored acoustic models 214 and language models 210. The speech recognition engine 216 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 216 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 216 to other processing components, which may be local to the device performing ASR and/or distributed across the network(s) 165. For example, ASR results in the form of a single textual representation of the speech, an N-best list including multiple hypotheses and respective scores, lattice, etc. may be sent to a server, such as the server 120, for natural language understanding (NLU) processing 218, such as conversion of the text into commands for execution by the server 120, or by another device (such as a server running a specific application like a search engine, etc.).

The device performing the NLU processing 218 (e.g., the server 120) may include various components, including potentially dedicated processor(s), memory, storage, etc. A device configured for NLU processing 216 may include a named entity recognition (NER) module 220 and an intent classification (IC) module 222, a result ranking and distribution module (not illustrated), and a knowledge base 224. The NLU process 218 may also utilize gazetteer information (226a-226n) stored in an entity library storage 228. The gazetteer information (226a-226n) may be used for entity resolution, for example matching ASR results with different entities (such as song titles, contact names, etc.). Gazetteers may be linked to users (for example a particular gazetteer may be associated with a specific user's music collection), may be linked to certain domains (such as shopping), or may be organized in a variety of other ways.

The NLU process 218 takes textual input (such as processed from ASR 206 based on the utterance 11) and attempts to make a semantic interpretation of the text. That is, the NLU process 218 determines the meaning behind the text based on the individual words and then implements that meaning. NLU processing 218 interprets a text string to derive an intent or a desired action from the user as well as the pertinent pieces of information in the text that allow a device (e.g., the device 105) to complete that action. For example, if the spoken utterance 11 is processed using ASR 206 and outputs the text "call mom" the NLU process 218 may determine that the user intended to activate a telephone in his/her device and to initiate a call with a contact matching the entity "mom."

The NLU 218 may process several textual inputs related to the same utterance. For example, if the ASR 206 outputs N text segments (as part of an N-best list), the NLU 218 may process all N outputs to obtain NLU results.

The NLU process 218 may be configured to parse and tag to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 218 may be configured to determine a "domain" of the utterance so as to determine and narrow down which services offered by the server 120 may be relevant. For example, the server 120 may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 220 receives a query in the form of ASR results and attempts to identify relevant grammars and lexical information that may be used to construe meaning. To do so, the name entity recognition module 220 may begin by identifying potential domains that may relate to the received query. The NLU knowledge base 224 includes a database(s) of devices (230a-230n) identifying domains associated with specific devices. For example, the device 105 may be associated with domains for music, telephony, calendaring, contact lists, and device-specific communications, but not video. In addition, the entity library 228 may include database entries about specific services on a specific device, either indexed by Device ID, User ID, Household ID, or some other indicator.

A domain may represent a discrete set of activities having a common theme, such as "shopping", "music", "calendaring", etc. As such, each domain may be associated with a particular language model and/or grammar database (232a-232n), a particular set of intents/actions (234a-234n), and a particular personalized lexicon (236). Each gazetteer (226a-226n) may include domain-indexed lexical information associated with a particular user and/or device. For example, the Gazetteer A (226a) includes domain-index lexical information 236aa to 236an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains being ordinarily selected to be the correct result.

An intent classification (IC) module 222 parses the query to determine an intent or intents for each identified domain, where the intent corresponds to the action to be performed that is responsive to the query. Each domain is associated with a database (234a-234n) of words linked to intents. For example, a music intent database may link words and phrases such as "quiet," "volume off," and "mute" to a "mute" intent. The IC module 222 identifies potential intents for each identified domain by comparing words in the query to the words and phrases in the intents database 234.

In order to generate a particular interpreted response, the NER 220 applies the grammar models and lexical information associated with the respective domain. Each grammar model 232 includes the names of entities (i.e., nouns) commonly found in speech about the particular domain (i.e., generic terms), whereas the lexical information 236 from the gazetteer 226 is personalized to the user(s) and/or the device. For instance, a grammar model associated with the shopping domain may include a database of words commonly used when people discuss shopping.

The intents identified by the IC module 222 are linked to domain-specific grammar frameworks (included in 232) with "slots" or "fields" to be filled. For example, if "play music" is an identified intent, a grammar (232) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 220 may parse the query to identify words as subject, object, verb, preposition, etc., based on grammar rules and models, prior to recognizing named entities. The identified verb may be used by the IC module 222 to identify intent, which is then used by the NER module 220 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 220 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 222 will determine corresponds to the "play music" intent. No determination has been made as to the meaning of "mother's little helper" and "the rolling stones," but based on grammar rules and models, it is determined that these phrases relate to the grammatical object of the query.

The frameworks linked to the intent are then used to determine what database fields should be searched to determine the meaning of these phrases, such as searching a user's gazetteer for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 220 may search the database of generic words associated with the domain (in the NLU's knowledge base 224). So for instance, if the query was "play songs by the rolling stones," after failing to determine an album name or song name called "songs" by "the rolling stones," the NER 220 may search the domain vocabulary for the word "songs." In the alternative, generic words may be checked before the gazetteer information, or both may be tried, potentially producing two different results.

The comparison process used by the NER module 220 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER module 220 may also use contextual operational rules to fill slots. For example, if a user had previously requested to pause a particular song and thereafter requested the button 135 to "please un-pause my music," the NER module 220 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} Song.

The output from the NLU processing (which may include tagged text, commands, etc.) may then be sent to a command processor 238, which may be located on a same or separate server 120 as part of the system 100. The destination command processor 238 may be determined based on the NLU output. For example, if the NLU output includes a command to play music, the destination command processor 238 may be a music playing application, such as one located on a music playing appliance, configured to execute a music playing command. If the NLU output includes a search request, the destination command processor 238 may include a search engine processor, such as one located on a search server, configured to execute a search command.

The server 120 may also include data regarding user accounts, shown by the user profile storage 302 illustrated in FIG. 3. The user profile storage may be located proximate to server 120, or may otherwise be in communication with various components, for example over network 165. The user profile storage 302 may include a variety of information related to individual users, households, accounts, etc. that interact with the system 100. For illustration, as shown in FIG. 3, the user profile storage 302 may include data regarding the devices associated with particular individual user accounts 304. In an example, the user profile storage 302 is a cloud-based storage. Such data may include device identifier (ID) and internet protocol (IP) address information for different devices as well as names by which the devices may be referred to by a user. Further qualifiers describing the devices may also be listed along with a description of the type of object of the device. For example, user preferences regarding commands can be stored by the server 120. Such user preferences can be used by the server 120 to determine commands associated with physical interactions of a device as described herein. For example, a user profile may describe that a particular physical interaction of a particular networked device corresponds to particular audio data or a particular command. The user profile may also include information about user defaults or other preferred settings or information that may be used to execute a command (be it a single input or multiple input command). Each user profile may include information corresponding to one or more skills activated by particular user and default information for each activated skill. Moreover, each user profile may link different devices to a single user, and may contain information regarding a location of each device is (e.g., living room, office, etc.).

Figure 4:
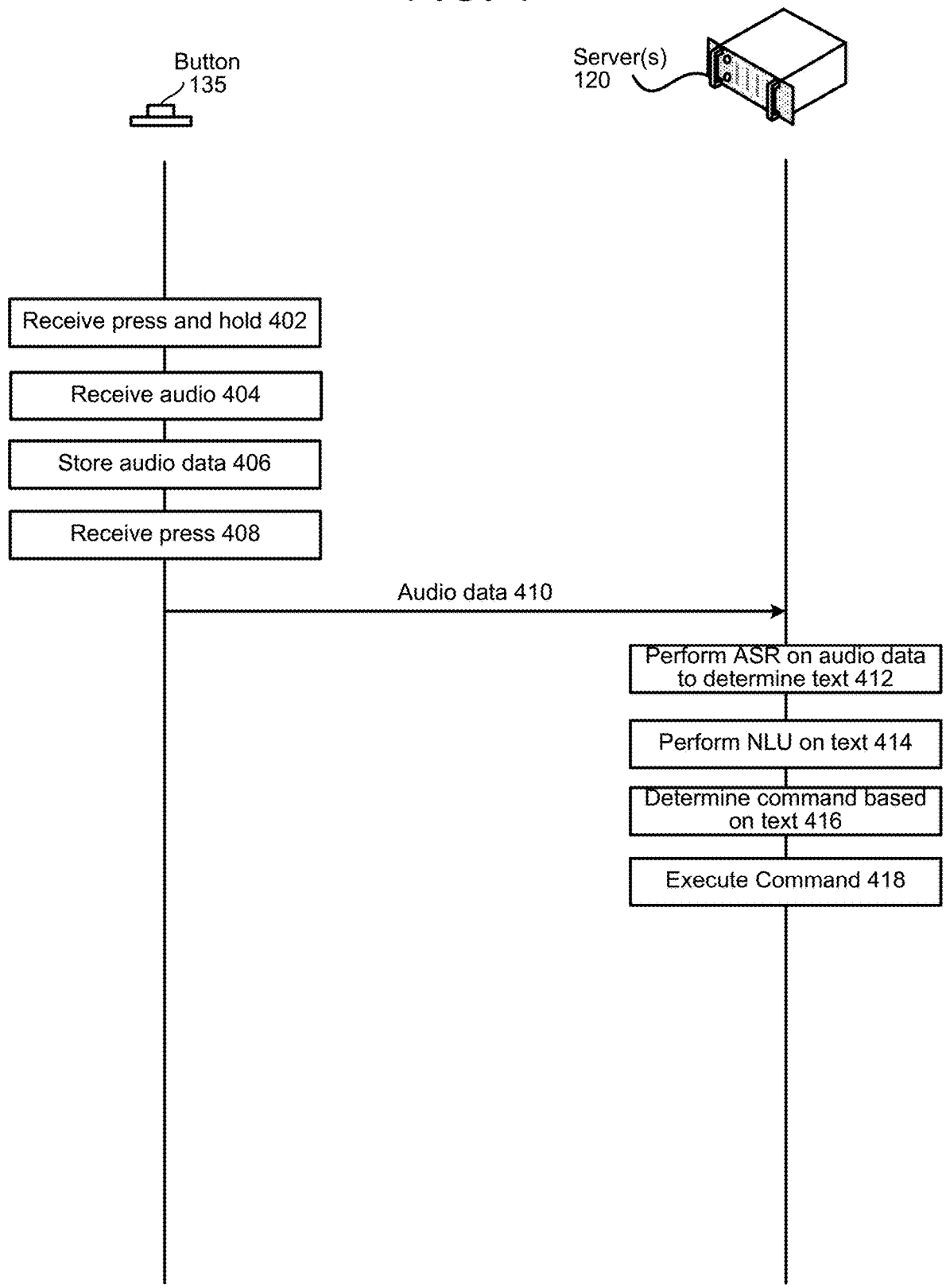
FIG. 4 illustrates storing audio data for later command execution according to embodiments of the present disclosure.

FIG. 4 illustrates an example for storing audio data and later executing a command associated with that audio data. The button 135 receives a physical interaction from a user (e.g., a press and hold interaction that lasts over a threshold amount of time) (illustrated as 402). While the button 135 is interacted with, the button receives spoken audio (illustrated as 404). While not illustrated, it should be appreciated that the button 135 may be configured to continue receiving audio while it is pushed down, and cease receiving audio when the button 135 is released (e.g., when the user no longer holds the button 135 down). The button 135 also stores the audio as audio data (illustrated as 406). The audio data may be stored locally within the button 135 or in another storage that the button 135 is connected to. The audio data may be stored as it is received (i.e., as the user holds down the button and speaks). Alternatively, the audio data may be temporarily stored in a buffer as it is received, and stored in a different memory/storage once the button 135 is no longer physically interacted with (i.e., once the user releases the button 135 and stops talking). When the audio data is stored, the audio data is associated with a specific physical interaction, such as a press of the button 135. When the button 135 is pressed (illustrated as 408), the button 135 send the audio data corresponding to the press to the server 120 (illustrated as 410). The server 120 performs ASR on the audio data to determine text (illustrated as 412), performs NLU on the text (illustrated as 414), determines a command based on the NLU processed text (illustrated as 416), and executes the command (illustrated as 418).

Figure 5:
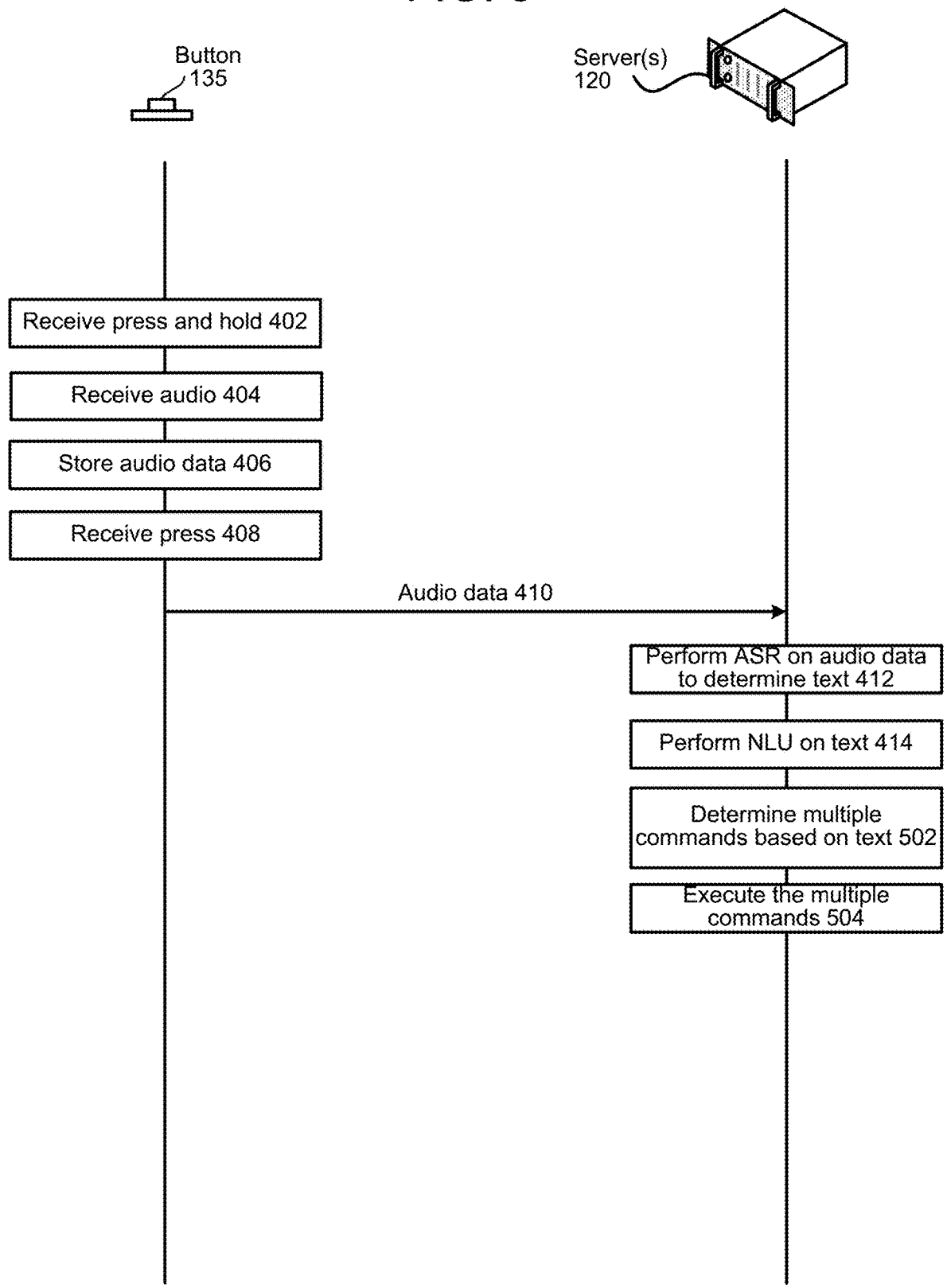
FIG. 5 illustrates storing audio data for later command execution according to embodiments of the present disclosure.

FIG. 5 illustrates an example for storing audio data and later executing commands associated with that audio data. As illustrated, steps 402 through 414 discussed above with respect to FIG. 4 are also performed by the button 135 and server 120 in FIG. 5. Thereafter, in FIG. 5, the server 120 determines the existence of multiple commands based on the NLU processed text (illustrated as 502), and the server 120 executes the commands (illustrated as 504). For example, the audio data may include "turn on the television and the lights," and the system will turn on the television and the lights following processing of the audio data.

Figure 6:
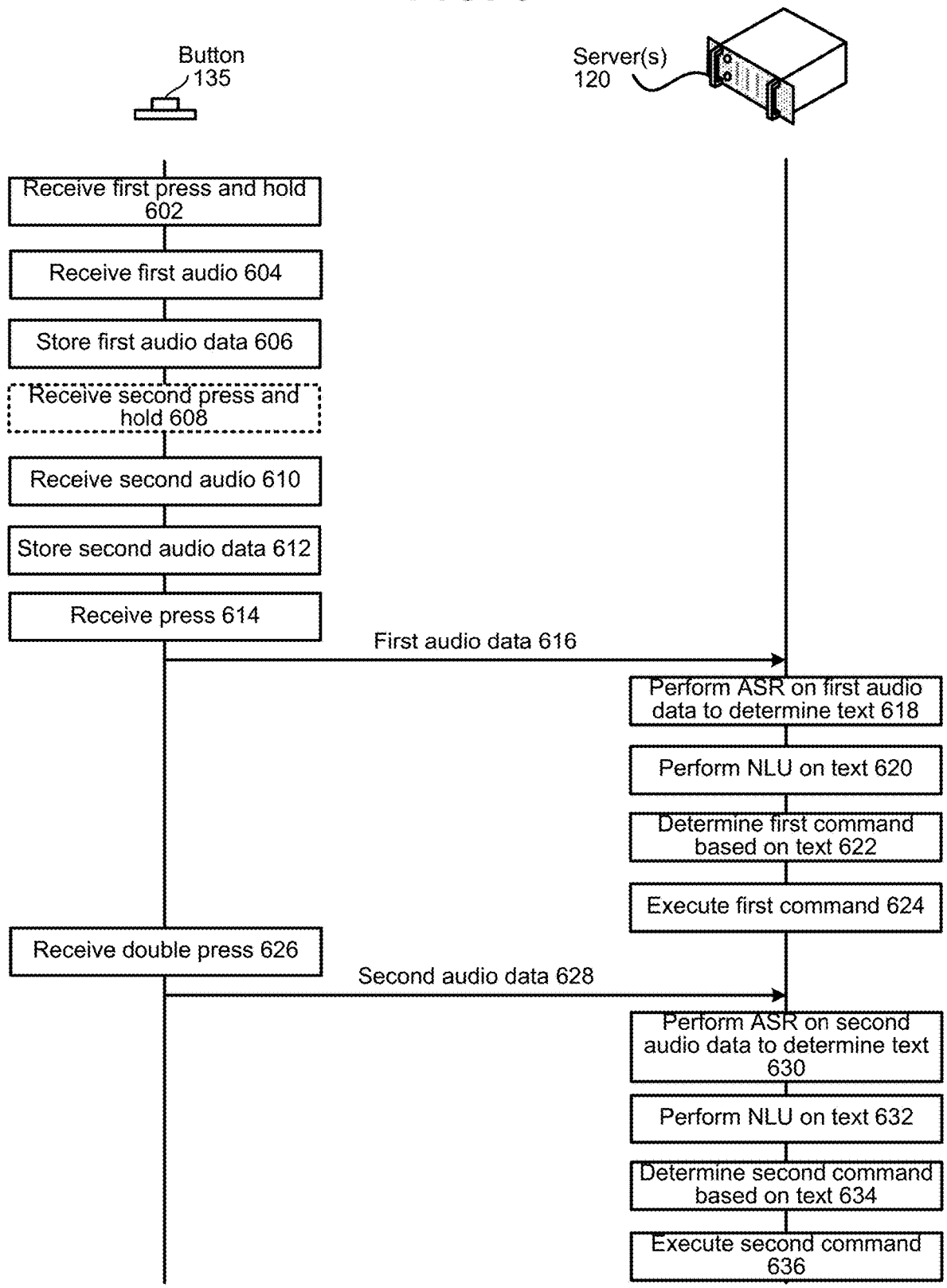
FIG. 6 illustrates storing audio data for executing multiple commands embodiments of the present disclosure.

FIG. 6 illustrates an example for storing audio data and later executing a command associated with that audio data. The button 135 receives a first press and hold interaction (illustrated as 602), which configures the button 135 to receive audio. During the press and hold operation, the button 135 receives first audio (illustrated as 604) and, thereafter or simultaneously, stores audio data corresponding to the first audio (illustrated as 606). For example, the audio data may be stored either while the button 135 receives the first audio or after the press and hold operation is released. Either during the first press and hold operation, or during an optional second press and hold operation (illustrated as 608), the button 135 receives second audio (illustrated as 610). As with the first audio, the button 135 may store second audio data while the button 135 receives either the first or second press and hold operation, or the button 135 may store the second audio data after the first or second (depending upon implementation) press and hold operation is released (illustrated as 612). When the button 135 receives a physical interaction occurring over a lesser time frame than the press and hold operation (e.g., the button 135 experiences a press operation) (illustrated as 614), the button 135 sends audio data corresponding to the press operation (e.g., the first audio data) to the server 120 (illustrated as 616). The server 120 performs ASR on the first audio data to determine text (illustrated as 618), performs NLU on the text (illustrated as 620), determines a first command based on the NLU processed text (illustrated as 622), and executes the first command (illustrated as 624).

When the button 135 receives a second physical interaction occurring over a lesser time frame than the press and hold operation (e.g., the button 135 experiences a double press operation, where two short presses are received in rapid succession) (illustrated as 626), the button 135 sends audio data corresponding to the double press operation (e.g., the second audio data) to the server 120 (illustrated as 628). The server 120 performs ASR on the second audio data to determine text (illustrated as 630), performs NLU on the text (illustrated as 632), determines a second command based on the NLU processed text (illustrated as 634), and executes the second command (illustrated as 636).

Figure 7:
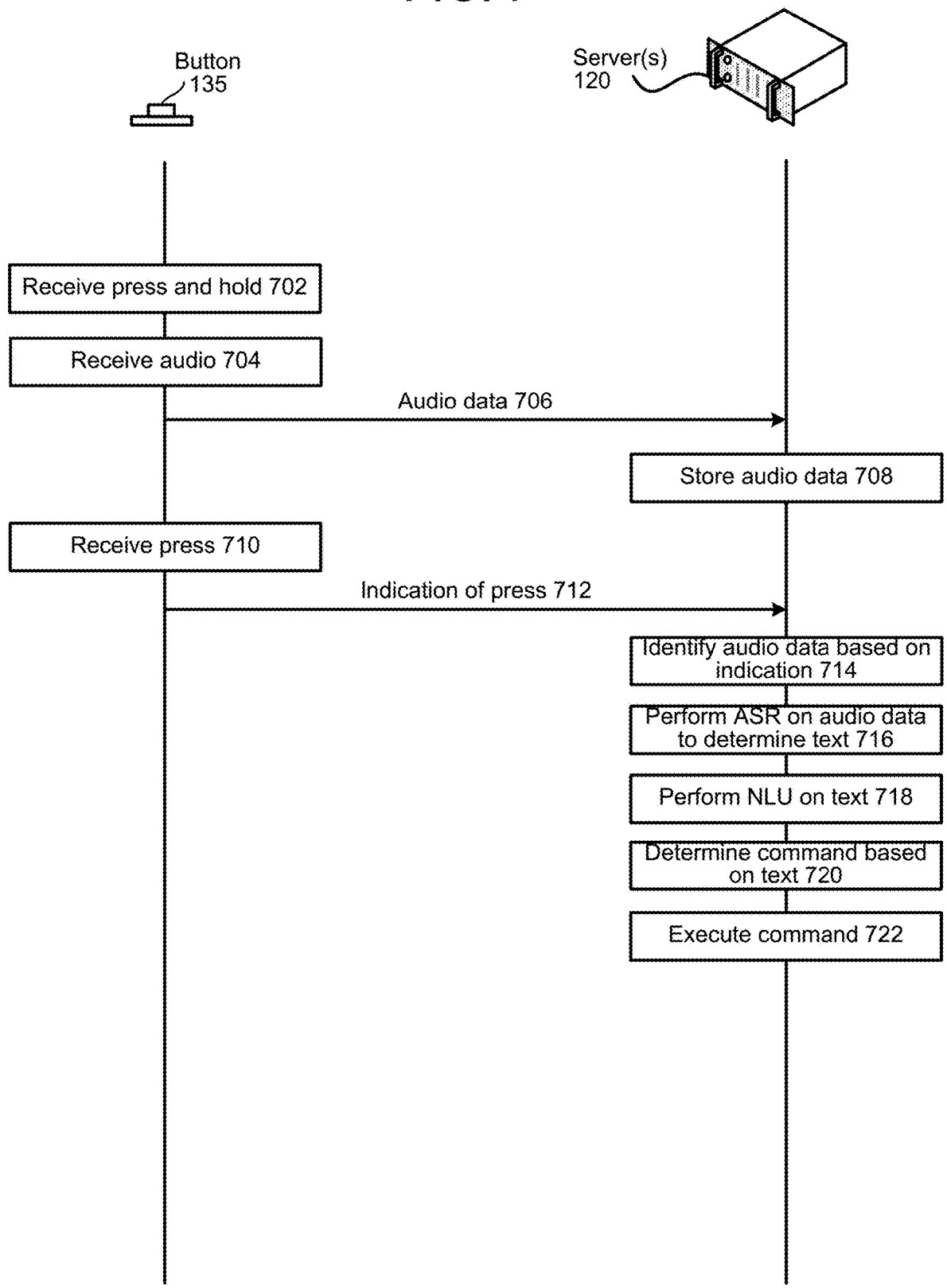
FIG. 7 illustrates storing audio data for later command execution according to embodiments of the present disclosure.

FIG. 7 illustrates an example for storing audio data and later executing a command associated with that audio data. The button 135 experiences a press and hold operation (illustrated as 702) and receives audio (illustrated as 704). In contrast to the embodiments of FIGS. 4 through 6 described above, the button 135 of FIG. 7 sends the received audio, as audio data, to the server 120 (illustrated as 706) and the server 120 stores the audio data (illustrated as 708). As stored, the audio data is associated with a specific physical interaction of the button 135. When the button 135 experiences a press operation (illustrated as 710), the button 135 sends an indication of the press operation to the server 120 (illustrated as 712). The server 120 then identifies the stored audio data associated with the press indication (illustrated as 714), for example by using an identifier associated with the button 135 (where the identifier is associated with the stored audio data and with the press indication). The server 120 performs ASR on the audio data to determine text (illustrated as 716), performs NLU on the text (illustrated as 718), determines a command based on the NLU processed text (illustrated as 720), and executes the command (illustrated as 722).

Figure 8:
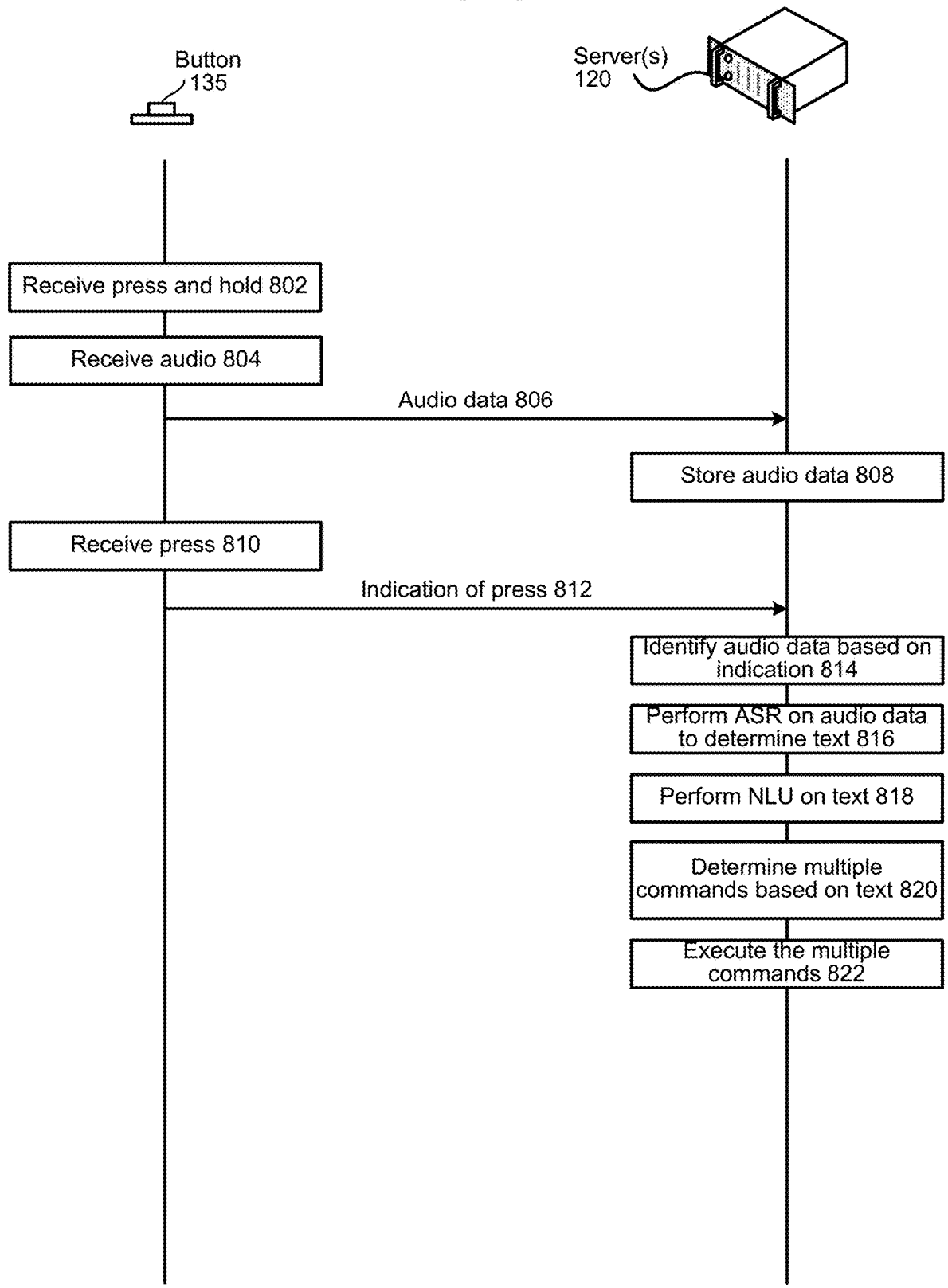
FIG. 8 illustrates storing audio data for later command execution according to embodiments of the present disclosure.

FIG. 8 illustrates an example for storing audio data and later executing commands associated with that audio data. The button 135 receives a press and hold operation (illustrated as 802) and receives audio (illustrated as 804). The button 135 sends the received audio, as audio data, to the server 120 (illustrated as 806) and the server 120 stores the audio data (illustrated as 808). As stored, the audio data is associated with a specific physical interaction of the button 135. When the button 135 experience a press operation (or another operation of shorter duration than the press and hold operation) (illustrated as 810), the button 135 sends an indication of the press operation to the server 120 (illustrated as 812). The server 120 then identifies the stored audio data associated with the press indication (illustrated as 814). The server 120 performs ASR on the audio data to determine text (illustrated as 816), performs NLU on the text (illustrated as 818), determines multiple commands exist within the NLU processed text (illustrated as 820), and executes the commands (illustrated as 822). For example, the audio data may include "turn on the television and the lights," and the system will turn on the television and the lights following processing of the audio data.

Figure 9A:
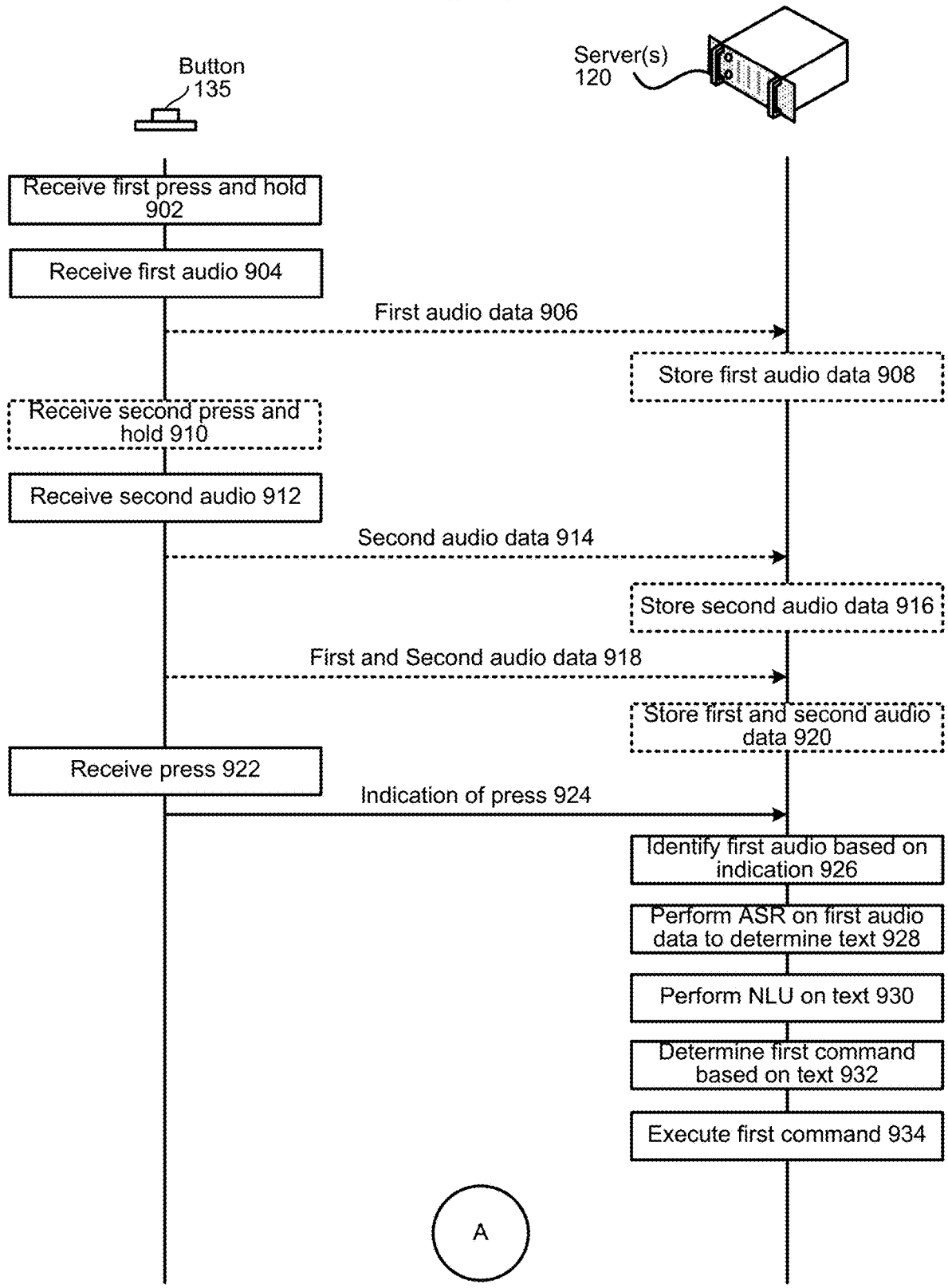
FIGS. 9A and 9B illustrate storing audio data for later command execution according to embodiments of the present disclosure.
Figure 9B:
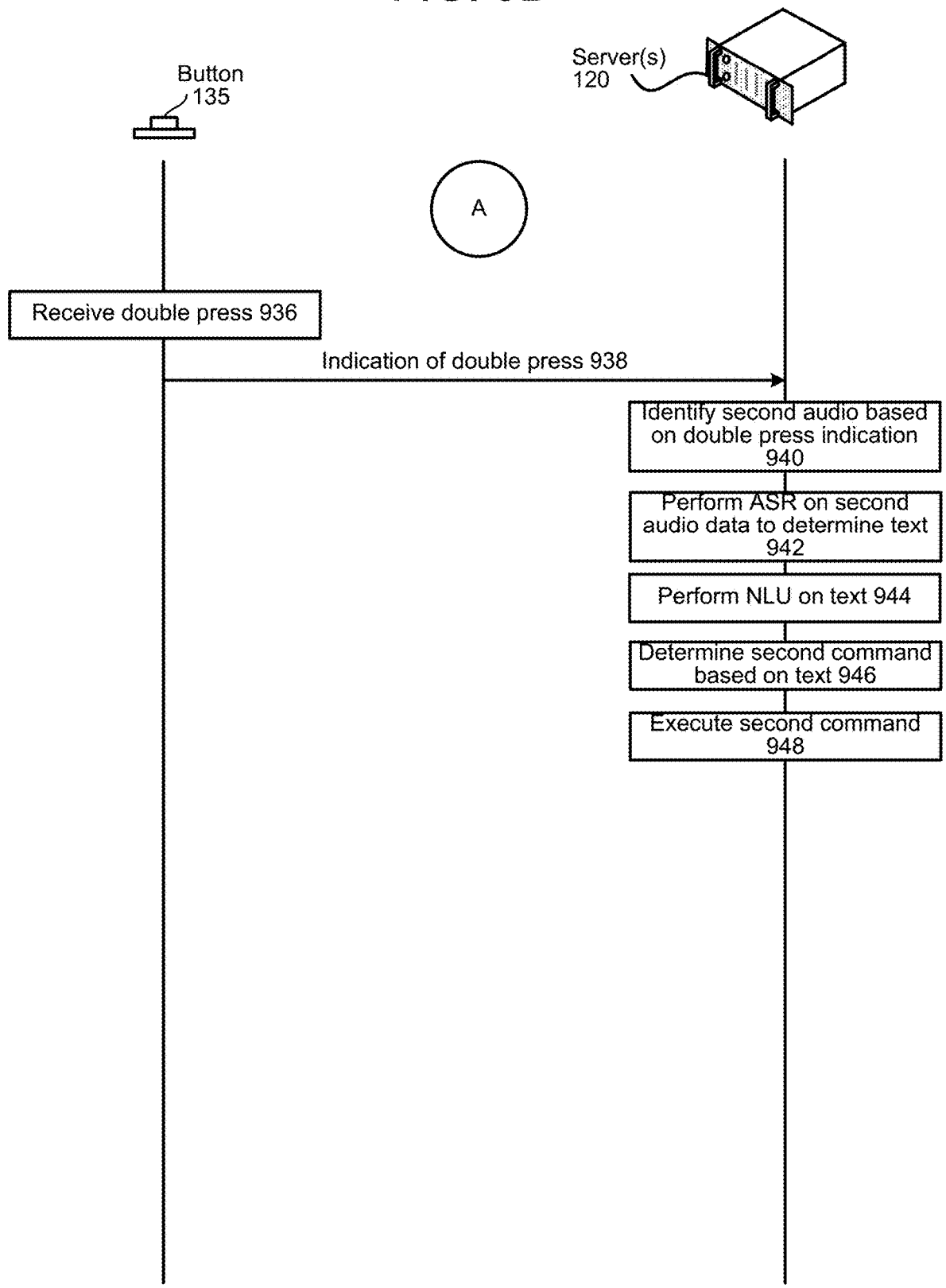

FIGS. 9A and 9B illustrate an example for storing audio data and later executing a command associated with that audio data. The button 135 receives a press and hold operation (illustrated as 902) and receives first audio (illustrated as 904). Optionally, the button 135 may thereafter send first audio data, corresponding to the first audio, to the server 120 (illustrated as 906), and the server 120 may store the first audio data (illustrated as 908), as associated with a first specific physical interaction of the button 135 (such as a press operation). The button 135, either during the first press and hold operation or during an optional second press and hold operation (illustrated as 910), receives second audio (illustrated as 912). If optional steps 906 and 908 were performed, the button 135 may send second audio data, corresponding to the second audio, to the server 120 (illustrated as 914), and the server 120 may store the second audio data (illustrated as 916), as associated with a second specific physical interaction of the button 135 (such as a double press operation). If steps 906, 908, 914, and 916 are not performed, the button 135 may send a single data packet including the first and second audio data to the server 120

(illustrated as 918), and the server 120 may separately store the first and second audio data as associated with first and second physical interactions of the button 135, respectively (illustrated as 920).

When the button 135 receives a first physical interaction of less duration than a press and hold interaction (e.g., a press interaction) (illustrated as 922), the button 135 sends an indication detailing it received the press interaction to the server 120 (illustrated as 924). The server 120 uses information of the press indication to identify audio data (e.g., the first audio data) corresponding to the press indication (illustrated as 926). The server 120 performs ASR on the first audio data to determine text (illustrated as 928), performs NLU on the text (illustrated as 930), determines a command corresponding to the NLU processed text (illustrated as 932), and executes the command (illustrated as 934).

When the button 135 receives a second physical interaction of different duration from a press and hold interaction and a press interaction (e.g., a double press interaction) (illustrated as 936), the button 135 sends an indication detailing it received the double press interaction to the server 120 (illustrated as 938). The server 120 uses information of the double press indication to identify audio data (e.g., the second audio data) corresponding to the press indication (illustrated as 940). The server 120 performs ASR on the second audio data to determine text (illustrated as 942), performs NLU on the text (illustrated as 944), determines a command corresponding to the NLU processed text (illustrated as 946), and executes the command (illustrated as 948).

FIGS. 10A and 10B illustrate an example for storing audio data and later executing a command after obtaining additional audio. The button 135 receives a press and hold operation (illustrated as 1002), receives audio during the press and hold operation (illustrated as 1004), and stores audio data corresponding to the received audio either during or after the press and hold operation (illustrated as 1006). When the button 135 receives a physical interaction of different duration than the press and hold operation (e.g., a press interaction) (illustrated as 1008), the button 135 sends audio data correspond to the received audio to the server 120 (illustrated as 1010). The server 120 performs ASR on the audio data to determine text (illustrated as 1012), performs NLU on the text (illustrated as 1014), and determines a command based on the NLU processed text (illustrated as 1016). The server 120 also determines the command has a number (N) portions of information required for execution of the command (illustrated as 1018), and determines at least one of the required portions is unknown (i.e., the audio data includes only a portion of the required portions needed to execute the command) (illustrated as 1020). The server 120 then sends a request for additional audio data to the button 135 (illustrated as 1022). The server 120 may create text corresponding to the request for additional data, and text-to-speech (TTS) processes may be used to create audio data corresponding to the text. Thus, the request may include audio data. The button 135 may emit an indication that it needs to receive more audio from a user (not illustrated). The emitted indication may be a visual output (e.g., a flashing or lighting up of an LED) or an audible output (e.g., synthesize speech including a question or statement that solicits a verbal response from a user). The button 135 receives a press and hold operation (illustrated as 1024), and during the operation receives additional audio (illustrated as 1026). The button 135 sends audio data corresponding to the additionally received audio to the server 120 (illustrated as 1028). The server 120 performs ASR on the additional audio data to determine text (illustrated as 1030), performs NLU on the text (illustrated as 1032), determines the additional audio data includes the missing, unknown portions of the command (illustrated as 1034), and executes the command (illustrated as 1036).

Figure 11A:
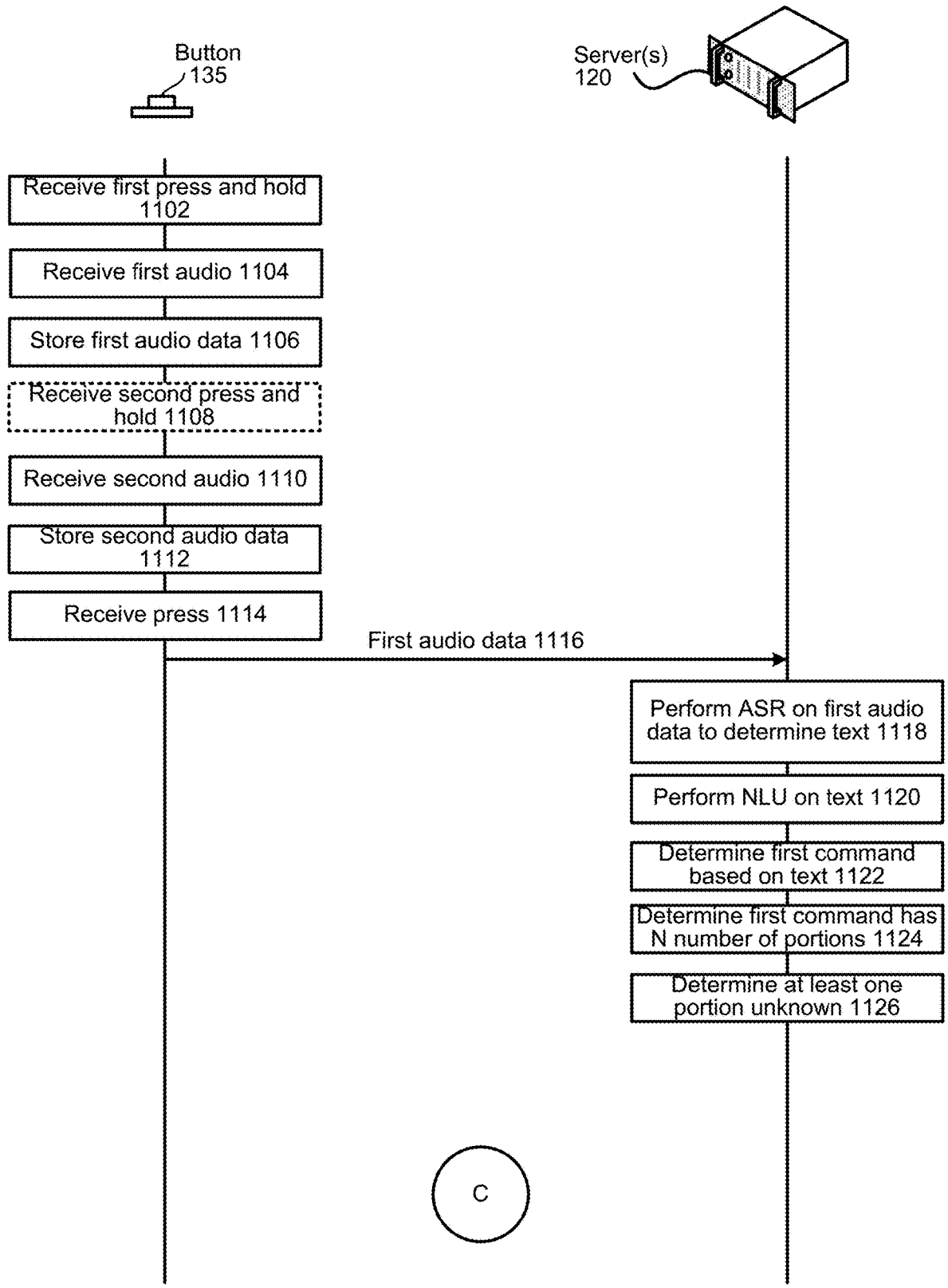
Figure 11B:
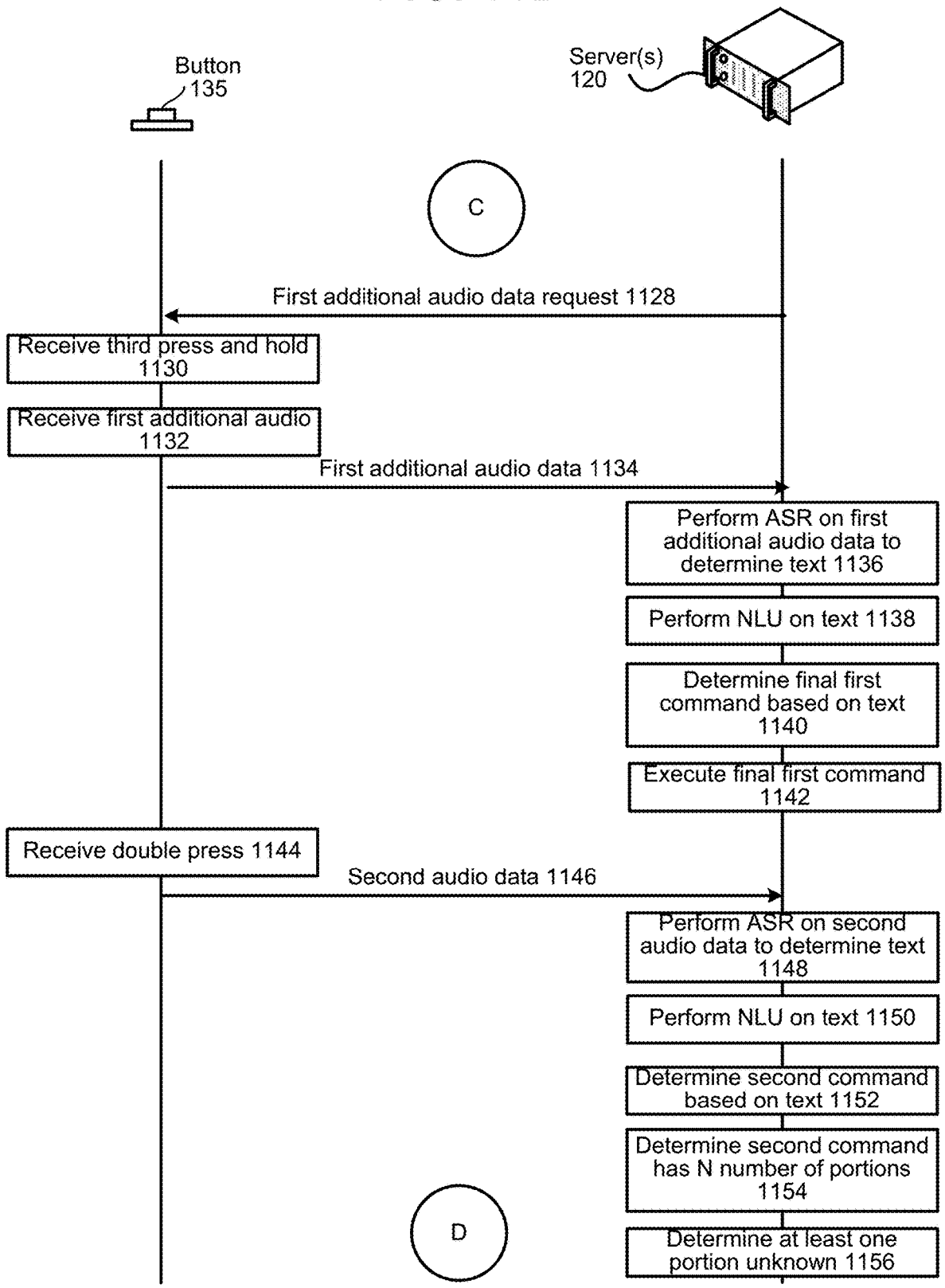

FIGS. 11A through 11C illustrate an example for storing audio data and later executing commands after obtaining additional audio. The button 135 receives a press and hold operation (illustrated as 1102), receives audio during the press and hold operation (illustrated as 1104), and stores audio data corresponding to the received audio either during or after the press and hold operation (illustrated as 1106). During the first press and hold operation, or another press and hold operation (illustrated as 1108), the button 135 receives second audio (illustrated as 1110), and stores second audio data corresponding to the second audio either during or after the first or second press and hold operation (illustrated as 1112). When the button 135 receives a physical interaction of different duration than the press and hold operation (e.g., a press interaction) (illustrated as 1114), the button 135 sends audio data correspond to the first received audio to the server 120 (illustrated as 1116). The server 120 performs ASR on the audio data to determine text (illustrated as 1118), performs NLU on the text (illustrated as 1120), and determines a command based on the NLU processed text (illustrated as 1122). The server 120 also determines the command has a number (N) portions of information required for execution of the command (illustrated as 1124), and determines at least one of the required portions is unknown (i.e., the audio data includes only a portion of the required portions needed to execute the command) (illustrated as 1126). The server 120 then sends a request for additional audio data to the button 135 (illustrated as 1128). The server 120 may create text corresponding to the request for additional data, and text-to-speech (TTS) processes may be used to create audio data corresponding to the text. Thus, the request may include audio data. The button 135 may emit an indication that it needs to receive more audio from a user (not illustrated). The button 135 receives a press and hold operation (illustrated as 1130), and during the operation receives additional audio (illustrated as 1132). The button 135 sends audio data corresponding to the additionally received audio to the server 120 (illustrated as 1134). The server 120 performs ASR on the additional audio data to determine text (illustrated as 1136), performs NLU on the text (illustrated as 1138), determines the additional audio data includes the missing, unknown portions of the command (illustrated as 1140), and executes the multiple-input command (illustrated as 1142).

When the button 135 receives another physical interaction of different duration than the press and hold operation and the press operation (e.g., a double press interaction) (illustrated as 1144), the button 135 sends audio data correspond to the second received audio to the server 120 (illustrated as 1146). The server 120 performs ASR on the audio data to determine text (illustrated as 1148), performs NLU on the text (illustrated as 1150), and determines a command based on the NLU processed text (illustrated as 1152). The server 120 also determines the command has a number (N) portions of information required for execution of the command (illustrated as 1154), and determines at least one of the required portions is unknown (i.e., the audio data includes only a portion of the required portions needed to execute the command) (illustrated as 1156). The server 120 then sends a request for additional audio data to the button 135 (illustrated as 1158). The server 120 may create text corresponding to the request for additional data, and text-to-speech (TTS) processes may be used to create audio data corresponding to the text. Thus, the request may include audio data. The button 135 may emit an indication that it needs to receive more audio from a user (not illustrated). The button 135 receives a press and hold operation (illustrated as 1160), and during the operation receives additional audio (illustrated as 1162). The button 135 sends audio data corresponding to the additionally received audio to the server 120 (illustrated as 1164). The server 120 performs ASR on the additional audio data to determine text (illustrated as 1166), performs NLU on the text (illustrated as 1168), determines the additional audio data includes the missing, unknown portions of the command (illustrated as 1170), and executes the command (illustrated as 1172).

Figure 12A:
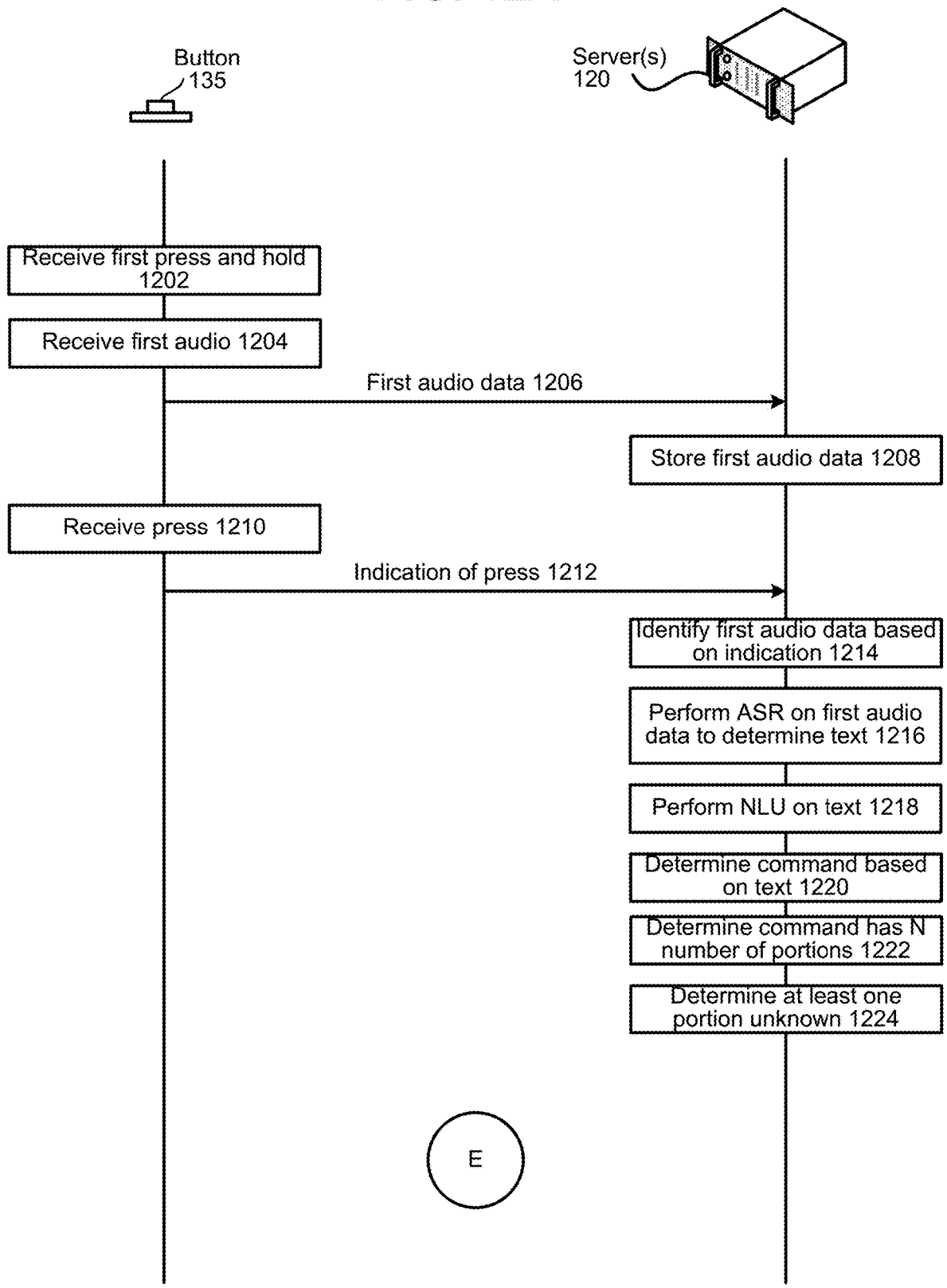

FIGS. 12A through 12B illustrate an example for storing audio data and later executing a command after obtaining additional audio. The button 135 receives a press and hold operation (illustrated as 1202), receives audio during the press and hold operation (illustrated as 1204), and sends audio data corresponding to the received audio to a server 120 (illustrated as 1206). The server 120 stores the audio data and associates it with a specific physical operation of the button 135 (illustrated as 1208). When the button 135 receives a physical operation of different duration than the press and hold operation (e.g., a press operation) (illustrated as 1210), the button sends an indication of the press operation to the server 120 (illustrated as 1212). The server 120 identifies audio data based on information of the press indication (illustrated as 1214), performs ASR on the audio data to determine text (illustrated as 1216), performs NLU on the text (illustrated as 1218), and determines a command based on the NLU processed text (illustrated as 1220). The server 120 also determines the command has a number (N) portions of information required for execution of the command (illustrated as 1222), and determines at least one of the required portions is unknown (i.e., the audio data includes only a portion of the required portions needed to execute the command) (illustrated as 1224). The server 120 then sends a request for additional audio data to the button 135 (illustrated as 1226). The server 120 may create text corresponding to the request for additional data, and text-to-speech (TTS) processes may be used to create audio data corresponding to the text. Thus, the request may include audio data. The button 135 may emit an indication that it needs to receive more audio from a user (not illustrated). The button 135 receives a press and hold operation (illustrated as 1228), and during the operation receives additional audio (illustrated as 1230). The button 135 sends audio data corresponding to the additionally received audio to the server 120 (illustrated as 1232). The server 120 performs ASR on the additional audio data to determine text (illustrated as 1234), performs NLU on the text (illustrated as 1236), determines the additional audio data includes the missing, unknown portions of the command (illustrated as 1238), and executes the multiple-input command (illustrated as 1240).

Figure 13A:
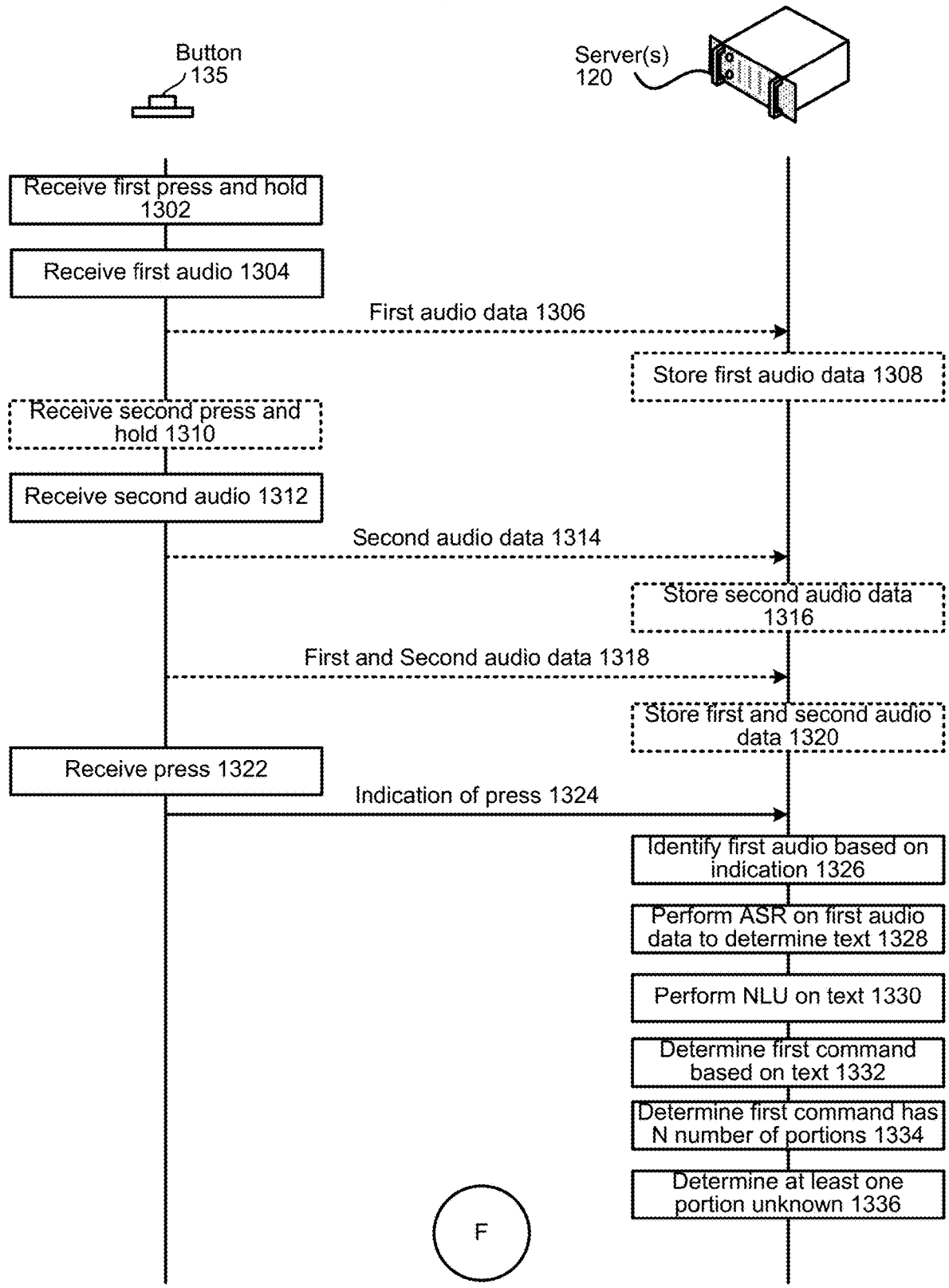
Figure 13B:
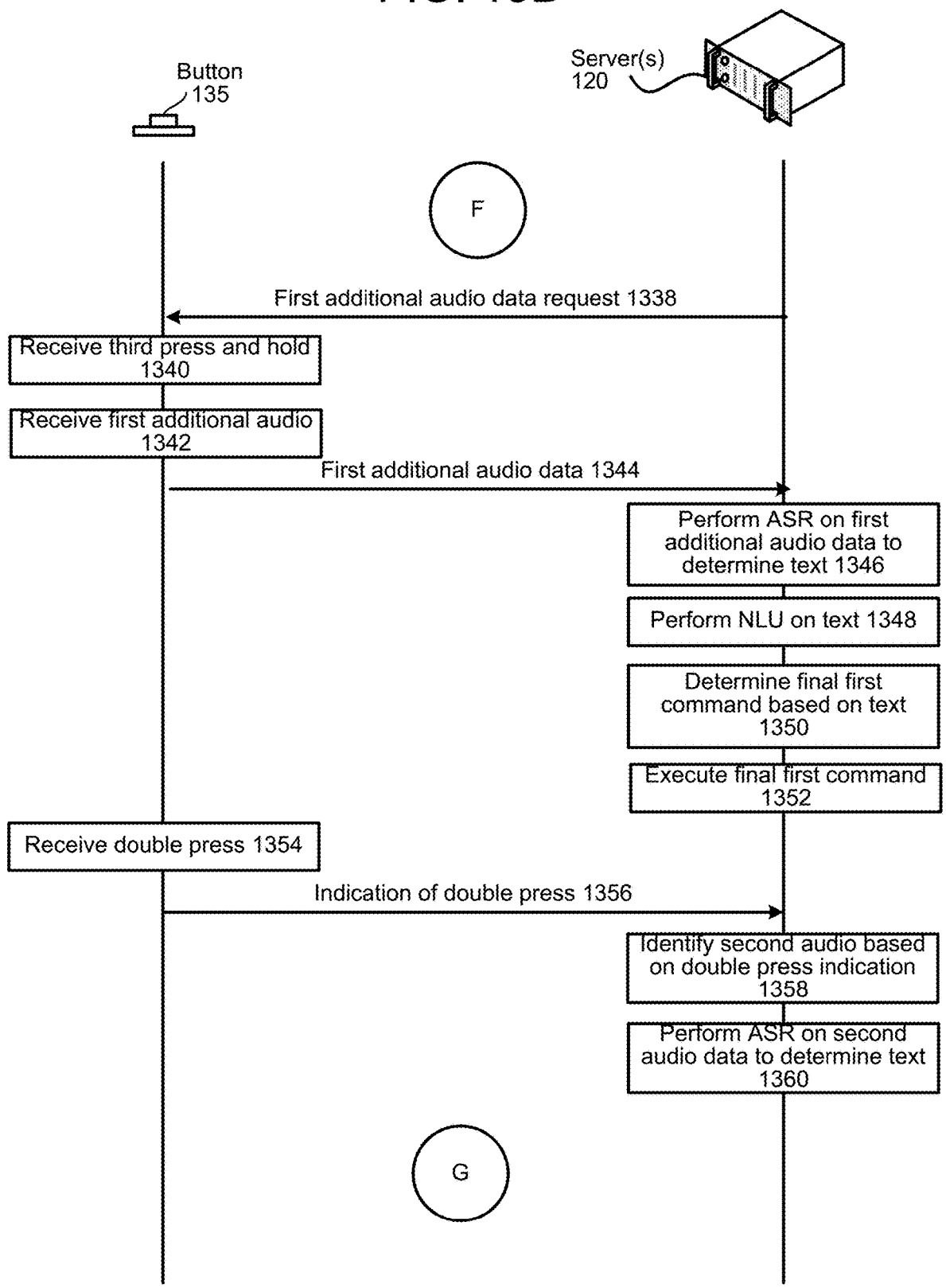

FIGS. 13A through 13C illustrate an example for storing audio data and later executing commands after obtaining additional audio. The button 135 receives a press and hold operation (illustrated as 1302) and receives first audio (illustrated as 1304). Optionally, the button 135 may thereafter send first audio data, corresponding to the first audio, to the server 120 (illustrated as 1306), and the server 120 may store the first audio data (illustrated as 1308), as associated with a first specific physical interaction of the button 135 (such as a press operation). The button 135, either during the first press and hold operation or during an optional second press and hold operation (illustrated as 1310), receives second audio (illustrated as 1312). If optional steps 1306 and 1308 were performed, the button 135 may send second audio data, corresponding to the second audio, to the server 120 (illustrated as 1314), and the server 120 may store the second audio data (illustrated as 1316), as associated with a second specific physical interaction of the button 135 (such as a double press operation). If steps 1306, 1308, 1314, and 1316 are not performed, the button 135 may send the first and second audio data together to the server 120 (illustrated as 1318), and the server 120 may separately store the first and second audio data as associated with first and second physical interactions of the button 135, respectively (illustrated as 1320).

When the button 135 receives a physical operation of different duration than a press and hold operation (e.g., a press operation) (illustrated as 1322), the button 135 sends an indication of the press operation to the server 120 (illustrated as 1324). The server 120 identifies audio data based on information of the press indication (illustrated as 1326), performs ASR on the audio data to determine text (illustrated as 1328), performs NLU on the text (illustrated as 1330), and determines a command based on the NLU processed text (illustrated as 1332). The server 120 also determines the command has a number (N) portions of information required for execution of the command (illustrated as 1334), and determines at least one of the required portions is unknown (i.e., the audio data includes only a portion of the required portions needed to execute the command) (illustrated as 1336). The server 120 then sends a request for additional audio data to the button 135 (illustrated as 1338). The server 120 may create text corresponding to the request for additional data, and text-to-speech (TTS) processes may be used to create audio data corresponding to the text. Thus, the request may include audio data. The button 135 may emit an indication that it needs to receive more audio from a user (not illustrated). The button 135 receives a press and hold operation (illustrated as 1340), and during the operation receives additional audio (illustrated as 1342). The button 135 sends audio data corresponding to the additionally received audio to the server 120 (illustrated as 1344). The server 120 performs ASR on the additional audio data to determine text (illustrated as 1346), performs NLU on the text (illustrated as 1348), determines the additional audio data includes the missing, unknown portions of the command (illustrated as 1350), and executes the multiple-input command (illustrated as 1352).

When the button 135 receives a physical operation of different duration than a press and hold operation and a press operation (e.g., a double press operation) (illustrated as 1354), the button 135 sends an indication of the double press operation to the server 120 (illustrated as 1356). The server 120 identifies audio data based on information of the double press indication (illustrated as 1358), performs ASR on the audio data to determine text (illustrated as 1360), performs NLU on the text (illustrated as 1362), and determines a command based on the NLU processed text (illustrated as 1364). The server 120 also determines the command has a number (N) portions of information required for execution of the command (illustrated as 1366), and determines at least one of the required portions is unknown (i.e., the audio data includes only a portion of the required portions needed to execute the command) (illustrated as 1368). The server 120 then sends a request for additional audio data to the button 135 (illustrated as 1370). The server 120 may create text corresponding to the request for additional data, and text-to-speech (TTS) processes may be used to create audio data corresponding to the text. Thus, the request may include audio data. The button 135 may emit an indication that it needs to receive more audio from a user (not illustrated). The button 135 receives a press and hold operation (illustrated as 1372), and during the operation receives additional audio (illustrated as 1374). The button 135 sends audio data corresponding to the additionally received audio to the server 120 (illustrated as 1376). The server 120 performs ASR on the additional audio data to determine text (illustrated as 1378), performs NLU on the text (illustrated as 1380), determines the additional audio data includes the missing, unknown portions of the command (illustrated as 1382), and executes the multiple-input command (illustrated as 1384).

FIGS. 14A through 14E illustrate an example for storing audio data and later executing commands after obtaining additional audio. The button 135 receives a first press and hold interaction (illustrated as 1402), which configures the button 135 to receive audio. During the press and hold operation, the button 135 receives audio (illustrated as 1404) and, thereafter or simultaneously, stores audio data corresponding to the received audio (illustrated as 1406). For example, the audio data may be stored either while the button 135 receives the audio or after the press and hold operation is released. Either during the first press and hold operation, or during an optional second press and hold operation (illustrated as 1408), the button 135 receives second audio (illustrated as 1410). As with the first audio, the button 135 may store second audio data, corresponding to the second received audio, while the button 135 receives either the first or second press and hold operation, or the button 135 may store the second audio data after the first or second (depending upon implementation) press and hold operation is released (illustrated as 1412).

When the button 135 receives a physical interaction occurring over a different time frame than the press and hold operation (e.g., the button 135 experiences a press operation) (illustrated as 1414), the button 135 sends audio data corresponding to the press operation (e.g., the first audio data) to the server 120 (illustrated as 1416). The server 120 performs ASR on the audio data to determine text (illustrated as 1418), performs NLU on the text (illustrated as 1420), and determines a command based on the NLU processed text (illustrated as 1422). The server 120 also determines the command has a number (N) portions of information required for execution of the command (i.e., determines the command is a multiple-input command) (illustrated as 1424), and determines at least one of the required portions is unknown (i.e., the audio data includes only a portion of the required portions needed to execute the command) (illustrated as 1426). The server 120 then receives signals from speech-controlled devices (illustrated as 1428), and sends a request for additional audio data to one of the speech-controlled devices 105 (illustrated as 1430). The server 120 may create text corresponding to the request for additional data, and text-to-speech (TTS) processes may be used to create audio data corresponding to the text. Thus, the request may include audio data. For example, the speech-controlled device 105 chosen by the server 120 may be chosen because it is with a threshold proximity to the button 135 (e.g., it is with the same room of a building as the button 135). Alternatively, for example, the speech-controlled device 105 chosen by the server 120 may be chosen because the speech-controlled device 105 is the closest speech-controlled device to the button 135. The speech-controlled device 105 may emit an indication that it needs to receive more audio from a user (not illustrated). The speech-controlled device receives additional audio (illustrated as 1432) and sends audio data corresponding to the additionally received audio to the server 120 (illustrated as 1434). The server 120 performs ASR on the additional audio data to determine text (illustrated as 1436), performs NLU on the text (illustrated as 1438), determines the additional audio data includes the missing, unknown portions of the command (illustrated as 1440), and executes the multiple-input command (illustrated as 1442).

When the button 135 receives a physical operation of different duration than a press and hold operation and a press operation (e.g., a double press operation) (illustrated as 1444), the button 135 sends an indication of the double press operation to the server 120 (illustrated as 1446). The server 120 performs ASR on the audio data to determine text (illustrated as 1448), performs NLU on the text (illustrated as 1450), and determines a command based on the NLU processed text (illustrated as 1452). The server 120 also determines the command has a number (N) portions of information required for execution of the command (i.e., determines the command is a multiple-input command) (illustrated as 1454), and determines at least one of the required portions is unknown (i.e., the audio data includes only a portion of the required portions needed to execute the command) (illustrated as 1456). The server 120 then sends a request for additional audio data to the previously chosen, or another, speech-controlled device 105 (illustrated as 1458). The server 120 may create text corresponding to the request for additional data, and text-to-speech (TTS) processes may be used to create audio data corresponding to the text. Thus, the request may include audio data. The speech-controlled device 105 may emit an indication that it needs to receive more audio from a user (not illustrated). The speech-controlled device 105 receives additional audio (illustrated as 1460) and sends audio data corresponding to the additionally received audio to the server 120 (illustrated as 1462). The server 120 performs ASR on the additional audio data to determine text (illustrated as 1464), performs NLU on the text (illustrated as 1466), determines the additional audio data includes the missing, unknown portions of the command (illustrated as 1468), and executes the multiple-input command (illustrated as 1470).

FIGS. 15A through 15E illustrate an example for storing audio data and later executing commands after obtaining additional audio. The button 135 receives a press and hold operation (illustrated as 1502) and receives first audio (illustrated as 1504). Optionally, the button 135 may thereafter send first audio data, corresponding to the first audio, to the server 120 (illustrated as 1506), and the server 120 may store the first audio data (illustrated as 1508), as associated with a first specific physical interaction of the button 135 (such as a press operation). The button 135, either during the first press and hold operation or during an optional second press and hold operation (illustrated as 1510), receives second audio (illustrated as 1512). If optional steps 1506 and 1508 were performed, the button 135 may send second audio data, corresponding to the second audio, to the server 120 (illustrated as 1514), and the server 120 may store the second audio data (illustrated as 1516), as associated with a second specific physical interaction of the button 135 (such as a double press operation). If steps 1506, 1508, 1514, and 1516 are not performed, the button 135 may send a single data packet including the first and second audio data to the server 120 (illustrated as 1518), and the server 120 may separately store the first and second audio data as associated with first and second physical interactions of the button 135, respectively (illustrated as 1520).

When the button 135 receives a physical operation of different duration than a press and hold operation (e.g., a press operation) (illustrated as 1522), the button 135 sends an indication of the press operation to the server 120 (illustrated as 1524). The server 120 identifies audio data based on information of the press indication (illustrated as 1526), performs ASR on the audio data to determine text (illustrated as 1528), performs NLU on the text (illustrated as 1530), and determines a command based on the NLU processed text (illustrated as 1532). The server 120 also determines the command has a number (N) portions of information required for execution of the command (illustrated as 1534), and determines at least one of the required portions is unknown (i.e., the audio data includes only a portion of the required portions needed to execute the command) (illustrated as 1536). The server 120 then receives signals from speech-controlled devices (illustrated as 1538), and sends a request for additional audio data to one of the speech-controlled devices 105 (illustrated as 1540). The server 120 may create text corresponding to the request for additional data, and text-to-speech (TTS) processes may be used to create audio data corresponding to the text. Thus, the request may include audio data. For example, the speech-controlled device 105 chosen by the server 120 may be chosen because it is with a threshold proximity to the button 135 (e.g., it is with the same room of a building as the button 135). Alternatively, for example, the speech-controlled device 105 chosen by the server 120 may be chosen because the speech-controlled device 105 is the closest speech-controlled device to the button 135. The speech-controlled device 105 may emit an indication that it needs to receive more audio from a user (not illustrated). The speech-controlled device 105 receives additional audio (illustrated as 1542) and sends audio data corresponding to the additionally received audio to the server 120 (illustrated as 1544). The server 120 performs ASR on the additional audio data to determine text (illustrated as 1546), performs NLU on the text (illustrated as 1548), determines the additional audio data includes the missing, unknown portions of the command (illustrated as 1550), and executes the multiple-input command (illustrated as 1552).

When the button 135 receives a physical operation of different duration than a press and hold operation and a press operation (e.g., a double press operation) (illustrated as 1554), the button 135 sends an indication of the double press operation to the server 120 (illustrated as 1556). The server 120 performs ASR on the audio data to determine text (illustrated as 1560), performs NLU on the text (illustrated as 1562), and determines a command based on the NLU processed text (illustrated as 1564). The server 120 also determines the command has a number (N) portions of information required for execution of the command (i.e., determines the command is a multiple-input command) (illustrated as 1566), and determines at least one of the required portions is unknown (i.e., the audio data includes only a portion of the required portions needed to execute the command) (illustrated as 1568). The server 120 then sends a request for additional audio data to the previously chosen, or another, speech-controlled device 105 (illustrated as 1570). The server 120 may create text corresponding to the request for additional data, and text-to-speech (TTS) processes may be used to create audio data corresponding to the text. Thus, the request may include audio data. The speech-controlled device 105 may emit an indication that it needs to receive more audio from a user (not illustrated). The speech-controlled device receives additional audio (illustrated as 1572) and sends audio data corresponding to the additionally received audio to the server 120 (illustrated as 1574). The server 120 performs ASR on the additional audio data to determine text (illustrated as 1576), performs NLU on the text (illustrated as 1578), determines the additional audio data includes the missing, unknown portions of the command (illustrated as 1580), and executes the multiple-input command (illustrated as 1582).

According to the present disclosure, the server 120 may work in conjunction with an application server 120-B to execute a multiple-input command. For example, where a command may invoke an application or other task outside control of a server 120, the server 120 may exchange data with a server 120-B associated with a particular application to obtain information for and/or completing the command. By way of illustration, a user may speak the utterance "order me a pizza from Best Pizza" and act to save that utterance using the button 135. Upon pressing of the button 135 at a later time, the server 120 may determine the user's speech corresponds to multiple-input command for ordering a pizza using an application associated with Best Pizza. The server 120 may then send a request, including text associated with the utterance, information about the user and the user's request (i.e., the obtainment of a pizza), and/or other information to a server 120-B associated with the pizzeria (i.e., Best Pizza). The pizzeria's server may check their records to determine if the user's address, payment information, etc. is known (for example in a user profile storage 302 associated with server 120-B (or 120). In the illustration, such information is known but the pizzeria's server 120-B does not know what pizza the user wants. The pizzeria's server may communicate this to the server 120, and the server 120 may obtain the needed information from the user. Data exchanges according to the aforementioned example are illustrated in FIGS. 16A and 16B. According to FIGS. 16A and 16B, the button 135 or server 120 may store audio data as described herein. The server 120 then receives either the audio data or an indication of a physical interaction depending upon implementation (not illustrated here but illustrated in prior figures). If the server 120 receives an indication of a physical interaction, the server 120 identifies corresponding audio data. The server 120 then performs ASR on the audio data to determine text (illustrated as 1602), performs NLU on the text (illustrated as 1604), and then either determines a command and/or determines the text is meant for processing by an application server 120-B (illustrated as 1606). The server 120 may optionally perform further processes that determine the command requires multiple information for execution of the command (illustrated as 1608) and may optionally determine at least a portion of the required information is unknown/missing (illustrated as 1610). The server 120 may send button user identifying information and command information to the application server 120-B (illustrated as 1612). The server 120-B, using the user identifying information and command information, determines further information needed to execute the command (illustrated as 1614) and sends a request for the additional information to the server 120 (illustrated as 1616). The server 120 sends a request to a speech controlled device 105 for additional audio data corresponding to the information needed by the application server 120-B (illustrated as 1618). Selection of an appropriate speech controlled device 105 may be performed as described herein above. The speech controlled device 105 obtains additional audio (including the pizza type) from a user (illustrated as 1620) and sends audio data corresponding to the additional audio to the server 120 (illustrated as 1622). The server 120 performs ASR on the additional audio data to determine text (illustrated as 1624), and sends the text to the application server 120-B (illustrated as 1626), which uses the additional data (the pizza type and the originally received command data to execute the command (illustrated as 1628) (which may involve communications with a further device, such as one associated with the user's local Best Pizza restaurant).

Figure 18:
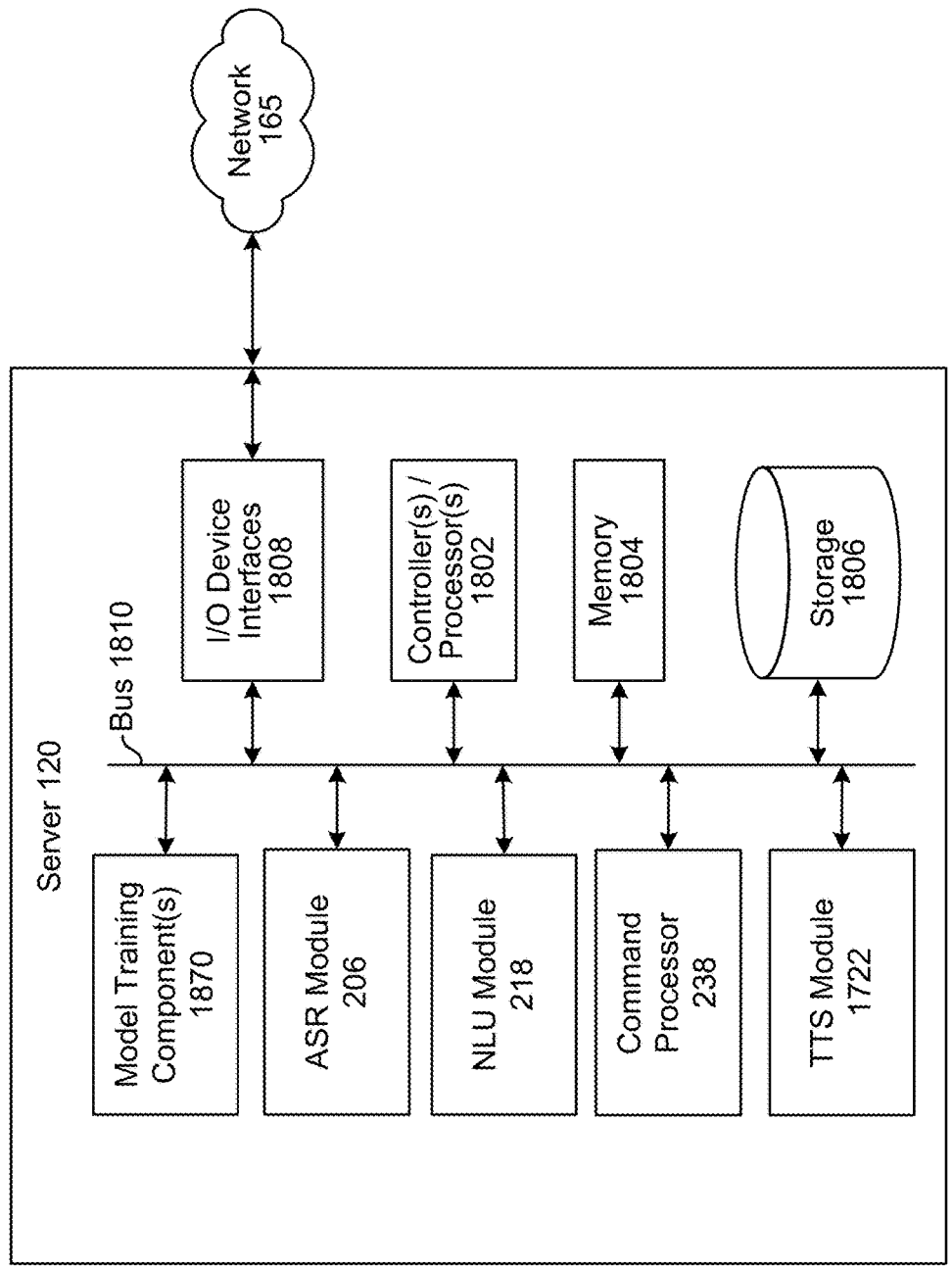
FIG. 18 is a block diagram conceptually illustrating example components of a server according to embodiments of the present disclosure.

FIG. 17 is a block diagram conceptually illustrating a local device (e.g., the button 135, switch 125, smart device 175, speech-controlled device 105, etc.) that may be used with the described system 100. FIG. 18 is a block diagram conceptually illustrating example components of a remote device, such as a remote server 120, that may assist with ASR, NLU processing, or command processing. Multiple such servers 120 may be included in the system 100, such as one server(s) 120 for performing ASR, one server(s) 120 for performing NLU, etc. In operation, each of these devices (or groups of devices) may include computer-readable and computer-executable instructions that reside on the respective device (105/125/135/175), as will be discussed further below.

Each of these devices (105/125/135/175) may include one or more controllers/processors (1702/1802), that may each include a central processing unit (CPU) for processing data and computer-readable instructions, and a memory (1704/1804) for storing data and instructions of the respective device. The memories (1704/1804) may individually include volatile random access memory (RAM), non-volatile read only memory (ROM), non-volatile magnetoresistive (MRAM) and/or other types of memory. Each device may also include a data storage component (1706/1806), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1708/1808).

Computer instructions for operating each device (105/125/135/175) and its various components may be executed by the respective device's controller(s)/processor(s) (1702/1802), using the memory (1704/1804) as temporary "working" storage at runtime. A device's computer instructions may be stored in a non-transitory manner in non-volatile memory (1704/1804), storage (1706/1806), or an external device(s). Alternatively, some or all of the executable instructions may be embedded in hardware or firmware on the respective device in addition to or instead of software.

Each device (105/125/135/175) includes input/output device interfaces (1708/1808). A variety of components may be connected through the input/output device interfaces, as will be discussed further below. Additionally, each device (105/125/135/175) may include an address/data bus (1710/1810) for conveying data among components of the respective device. Each component within a device (105/125/135/175/120) may also be directly connected to other components in addition to (or instead of) being connected to other components across the bus (1710/1810).

One or more of the devices 105/125/135/175 may include a display 1712, which may comprise a touch interface 1714. Or the device 105/125/135/175 may be "headless" and may primarily rely on spoken commands for input. As a way of indicating to a user that a connection between another device has been opened, the device (105/125/135/175) may be configured with a visual indicator, such as an LED or similar component (not illustrated), that may change color, flash, or otherwise provide visual indications by the device 105/125/135/175. The device (105/125/135/175) may also include input/output device interfaces 1708 that connect to a variety of components such as an audio output component such as a speaker 1716, a wired headset or a wireless headset (not illustrated) or other component capable of outputting audio. The device (105/125/135/175) may also include an audio capture component. The audio capture component may be, for example, a microphone 1718 or array of microphones, a wired headset or a wireless headset (not illustrated), etc. The microphone 1718 may be configured to capture audio. If an array of microphones is included, approximate distance to a sound's point of origin may be performed by acoustic localization based on time and amplitude differences between sounds captured by different microphones of the array. The device (105/125/135/175) (using microphone 1718, ASR module 206, etc.) may be configured to determine audio data corresponding to detected audio. The device (105/125/135/175) (using input/output device interfaces 1708, antenna 1720, etc.) may also be configured to transmit the audio data to the server 120 for further processing.

For example, via the antenna(s) 1720, the input/output device interfaces 1708 may connect to one or more networks 165 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 165, the system 100 may be distributed across a networked environment.

The device (105/125/135/175) and/or server 120 may include an ASR module 206. The ASR module 206 in the device (105/125/135/175) may be of limited or extended capabilities. The ASR module 206 may include the language models 210 stored in ASR model storage component 212, and an ASR module 206 that performs the automatic speech recognition process. If limited speech recognition is included, the ASR module 206 may be configured to identify a limited number of words, such as keywords detected by the device (105/125/135/175), whereas extended speech recognition may be configured to recognize a much larger range of words.

The device (105/125/135/175) and/or server 120 may include a limited or extended NLU module 218. The NLU module 218 in the device (105/125/135/175) may be of limited or extended capabilities. The NLU module 218 may comprise the name entity recognition module 220, the intent classification module 222 and/or other components. The NLU module 218 may also include a stored knowledge base and/or entity library, or those storages may be separately located.

The device (105/125/135/175) and/or server 120 may also include a command processor 238 that is configured to execute commands/functions associated with a spoken command as described above.

To create output speech, the system 100 may be configured with a text-to-speech ("TTS") module (1722/1822) that transforms input text data (for example the text from command processor 238) into audio data representing speech. The audio data may then be sent to the device (105/125/135/175) for playback to the user, thus creating the output speech. The TTS module (1722/1822) may include a TTS storage for converting the input text into speech. The TTS module (1722/1822) may include its own controller(s)/processor(s) and memory or may use the controller/processor and memory of the server(s) 120 or other device, for example. Similarly, the instructions for operating the TTS module (1722/1822) may be located within the TTS module (1722/1822), within the memory and/or storage of the server (s) 120, or within an external device.

Text input into a TTS module (1722/1822) may be processed to perform text normalization, linguistic analysis, and linguistic prosody generation. During text normalization, the TTS module (1722/1822) processes the text input and generates standard text, converting such things as numbers, abbreviations (such as Apt., St., etc.), and symbols ($, %, etc.) into the equivalent of written out words.

During linguistic analysis the TTS module (1722/1822) analyzes the language in the normalized text to generate a sequence of phonetic units corresponding to the input text. This process may be referred to as phonetic transcription. Phonetic units include symbolic representations of sound units to be eventually combined and output by the system 100 as speech. Various sound units may be used for dividing text for purposes of speech synthesis. The TTS module (1722/1822) may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system 100, for example in the TTS storage. The linguistic analysis performed by the TTS module (1722/1822) may also identify different grammatical components such as prefixes, suffixes, phrases, punctuation, syntactic boundaries, or the like. Such grammatical components may be used by the TTS module (1722/1822) to craft a natural sounding audio waveform output. The language dictionary may also include letter-to-sound rules and other tools that may be used to pronounce previously unidentified words or letter combinations that may be encountered by the TTS module (1722/1822). Generally, the more information included in the language dictionary, the higher quality the speech output.

Based on the linguistic analysis, the TTS module (1722/1822) may then perform linguistic prosody generation where the phonetic units are annotated with desired prosodic characteristics, also called acoustic features, which indicate how the desired phonetic units are to be pronounced in the eventual output speech. During this stage the TTS module (1722/1822) may consider and incorporate any prosodic annotations that accompanied the text input. Such acoustic features may include pitch, energy, duration, and the like. Application of acoustic features may be based on prosodic models available to the TTS module (1722/1822). Such prosodic models indicate how specific phonetic units are to be pronounced in certain circumstances. A prosodic model may consider, for example, a phoneme's position in a syllable, a syllable's position in a word, a word's position in a sentence, phrase, or paragraph, neighboring phonetic units, etc. As with the language dictionary, prosodic models with more information may result in higher quality speech output than prosodic models with less information. As can be appreciated, when a larger portion of a textual work is made available to the TTS module (1722/1822), the TTS module (1722/1822) may assign more robust and complex prosodic characteristics that vary across the portion, thus making the portion sound more human, resulting in higher quality audio output.

The TTS module (1722/1822) may generate a symbolic linguistic representation, which may include a sequence of phonetic units annotated with prosodic characteristics. This symbolic linguistic representation may then be converted into an audio waveform of speech for output to an audio output device (such as a microphone) and eventually to a user. The TTS module (1722/1822) may be configured to convert the input text into high-quality natural-sounding speech in an efficient manner. Such high-quality speech may be configured to sound as much like a human speaker as possible, or may be configured to be understandable to a listener without attempts to mimic a specific human voice.

The TTS module (1722/1822) may perform speech synthesis using one or more different methods. In one method of synthesis called unit selection, described further below, the TTS module (1722/1822) matches the symbolic linguistic representation against a database of recorded speech, such as a database of a voice corpus. The TTS module (1722/1822) matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, the TTS module (1722/1822) may match units (for example in a unit database) to the input text to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis, called parametric synthesis, parameters such as frequency, volume, and noise are varied by the TTS module (1722/1822) to create an artificial speech waveform output. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. The TTS module (1722/1822) may include an acoustic model, or other models, which may convert a symbolic linguistic representation into a synthetic acoustic waveform of the text input based on audio signal manipulation. The acoustic model includes rules that may be used to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation.

A number of techniques may be used to match speech to be synthesized with input phonetic units and/or prosodic annotations. One common technique is using Hidden Markov Models (HMMs). HMMs may be used to determine probabilities that audio output should match textual input. HMMs may be used to translate parameters from the linguistic and acoustic space to the parameters to be used by a vocoder (a digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise model) based vocoders, CELP (code-excited linear prediction) vocoders, GlottHMM vocoders, HSM (harmonic/stochastic model) vocoders, or others.

The TTS module (1722/1822) may be configured to perform TTS processing in multiple languages. For each language, the TTS module (1722/1822) may include specially configured data, instructions, and/or components to synthesize speech in the desired language(s). To improve performance, the TTS module (1722/1822) may revise/ update the contents of the TTS storage based on feedback of the results of TTS processing, thus enabling the TTS module (1722/1822) to improve TTS processing.

Other information may also be stored in the TTS storage for use in TTS processing. The contents of the TTS storage may be prepared for general TTS use or may be customized to include sounds and words that are likely to be used in a particular application. For example, for TTS processing by a global positioning system (GPS) device, the TTS storage may include customized speech specific to location and navigation. In certain instances the TTS storage may be customized for an individual user based on his/her individualized desired speech output. For example a user may prefer a speech output voice to be a specific gender, have a specific accent, speak at a specific speed, have a distinct emotive quality (e.g., a happy voice to correspond to a happy moment in the literary work), or other customizable characteristic. The TTS module (1722/1822) may include specialized databases or models to account for user preferences.

For example, to create the customized speech output of the system 100, the system 100 may be configured with multiple voice corpuses/unit databases, where each unit database is configured with a different "voice" to match desired speech qualities. The voice selected by the TTS module (1722/1822) to synthesize the speech may correspond to a character in the literary work. For example, one voice corpus may be stored to be used to synthesize a 1st male character's speech, another may be stored to be used to synthesize a 1st female's character, and so on. Thus the audio of each customized voice corpus matches the respective desired speech quality. The customized voice corpuses may then be used during runtime to differentiate different characters in the literary work. Additionally, parametric synthesis may be used to synthesize speech with the desired speech quality. For parametric synthesis, parametric features may be configured that match the desired speech quality. The application may also offer a user certain pre-programmed choices of types of sounds that the system 100 may provide.

The device (105/125/135/175) may also include positioning components such as a global positioning system (GPS) component 1724, which may calculate a global position of the device (105/125/135/175). The device (105/125/135/ 175) may also include motion sensor components (not illustrated), which may include sensors such as an accelerometer, gyroscope, or the like.

As noted above, multiple devices (e.g., the devices (105/ 125/135/175) and server 120) may be employed in a single speech processing system 100. In such a multi-device system 100, each of the devices may include different components for performing different aspects of the speech processing. The multiple devices may include overlapping components. The components of the devices (105/125/135/ 175) and server 120, as illustrated in FIGS. 17 and 18, are exemplary, and may be located as a stand-alone device or may be included, in whole or in part, as a component of a larger device or system.

Figure 19:
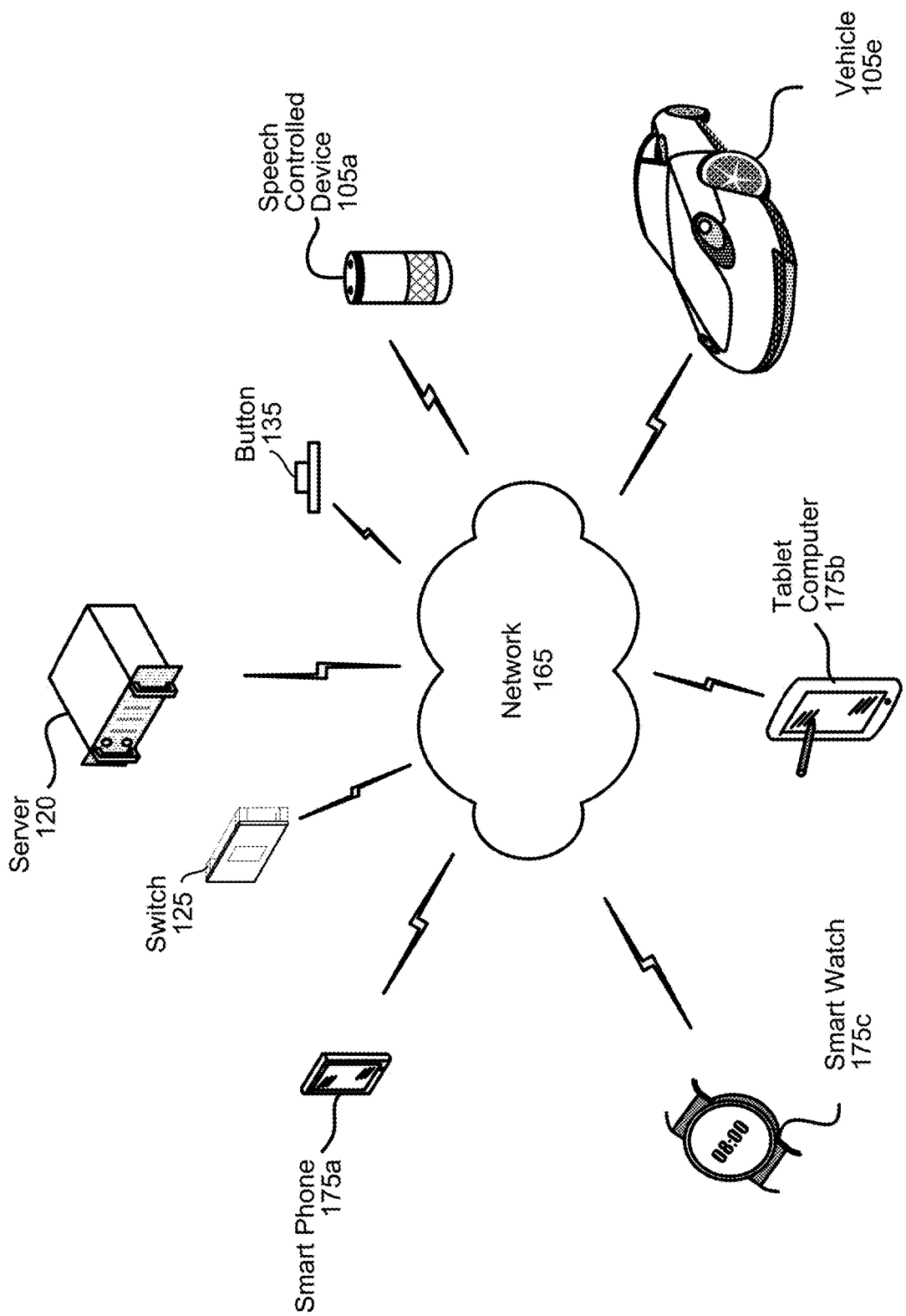
FIG. 19 illustrates an example of a computer network for use with the system.

As illustrated in FIG. 19, multiple devices (105a, 105e, 120, 125, 135, and 175a-175c) may contain components of the system 100 and the devices may be connected over the network 165. The network 165 may include a local or private network or may include a wide network such as the internet. Devices may be connected to the network 165 through either wired or wireless connections. For example, a speech controlled device 105a, a vehicle 105e, a smart phone 175a, a tablet computer 175b, a button 135, a switch 125, and/or a smart watch 175c may be connected to the network 165 through a wireless service provider, over a WiFi or cellular network connection, or the like. Other devices are included as network-connected support devices, such as the server 120 and others. The support devices may connect to the network 165 through a wired connection or wireless connection. Networked devices (105a, 105e, 120, 125, 135, and 175a-175c) may capture audio using one-or-more built-in or connected microphones 1718 or audio capture devices, with processing performed by ASR, NLU, or other components of the same device or another device connected via the network 165, such as the ASR module 206, NLU module 218, etc. of one or more servers 120.

Figure 20:
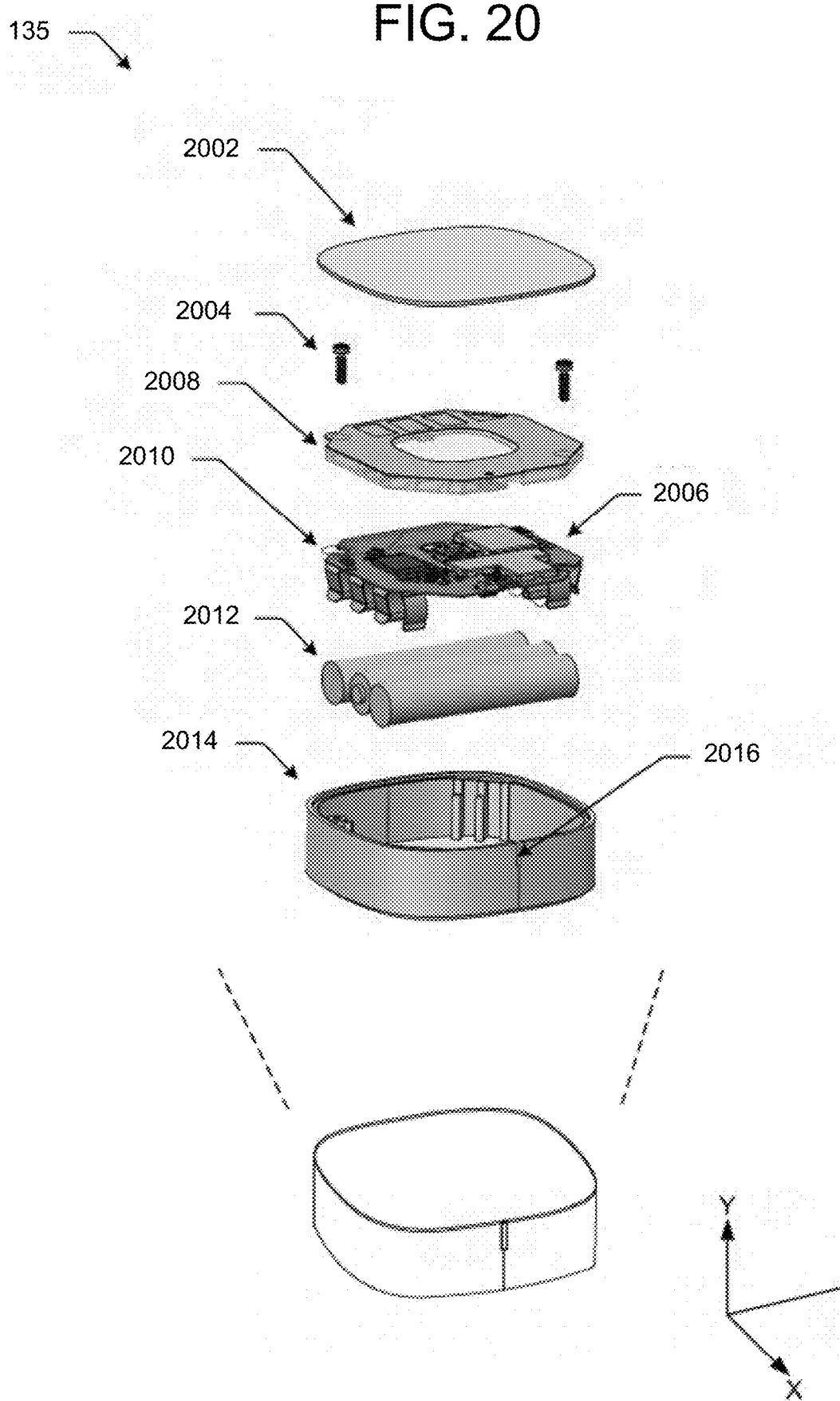
FIG. 20 illustrates an exploded view of select components of a button according to the present disclosure.

FIG. 20 illustrates an exploded view of select components of a button 135 according to the present disclosure. The button 135 includes an exposed surface 2002, one or more screws 2004 (e.g., self-threading screws), an adhesive 2006 (e.g., double sided self-adhesive tape), a spacer 2008, a main printed circuit board (PCB) 2010, one or more batteries 2012 (e.g., three AAA batteries are shown), a housing 2014, and a light pipe 2016.

The housing 2014 may have a substantially cuboidal shape and encloses the electronics of the main PCB 2010, batteries 2012, and spacer 2008. In some examples, when assembled, the button 135 may be substantially rectangular-shaped in an X-Y plane, with dimensions of about 49 mm×14 mm. The button 135 may have a Z-axis dimension of about 49 mm. FIG. 20 further illustrates that the structure of the housing 2014 may have an opening, such as the light pipe 2016. The light pipe 2016 emits light for various operations and user feedback.

In the example illustrated, the exposed surface 2002 may be attached to the spacer 2008 by an adhesive 2006. The screws 2004 may be used to attach the spacer 2008 and the main PCB 2010 to the housing 2014. The spacer 2008 and exposed surface 2002 allow some physical movement with respect to the underlying PCB 2010 so that the exposed surface 2002 may move between a rest position and an actuated position. When the exposed surface 2002 is depressed, it or the spacer 2008 makes contact with an electronic switch or detection sensor on the PCB 2010. When contacted, the switch or sensor generates a signal that is passed to a controller on the PCB 2010. The PCB 2010 uses the signal to detect when the exposed surface 2002 is pressed.

The batteries 2012 may be removably affixed to the main PCB 2010. While AAA batteries are illustrated, the button 135 may receive power from alternative numbers of batteries (e.g., a single battery) and/or alternative sizes of batteries (e.g., AAA size). Further, alternative types of removable batteries, such as standard primary (single-use) or secondary (rechargeable) cells, may be used. Moreover, the button 135 may receive power directly from a mainframe of the building within which it is installed.

While not illustrated in FIG. 20, it should be appreciated that a microphone and/or speaker component may be included within the housing 2014 of the button 135 when the button 135 is fully assembled.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
receiving, from a first device, first audio data representing a spoken command;
storing first data associating the first audio data with a physical interaction to be performed with respect to the first device;
after storing the first data, receiving, from the first device, an indicator representing the physical interaction was performed with respect to the first device;
identifying the first audio data based on the indicator and the first data;
after identifying the first audio data based on the indicator and the first data, performing speech processing on the first audio data to determine an intent of the spoken command;
based on the speech processing, determining that the spoken command requires first information to be executed;
causing the first device to output a request for the first information;
receiving, from the first device, second audio data representing the first information; and
causing the spoken command to be executed based on the intent and using the first information.

2. The computer-implemented method of claim 1, further comprising:
determining a second device within a threshold proximity to the first device; and
causing the second device to output the request.

3. The computer-implemented method of claim 1, further comprising:
receiving signals from a plurality of devices;
determining, based on the signals, at least a second device is within a threshold proximity to the first device; and
causing the second device to output the request.

4. The computer-implemented method of claim 1, further comprising:
receiving signals from a plurality of devices;
determining, based on the signals, a second device that is closest to the first device; and
causing the second device to output the request.

5. A computer-implemented method, comprising:
receiving, from a first device, first audio data representing a spoken command;
storing first data associating the first audio data with a physical interaction to be performed with respect to the first device;
after storing the first data, receiving, from the first device, an indicator representing the physical interaction was performed with respect to the first device;
identifying the first audio data based on the indicator and the first data;
after identifying the first audio data based on the indicator and the first data, performing speech processing on the first audio data to determine an intent of the spoken command; and
causing the spoken command to be executed based on the intent.

6. The computer-implemented method of claim 5, wherein the physical interaction corresponds to either a physical button being depressed or a touch event performed with respect to a display of the first device.

7. The computer-implemented method of claim 5, further comprising:
- determining that execution of the spoken command requires first information;
- receiving signals from a plurality of devices;
- determining, based on the signals, at least a second device is within a threshold proximity to the first device; and
- causing the second device to output a request for the first information.

8. The computer-implemented method of claim 5, further comprising:
- determining that execution of the spoken command requires first information;
- receiving signals from a plurality of devices;
- determining, based on the signals, a second device that is closest to the first device; and
- causing the second device to output a request for the first information.

9. The computer-implemented method of claim 8, further comprising:
- determining text data representing the request;
- performing text-to-speech processing on the text data to generate second audio data; and
- sending, to the second device, the second audio data.

10. The computer-implemented method of claim 5, further comprising:
- determining that execution of the spoken command requires first information;
- receiving second audio data based at least in part on the first device being interacted with longer than a threshold amount of time;
- determining the second audio data corresponds to the first information; and
- associating the second audio data with the physical interaction.

11. The computer-implemented method of claim 5, wherein the physical interaction corresponds to a button being in an actuated state for a period of time less than a threshold period of time.

12. The computer-implemented method of claim 5, wherein the physical interaction corresponds to a button being in an actuated state twice within a threshold period of time.

13. A computing system, comprising:
- at least one processor; and
- at least one memory including instructions that, when executed by the at least one processor, cause the computing system to:
  - receive, from a first device, first audio data representing a spoken command;
  - store first data associating the first audio data with a physical interaction to be performed with respect to the first device;
  - after storing the first data, receive, from the first device, an indicator representing the physical interaction was performed with respect to the first device;
  - identify the first audio data based on the indicator and the first data;
  - after identifying the first audio data based on the indicator and the first data, perform speech processing on the first audio data to determine an intent of the spoken command; and
  - cause the spoken command to be executed based on the intent.

14. The computing system of claim 13, wherein the physical interaction corresponds to either a physical button being depressed or a touch event performed with respect to a display of the first device.

15. The computing system of claim 13, wherein the at least one memory further includes instructions that, when executed by the at least one processor, further cause the computing system to:
- determine that execution of the spoken command requires first information;
- receive signals from a plurality of devices;
- determine, based on the signals, at least a second device is within a threshold proximity to the first device; and
- cause the second device to output a request for the first information.

16. The computing system of claim 13, wherein the at least one memory further includes instructions that, when executed by the at least one processor, further cause the computing system to:
- determine that execution of the spoken command requires first information;
- receive signals from a plurality of devices;
- determine, based on the signals, a second device that is closest to the first device; and
- cause the second device to output a request for the first information.

17. The computing system of claim 16, wherein the at least one memory further includes instructions that, when executed by the at least one processor, further cause the computing system to:
- determine text data representing the request;
- perform text-to-speech processing on the text data to generate second audio data; and
- send, to the second device, the second audio data.

18. The computing system of claim 13, wherein the at least one memory further includes instructions that, when executed by the at least one processor, further cause the computing system to:
- determine that execution of the spoken command requires first information;
- receive second audio data based at least in part on the first device being interacted with longer than a threshold amount of time;
- determine the second audio data corresponds to the first information; and
- associate the second audio data with the physical interaction.

19. The computing system of claim 13, wherein the physical interaction corresponds to a button being in an actuated state for a period of time less than a threshold period of time.

20. The computing system of claim 13, wherein the physical interaction corresponds to a button being in an actuated state twice within a threshold period of time.

* * * * *